(12) United States Patent
Zhang et al.

(10) Patent No.: US 11,849,340 B2
(45) Date of Patent: Dec. 19, 2023

(54) INFORMATION FEEDBACK METHOD, DEVICE AND SYSTEM

(71) Applicant: ZTE Corporation, Guangdong (CN)

(72) Inventors: Shujuan Zhang, Guangdong (CN); Zhaohua Lu, Guangdong (CN); Yuhong Gong, Guangdong (CN); Hao Wu, Guangdong (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 17/931,519

(22) Filed: Sep. 12, 2022

(65) Prior Publication Data
US 2023/0078933 A1 Mar. 16, 2023

Related U.S. Application Data

(63) Continuation of application No. 16/207,054, filed on Nov. 30, 2018, now Pat. No. 11,445,383, which is a
(Continued)

(30) Foreign Application Priority Data

May 31, 2016 (CN) .......................... 201610377838.1

(51) Int. Cl.
*H04W 24/02* (2009.01)
*H04B 7/06* (2006.01)
(Continued)

(52) U.S. Cl.
CPC .......... *H04W 24/02* (2013.01); *H04B 7/0617* (2013.01); *H04W 36/06* (2013.01); *H04W 36/305* (2018.08); *H04W 76/19* (2018.02)

(58) Field of Classification Search
None
See application file for complete search history.

(56) References Cited

U.S. PATENT DOCUMENTS

| 6,542,479 | B1 | 4/2003 | Boudier et al. |
| 6,633,760 | B1 | 10/2003 | Ham et al. |

(Continued)

FOREIGN PATENT DOCUMENTS

| CN | 101159690 A | 4/2008 |
| CN | 101444010 A | 5/2009 |

(Continued)

OTHER PUBLICATIONS

Interdigital Communications, "Beam-based aspects for New Radio," 3GPP TSG-RAN WG2 #95, Nanjing, China, R1-164121, May 23-27, 2016. 4 pages.

(Continued)

*Primary Examiner* — Andrew C Oh
(74) *Attorney, Agent, or Firm* — PERKINS COIE LLP

(57) ABSTRACT

An information feedback method, device and system are provided. The method includes: determining, by a first communication node, feedback information for indicating a status of communication links between the first communication node and a serving communication node, where the feedback information includes at least one of the following: failure information of a first type of transmission link, a request for training signal of transmission modes and/or a request for training signal of receiving modes, and indication information of M preferred transmission links, and the first type of transmission link and the M preferred transmission links include transmission links from the serving communication node to the first communication node, where M is a positive integer greater than or equal to 1; and transmitting, by the first communication node, the feedback information to the serving communication node. The present disclosure solves the problem in the existing art of a low resource utilization rate because a receiving end and a transmitting end cannot learn a communication link failure
(Continued)

in time, enables the receiving end and the transmitting end to learn a status of communication links between them in time, and effectively improves the resource utilization rate.

16 Claims, 19 Drawing Sheets

Related U.S. Application Data continuation of application No. PCT/CN2017/086635, filed on May 31, 2017.

(51) Int. Cl.
　　*H04W 76/19*　　　(2018.01)
　　*H04W 36/30*　　　(2009.01)
　　*H04W 36/06*　　　(2009.01)

(56) References Cited

U.S. PATENT DOCUMENTS

| | | | |
|---|---|---|---|
| 6,728,233 B1* | 4/2004 | Park | H04W 28/18 370/335 |
| 9,008,660 B2 | 4/2015 | Naik et al. | |
| 9,210,596 B1 | 12/2015 | Chen | |
| 2004/0176090 A1* | 9/2004 | Mudigonda | H04W 28/18 455/452.2 |
| 2005/0250500 A1 | 11/2005 | Xu | |
| 2005/0255873 A1* | 11/2005 | Zhang | H04W 52/16 455/67.11 |
| 2006/0098580 A1 | 5/2006 | Li et al. | |
| 2006/0203780 A1 | 9/2006 | Terry | |
| 2007/0080868 A1* | 4/2007 | Hwang | H04B 7/10 343/700 MS |
| 2007/0082619 A1* | 4/2007 | Zhang | H04W 52/226 455/69 |
| 2008/0167042 A1* | 7/2008 | Kitazoe | H04W 36/0033 455/436 |
| 2008/0242251 A1 | 10/2008 | Kraemer et al. | |
| 2009/0010214 A1* | 1/2009 | Bui | H04L 5/0007 370/329 |
| 2009/0124284 A1 | 5/2009 | Scherzer et al. | |
| 2010/0296389 A1 | 11/2010 | Khandekar et al. | |
| 2011/0009142 A1* | 1/2011 | Higuchi | H04L 5/0053 455/509 |
| 2011/0090856 A1 | 4/2011 | Cho et al. | |
| 2011/0110453 A1 | 5/2011 | Prasad et al. | |
| 2011/0116572 A1 | 5/2011 | Lee et al. | |
| 2011/0177823 A1* | 7/2011 | Miao | H04B 7/155 455/450 |
| 2011/0190011 A1 | 8/2011 | Choi et al. | |
| 2011/0222521 A1* | 9/2011 | Lee | H04B 7/0619 370/338 |
| 2011/0312330 A1 | 12/2011 | Sadek et al. | |
| 2012/0077509 A1 | 3/2012 | Huang | |
| 2012/0163192 A1 | 6/2012 | Bae | |
| 2012/0163307 A1 | 6/2012 | Wang et al. | |
| 2012/0269143 A1* | 10/2012 | Bertrand | H04W 72/542 370/329 |
| 2012/0327801 A1 | 12/2012 | Seo et al. | |
| 2013/0010766 A1 | 1/2013 | Sadek et al. | |
| 2013/0033998 A1 | 2/2013 | Seo et al. | |
| 2013/0039250 A1* | 2/2013 | Hsu | H04H 20/71 370/312 |
| 2013/0051264 A1* | 2/2013 | Wang | H04L 5/0098 370/252 |
| 2013/0142052 A1 | 6/2013 | Burbidge et al. | |
| 2013/0148515 A1* | 6/2013 | Ribeiro | H04L 5/0094 370/252 |
| 2013/0176887 A1* | 7/2013 | Seo | H04B 7/0626 370/252 |
| 2013/0208698 A1 | 8/2013 | Taori et al. | |
| 2013/0223354 A1* | 8/2013 | Yang | H04W 72/23 370/329 |
| 2013/0235742 A1* | 9/2013 | Josiam | H04W 24/10 370/252 |
| 2013/0279437 A1 | 10/2013 | Ng et al. | |
| 2013/0295939 A1 | 11/2013 | Wegmann et al. | |
| 2013/0297810 A1 | 11/2013 | Ho et al. | |
| 2013/0310057 A1 | 11/2013 | Tabet et al. | |
| 2014/0080468 A1* | 3/2014 | Zhang | H04W 24/02 455/418 |
| 2014/0092733 A1 | 4/2014 | Johansson et al. | |
| 2014/0162655 A1 | 6/2014 | Hong et al. | |
| 2014/0177449 A1 | 6/2014 | Novak et al. | |
| 2014/0198742 A1 | 7/2014 | Baldemair et al. | |
| 2014/0211731 A1 | 7/2014 | Inoue et al. | |
| 2014/0256247 A1 | 9/2014 | Wietfeldt | |
| 2014/0286271 A1 | 9/2014 | Kim et al. | |
| 2014/0286280 A1* | 9/2014 | Seo | H04B 7/0626 370/329 |
| 2014/0286320 A1 | 9/2014 | He | |
| 2014/0301245 A1 | 10/2014 | Rose et al. | |
| 2014/0302884 A1 | 10/2014 | Zhao et al. | |
| 2014/0334319 A1 | 11/2014 | Kubota et al. | |
| 2014/0335861 A1 | 11/2014 | De Benedittis et al. | |
| 2014/0335872 A1 | 11/2014 | Yamada | |
| 2014/0349659 A1* | 11/2014 | Ishii | H04W 76/18 455/444 |
| 2014/0376914 A1 | 12/2014 | Miniscalco | |
| 2015/0282126 A1 | 1/2015 | Park et al. | |
| 2015/0045035 A1 | 2/2015 | Nigam et al. | |
| 2015/0071250 A1 | 3/2015 | Dai et al. | |
| 2015/0079971 A1 | 3/2015 | Goldhofer et al. | |
| 2015/0124738 A1* | 5/2015 | Ramakrishna | H04B 7/0404 370/329 |
| 2015/0156686 A1 | 6/2015 | Kikuchi | |
| 2015/0163687 A1* | 6/2015 | Lee | H04L 5/005 370/252 |
| 2015/0173105 A1 | 6/2015 | Bergstrom et al. | |
| 2015/0215903 A1 | 7/2015 | Zhao et al. | |
| 2015/0223208 A1 | 8/2015 | Park et al. | |
| 2015/0223270 A1 | 8/2015 | Kim et al. | |
| 2015/0236828 A1 | 8/2015 | Park et al. | |
| 2015/0264580 A1 | 9/2015 | Iwai et al. | |
| 2015/0296401 A1* | 10/2015 | Hamilton | H04L 43/16 370/252 |
| 2015/0326484 A1 | 11/2015 | Cao et al. | |
| 2015/0327130 A1 | 11/2015 | Park et al. | |
| 2015/0341914 A1 | 11/2015 | Lee et al. | |
| 2015/0341939 A1 | 11/2015 | Sharma et al. | |
| 2015/0372851 A1 | 12/2015 | Kakishima et al. | |
| 2015/0373772 A1 | 12/2015 | Watanabe et al. | |
| 2016/0006550 A1* | 1/2016 | Cheng | H04L 5/0051 370/254 |
| 2016/0007403 A1 | 1/2016 | Futaki et al. | |
| 2016/0029350 A1* | 1/2016 | Kishiyama | H04W 72/541 370/329 |
| 2016/0029351 A1 | 1/2016 | Shimezawa et al. | |
| 2016/0066242 A1 | 3/2016 | Su et al. | |
| 2016/0087877 A1 | 3/2016 | Ryu et al. | |
| 2016/0105264 A1* | 4/2016 | Chen | H04L 5/0053 370/329 |
| 2016/0119828 A1 | 4/2016 | Dalsgaard et al. | |
| 2016/0119844 A1 | 4/2016 | Uchino et al. | |
| 2016/0142992 A1 | 5/2016 | Chien et al. | |
| 2016/0150435 A1 | 5/2016 | Baek et al. | |
| 2016/0150513 A1 | 5/2016 | Wu et al. | |
| 2016/0150591 A1 | 5/2016 | Mehrabani et al. | |
| 2016/0182276 A1 | 6/2016 | Wu et al. | |
| 2016/0192401 A1 | 6/2016 | Park et al. | |
| 2016/0219600 A1* | 7/2016 | Li | H04L 27/362 |
| 2016/0242213 A1 | 8/2016 | Dabeer et al. | |
| 2016/0254888 A1 | 9/2016 | Nagata et al. | |
| 2016/0269986 A1 | 9/2016 | Bergstrom et al. | |
| 2016/0302117 A1 | 10/2016 | Inoue et al. | |
| 2016/0316508 A1 | 10/2016 | Hong et al. | |
| 2017/0006525 A1 | 1/2017 | Ruiz Delgado et al. | |
| 2017/0012692 A1 | 1/2017 | Kim et al. | |
| 2017/0034254 A1 | 2/2017 | Salkintzis | |
| 2017/0064602 A1 | 3/2017 | Kotecha et al. | |
| 2017/0070896 A1 | 3/2017 | Shindo | |

(56) References Cited

U.S. PATENT DOCUMENTS

| | | | |
|---|---|---|---|
| 2017/0078934 A1* | 3/2017 | Balakrishnan | H04L 1/203 |
| 2017/0093538 A1 | 3/2017 | Yoon et al. | |
| 2017/0099092 A1* | 4/2017 | Kakishima | H04L 5/005 |
| 2017/0118680 A1 | 4/2017 | Zhu et al. | |
| 2017/0134976 A1 | 5/2017 | Uchino et al. | |
| 2017/0149480 A1* | 5/2017 | Kakishima | H04B 7/0456 |
| 2017/0171784 A1 | 6/2017 | Mitsui et al. | |
| 2017/0181216 A1 | 6/2017 | Worrall et al. | |
| 2017/0188371 A1 | 6/2017 | Kim et al. | |
| 2017/0202009 A1 | 7/2017 | Kim et al. | |
| 2017/0214443 A1* | 7/2017 | Chen | H04B 7/0469 |
| 2017/0215078 A1 | 7/2017 | Mochizuki et al. | |
| 2017/0215154 A1 | 7/2017 | Kim et al. | |
| 2017/0230986 A1* | 8/2017 | Moon | H04W 74/08 |
| 2017/0251491 A1 | 8/2017 | Qiang et al. | |
| 2017/0265111 A1* | 9/2017 | Fan | H04B 7/024 |
| 2017/0272134 A1* | 9/2017 | Yuan | H04B 7/0617 |
| 2017/0273059 A1 | 9/2017 | You et al. | |
| 2017/0302346 A1* | 10/2017 | Jeong | H04B 7/0626 |
| 2017/0311227 A1 | 10/2017 | Kim et al. | |
| 2017/0311322 A1 | 10/2017 | Kim et al. | |
| 2017/0331670 A1 | 11/2017 | Parkvall et al. | |
| 2017/0359766 A1* | 12/2017 | Agiwal | H04L 5/0048 |
| 2018/0020431 A1 | 1/2018 | Cho et al. | |
| 2018/0041261 A1* | 2/2018 | Modarres Razavi | H04B 7/0656 |
| 2018/0063757 A1* | 3/2018 | Gormley | H04W 88/08 |
| 2018/0076924 A1 | 3/2018 | Lee et al. | |
| 2018/0077618 A1 | 3/2018 | Lee et al. | |
| 2018/0098370 A1 | 4/2018 | Bangolae et al. | |
| 2018/0132125 A1 | 5/2018 | Li et al. | |
| 2018/0132300 A1 | 5/2018 | Viering et al. | |
| 2018/0139682 A1* | 5/2018 | Xu | H04W 88/04 |
| 2018/0139745 A1 | 5/2018 | Xiao et al. | |
| 2018/0145795 A1 | 5/2018 | Yi et al. | |
| 2018/0146410 A1 | 5/2018 | Cho et al. | |
| 2018/0192315 A1 | 7/2018 | Feng | |
| 2018/0198497 A1 | 7/2018 | Wei et al. | |
| 2018/0227958 A1 | 8/2018 | Xiong et al. | |
| 2018/0269934 A1 | 9/2018 | Kim et al. | |
| 2018/0270741 A1 | 9/2018 | Enomoto et al. | |
| 2018/0302813 A1 | 10/2018 | Hahn et al. | |
| 2018/0310190 A1* | 10/2018 | Dash | H04W 36/0022 |
| 2018/0351678 A1 | 12/2018 | Zhang et al. | |
| 2019/0053118 A1 | 2/2019 | Hahn et al. | |
| 2019/0053135 A1* | 2/2019 | Hahn | H04W 76/30 |
| 2019/0059031 A1 | 2/2019 | Hahn et al. | |
| 2019/0116510 A1 | 4/2019 | Zhang et al. | |
| 2019/0349945 A1 | 11/2019 | Yeh et al. | |
| 2020/0404714 A1 | 12/2020 | Yu et al. | |

FOREIGN PATENT DOCUMENTS

| | | |
|---|---|---|
| CN | 101507300 A | 8/2009 |
| CN | 101765116 A | 6/2010 |
| CN | 102318392 A | 1/2012 |
| CN | 103733542 A | 4/2014 |
| CN | 103765792 A | 4/2014 |
| CN | 103765954 A | 4/2014 |
| CN | 104205903 A | 12/2014 |
| CN | 104412519 A | 3/2015 |
| CN | 105376723 A | 3/2016 |
| WO | 2012/173436 A2 | 12/2012 |
| WO | 2013/006377 A1 | 1/2013 |

OTHER PUBLICATIONS

European Patent Office, Extended European Search Report for EP 22172281.2, dated Sep. 13, 2022, 10 pages.
Samsung, "Radio Link Failure detection in mmW systems", R2-163800, 3GPP TSG-RAN WG2 Meeting #94, Nanjing China, May 23-27, 2016, 3 pages.
Chinese Office Action dated Mar. 18, 2019 for Chinese Patent Application No. 201610377838.1, filed on May 31, 2016 (27 pages).
Chinese Office Action dated Jun. 30, 2020 for Chinese Patent Application No. 201610377838.1, filed on May 31, 2016 (16 pages).
Extended Search Report dated Apr. 11, 2019 for European Application No. 17805855.8, filed on May 31, 2017 (7 pages).
Extended Search Report dated Feb. 19, 2021 for European Application No. 20195021.9, filed on May 31, 2017 (9 pages).
Interdigital Communications, "Beam-based aspects for New Radio," 3GPP TSG-RAN WG2 #95, Goteborg, Sweden, R2-165050 (Update to R1-164121), 3 pages, Aug. 26, 2016.
International Search Report and Written Opinion dated Aug. 18, 2017 for International Application No. PCT/CN2017/086635, filed on May 31, 2017 (14 pages).
Nokia et al., "Beam management in NR," 3GPP, TSG-RAN WG2 Meeting #94, Nanjing, China, R2-163476, 4 pages, May 27, 2016.
Notification to Grant dated Nov. 9, 2020 for Chinese Patent Application No. 201610377838.1, filed on May 31, 2016 (2 pages).
Samsung, "Discussion on Beam Measurement and Tracking for 5G New Radio Interface in mmWave Frequency Bands," 3GPP TSG RAN WG2 #93bis, Dubrovnik, Croatia, R2-162226, 5 pages, Apr. 15, 2016.
Samsung, "Use cases and RAN2 issues of beam tracking in a beamforming based high frequency NR," 3GPP TSG RAN WG2 #94, Nanjing, China, R2-163712, 5 pages, May 27, 2016.
Chinese Office Action dated Sep. 24, 2021 for Chinese Patent Application No. 202110100461.6, filed on May 31, 2016 (11 pages).
USPTO, Notice of Allowance for U.S. Appl. No. 16/207,054, dated May 9, 2022, 16 pages.
European Patent Office, European Communication pursuant to Article 94(3) EPC for EP 20195021.9, dated Dec. 16, 2022, 6 pages.
USPTO, Non-Final Office Action for U.S. Appl. No. 16/207,054, dated Apr. 28, 2020, 18 pages.
USPTO, Final Office Action for U.S. Appl. No. 16/207,054, dated Oct. 1, 2020, 15 pages.
USPTO, Non-Final Office Action for U.S. Appl. No. 16/207,054, dated Jan. 11, 2021, 14 pages.
USPTO, Final Office Action for U.S. Appl. No. 16/207,054, dated May 3, 2021, 16 pages.
USPTO, Non-Final Office Action for U.S. Appl. No. 16/207,054, dated Sep. 1, 2021, 15 pages.

* cited by examiner

INFORMATION FEEDBACK METHOD, DEVICE AND SYSTEM

CROSS-REFERENCE TO RELATED APPLICATIONS

The present application is a continuation of U.S. patent application Ser. No. 16/207,054 filed on Nov. 30, 2018, which is a continuation of International Application No. PCT/CN2017/086635 filed on May 31, 2017, which is based on and claims priority to a Chinese patent application No. 201610377838.1 filed on May 31, 2016, the disclosures of which are incorporated herein by reference in their entireties.

TECHNICAL FIELD

The present disclosure relates to the field of communications, and in particular, to an information feedback method, device, and system.

BACKGROUND

As an important candidate technology for a 5th generation (5G) mobile communication system in the future, high frequency techniques have available wide bandwidths to provide high-rate data communications. However, the high frequency techniques have unique transmission characteristics compared to low frequency carriers used in the existing LTE. A remarkable characteristic of big path losses greatly affects a communication distance of the high frequency techniques. However, many antenna elements may be arranged on a small area because of a relatively short high-frequency wavelength, so that a multi-antenna technology is adopted to obtain high gains and narrow beams to reduce the path losses and increase cell coverage, enabling high frequencies to be used for cellular communications.

In the high frequency techniques based on beam communications, after a transmitting end and a receiving end establish a link in a beam training phase in practical applications, the established link may fail due to an obstacle or a movement of the transmitting end or the receiving end. After a link fails, how to quickly recover the link is a core issue in the beam communications. In the existing art, the transmitting end retransmits data on a reserved resource and transmits data in an adjacent or candidate direction, and waits for acknowledgement information from the receiving end. If an acknowledgement message is not received, it is determined that the link fails. The receiving end receives the retransmitted data on the reserved resource and receives a packet in the adjacent or candidate direction. If the packet is not received, it is determined that the link fails. In short, the transmitting end determines that a transmission link associated with the receiving end fails only after multiple retransmission attempts, or the receiving end can determine that the link fails only after multiple receiving attempts, resulting in unnecessary data transmissions, wasting of reserved resources, and a time delay caused by a lack of available links for data transmissions. It is worse when the adjacent or candidate communication link is unavailable.

No effective solution has been proposed to the problem in the existing art of a low resource utilization rate because the receiving end and the transmitting end cannot learn a communication link failure in time.

SUMMARY

Embodiments of the present disclosure provide an information feedback method, device and system to at least solve the problem in the existing art of a low resource utilization rate because a receiving end and a transmitting end cannot learn a communication link failure in time.

An embodiment of the present disclosure provides an information feedback method. The method includes: determining, by a first communication node, feedback information for indicating a status of communication links between the first communication node and a serving communication node, where the feedback information includes at least one of the following: failure information of a first type of transmission link, a request for training signal of transmission modes and/or a request for training signal of receiving modes, and indication information of M preferred transmission links, and the first type of transmission link and the M preferred transmission links include transmission links from the serving communication node to the first communication node, where M is a positive integer greater than or equal to 1; and transmitting, by the first communication node, the feedback information to the serving communication node. The serving communication node includes a second communication node and/or a third communication node.

Optionally, the transmitting, by the first communication node, the feedback information to the serving communication node includes one of the following steps: determining, by the first communication node, that the first type of transmission link fails according to a signal transmitted by the serving communication node, and transmitting the feedback information to the serving communication node when the first type of transmission link fails; transmitting, by the first communication node, the feedback information to the serving communication node according to trigger signaling information transmitted by the serving communication node; transmitting, by the first communication node, the feedback information to the serving communication node according to a periodic resource configured by the serving communication node; and determining, by the first communication node, whether a trigger condition is satisfied, continuing to perform detection if the trigger condition is not satisfied, and transmitting the feedback information to the serving communication node if the trigger condition is satisfied.

Optionally, the signal transmitted by the serving communication node includes at least one of the following: a demodulation reference signal transmitted by the serving communication node on one or more transmission links; a sounding signal transmitted by the serving communication node on the first type of transmission link; and a training signal for the transmission modes and/or a training signal for the receiving modes transmitted by the serving communication node on a plurality of transmission links. The demodulation reference signal includes a demodulation reference signal on a control channel resource and/or a demodulation reference signal on a data channel resource.

Optionally, the feedback information is used for indicating at least one of the following pieces of information to the serving communication node: a link performance of a signal transmitted by the serving communication node on the first type of transmission link to the first communication node is lower than a first predetermined threshold; the signal transmitted by the serving communication node on the first type of transmission link fails to reach the first communication node; a link performance of the signal transmitted by the serving communication node on another preset transmission link other than the first type of transmission link to the first communication node is superior to the link performance of the signal transmitted by the serving communication node on the first type of transmission link; the serving communication node needs to stop transmitting the signal on the first type of transmission link to the first communication node; and the first communication node stops detecting control information, receiving data, and/or tracking links on the first type of transmission link.

Optionally, the M preferred transmission links are preferred transmission links among N candidate transmission links, whose link performances of transmitting to the first communication node satisfy a predetermined condition; and/or link performances of the M preferred transmission links are higher than a second predetermined threshold; where N is a positive integer greater than M.

Optionally, the first communication node acquires information of the N candidate transmission links through at least one of the following manners: acquiring, by the first communication node, the information of the N candidate transmission links according to a system broadcast message transmitted by the serving communication node; acquiring, by the first communication node, the information of the N candidate transmission links according to an agreed rule with the serving communication node in a training phase; acquiring, by the first communication node, the information of the N candidate transmission links according to an agreed rule with the serving communication node; acquiring, by the first communication node, the information of the N candidate transmission links according to a constraint set of transmission links transmitted by the serving communication node; and acquiring, by the first communication node the information of the N candidate transmission links according to all transmission links corresponding to the serving communication node.

Optionally, the first communication node acquires a value of M through at least one of the following manners: the first communication node acquires the value of M according to a value of N; the first communication node acquires the value of M according to an agreed rule with the serving communication node; and the first communication node acquires the value of M according to link performance of the N candidate transmission links to the serving communication node and the second predetermined threshold.

Optionally, the first communication node acquires the M preferred transmission links according to at least one of: a demodulation reference signal transmitted by the serving communication node on one or more transmission links; a training signal for the transmission modes and/or a training signal for the receiving modes transmitted by the serving communication node on one or more transmission links; and a signal periodically transmitted by the serving communication node. The demodulation reference signal includes a demodulation reference signal on a control channel resource and/or a demodulation reference signal on a data channel resource.

Optionally, after the transmitting, by the first communication node, the feedback information, the method further includes: adjusting, by the first communication node, the communication links between the first communication node and the serving communication node according to the feedback information and/or response information received from the serving communication node.

Optionally, the transmitting, by the first communication node, the feedback information includes: transmitting, by the first communication node, the feedback information in a first transmission mode and monitoring acknowledgement information from the serving communication node; transmitting, by the first communication node, the feedback information in a second transmission mode and monitoring the acknowledgement information from the serving communication node in a case where the acknowledgement information from the serving communication node is not received after first predetermined time and/or predetermined transmission times are exceeded; and in a case where the acknowledgement information from the serving communication node is not received after second predetermined time is exceeded and/or all transmission modes at a first carrier frequency are traversed, initiating a process to re-access a network, or stopping transmitting the feedback information to the serving communication node, or transmitting the feedback information to the serving communication node at a second carrier frequency.

Optionally, the transmitting, by the first communication node, the feedback information includes: transmitting, by the first communication node, the feedback information to the serving communication node in a plurality of transmission modes, and monitoring acknowledgement information from the serving communication node; and confirming a successful transmission of the feedback information in a case where the acknowledgement information transmitted by the serving communication node is received.

Optionally, the method further includes: transmitting, by the first communication node, a cell handover request to the serving communication node under a preset condition. The preset condition includes one of the following: in one receiving mode, link performances of all transmission links from the serving communication node to the first communication node at a first carrier frequency are lower than a third predetermined threshold; in traversing all receiving modes, the link performances of all the transmission links from the serving communication node to the first communication node at the first carrier frequency are all lower than a fourth predetermined threshold; and the first communication node fails to receive acknowledgement information corresponding to the feedback information, which is transmitted by the serving communication node.

Optionally, before the determining, by the first communication node, the feedback information, the method further includes: in a case where the first communication node determines that the first type of transmission link fails and/or the first communication node determines that link performances of all transmission links from the serving communication node to the first communication node in a current receiving mode are lower than a fifth predetermined threshold, transmitting, by the first communication node, a request for training signal to the serving communication node, and determining the M preferred transmission links according to a training signal for the transmission modes and/or a training signal for the receiving modes received from the serving communication node. The request for training signal includes the request for training signal of the transmission modes and/or the request for the signal for the receiving modes.

Optionally, after the transmitting, by the first communication node, the request for training signal to the serving communication node, the method further includes: acquiring, by the first communication node, a resource occupied by the training signal for the transmission modes and/or the training signal for the receiving modes transmitted by the serving communication node according to at least one of: the request for training signal of the transmission modes and/or the request for training signal of the receiving modes; a resource occupied by the request for training signal of the transmission modes and/or a resource occupied by the request for training signal of the receiving modes; and signaling information transmitted by the serving communication node.

Optionally, the transmitting, by the first communication node, the feedback information to the serving communication node includes one of: randomly selecting, by the first communication node, a resource from a plurality of available resources and transmitting the feedback information and/or identification information of the first communication node to the serving communication node on the selected resource; and randomly selecting, by the first communication node, a resource from the plurality of available resources, transmitting request information to the serving communication node on the selected resource, and transmitting the feedback information and/or the identification information of the first communication node to the serving communication node after receiving acknowledgement information from the serving communication node for the request information. The resources include at least one of: a time domain resource, a frequency domain resource, a code domain resource, and a receiving mode resource corresponding to the serving communication node.

Optionally, the transmitting, by the first communication node, the feedback information to the serving communication node includes at least one of: after the first communication node transmits the feedback information to a second communication node for predetermined times, or in a case where the first communication node fails to receive acknowledgement information from the second communication node after predetermined time, transmitting, by the first communication node, the feedback information to the third communication node; and transmitting, by the first communication node, the feedback information to the third communication node in a case where link performances of all transmission links from the second communication node to the first communication node are lower than a second predetermined threshold.

Optionally, the receiving modes includes at least one of: receiving beams used by a communication node for receiving a signal, receiving ports used by the communication node for receiving the signal, receiving precoding matrixes used by the communication node for receiving the signal, and receiver algorithms used by the communication node for receiving the signal. The transmission modes includes at least one of: transmission beams used by a communication node for transmitting a signal, transmission ports used by the communication node for transmitting the signal, transmission precoding matrixes used by the communication node for transmitting the signal, transmission time used by the communication node for transmitting the signal, transmission frequencies used by the communication node for transmitting the signal, transmission manners used by the communication node for transmitting the signal, and transmission carriers used by the communication node for transmitting the signal. The transmission manners includes a transmit diversity transmission manner and a repeated transmission manner.

Optionally, the method further includes: determining, by the first communication node, that the first type of transmission link fails through one of the following manners: determining that the first type of transmission link fails when link performances of all transmission links contained in the first type of transmission link are lower than a predetermined threshold; and determining that the first type of transmission link fails when a link performance of any transmission link contained in the first type of transmission link is lower than the predetermined threshold; and/or the transmitting, by the first communication node, the feedback information to the serving communication node includes: transmitting the feedback information to the serving communication node when detecting that the first type of transmission link fails N1 times. The first type of transmission link includes one or more transmission links and N1 is a natural number.

Optionally, the feedback information further includes at least one of: information indicating that the first type of transmission link does not fail; and reception quality information on the first type of transmission link.

Optionally, the method includes at least one of: transmitting simultaneously, by the first communication node, the feedback information to the second communication node and the third communication node; determining, by the first communication node, a successful transmission of the feedback information when the first communication node receives acknowledgement information returned by any one of the second communication node and the third communication node; transmitting, by the first communication node, the feedback information in a contention manner; receiving, by the first communication node, first signaling information, where the first signaling information is used for indicating resource information of a control channel resource; and receiving, by the first communication node, second signaling information, where the second signaling information is used for indicating a transmission situation of the control channel resource in one time unit. The control channel resource includes at least one of: a time domain resource, a frequency domain resource, and transmission link information associated with the control channel resource.

Optionally, the method further includes: detecting, by the first communication node, a control channel in a last real-time detection period in one time unit; and adjusting data transmission with the serving communication node according to the detected control channel.

Optionally, after transmitting the feedback information, the method further comprises: adjusting, by the first communication node, the communication links with the serving communication node by one of the following: switching, by the first communication node, the communication links to a second type of transmission link; and switching, by the first communication node, the communication links to Q transmission links among the M preferred transmission links. The first communication node monitors at least one of a control channel, a data channel, and a reference signal transmitted by the serving communication node on the switched communication link, and/or the first communication node performs link tracking on the switched communication link. The second type of transmission link includes one or more transmission links, the second type of transmission link is a predetermined transmission link, or the second type of transmission link is obtained according to the first type of transmission link The Q transmission links do not include a transmission link indicated as a failure and Q is a natural number less than or equal to M.

Optionally, the transmitting, by the first communication node, the feedback information to the serving communication node includes one of: transmitting, by the first communication node, the feedback information on a dedicated resource; and transmitting, by the first communication node, the feedback information on a common resource.

Optionally, after the transmitting, by the first communication node, the feedback information, the method further includes: monitoring, by the first communication node, acknowledgement information transmitted by the serving communication node.

Optionally, the monitoring, by the first communication node, the acknowledgement information transmitted by the serving communication node includes one of: monitoring, by the first communication node, the acknowledgement information on the first type of transmission link; monitoring, by the first communication node, the acknowledgement information on Q transmission links among the M preferred transmission links; and monitoring, by the first communication node, the acknowledgement information on a predetermined third type of transmission link; where Q is a natural number less than or equal to M.

Optionally, the method comprises at least one of the following: a demodulation reference signal of a channel carrying the acknowledgement information have a quasi-co-location relationship with the first type of transmission link; the demodulation reference signal of the channel carrying the acknowledgement information have the quasi-co-location relationship with one or more of the M preferred transmission links; and the demodulation reference signal of the channel carrying the acknowledgement information have the quasi-co-location relationship with a predetermined third type of transmission link.

Another embodiment of the present disclosure provides an information feedback method. The method includes: detecting, by a serving communication node, feedback information for indicating a status of communication links between a first communication node and the serving communication node transmitted by the first communication node. The feedback information includes at least one of: failure information of a first type of transmission link, a request for training signal of transmission modes and/or a request for training signal of receiving modes, and indication information of M preferred transmission links, and the first type of transmission link and the M preferred transmission links include transmission links from the serving communication node to the first communication node, where M is a positive integer greater than or equal to 1. The serving communication node includes a second communication node and/or a third communication node.

Optionally, in a case where the feedback information has been detected by the third communication node, the method further includes: transmitting, by the third communication node, the feedback information to the second communication node.

Optionally, the detecting, by a serving communication node, feedback information for indicating a status of communication links between a first communication node and the serving communication node transmitted by the first communication node includes one of: detecting and receiving, by the serving communication node, the feedback information transmitted by the first communication node on a dedicated resource used by the first communication node for transmitting the feedback information; and detecting and receiving, by the serving communication node, the feedback information and/or resource request information transmitted by the first communication node on a common resource used by the first communication node for transmitting the feedback information. The resource request information represents a resource requested by the first communication node for transmitting the feedback information from the serving communication node, the dedicated resource includes a dedicated resource allocated to the first communication node, and the common resource includes a common resource allocated to the first communication node and a preset communication node.

Optionally, in a case where the feedback information transmitted by the first communication node has been detected by the serving communication node, the method further includes at least one of: stopping immediately, by the serving communication node, information transmission on the first type of transmission link to the first communication node; stopping, by the serving communication node, information transmission on the first type of transmission link to the first communication node after receiving the feedback information for predetermined times; stopping, by the serving communication node, information transmission on the first type of transmission link to the first communication node after predetermined time; starting, by the serving communication node, a timer for restoring the communication links with the first communication node; and transmitting, by the serving communication node, a training signal on a predetermined resource. The predetermined resource is acquired according to at least one of: the feedback information, relevant information to the first type of transmission link, transmission modes of the first communication node for transmitting the feedback information, and receiving modes of the serving communication node for receiving the feedback information. The training signal includes a training signal for the transmission modes and/or a training signal for the receiving modes.

Optionally, before the transmitting, by the serving communication node, the training signal, the method further includes: transmitting, by the serving communication node, signaling information to the first communication node. The signaling information is used for indicating transmission modes for the training signal.

Optionally, the transmitting, by the serving communication node, the training signal includes: transmitting, by the second communication node, the training signal. The transmitting, by the serving communication node, the signaling information to the first communication node includes: transmitting, by the third communication node, the signaling information to the first communication node.

Optionally, in a case where the feedback information has been detected by the serving communication node, the method further includes: adjusting, by the serving communication node, the communication links with the first communication node.

Optionally, in a case where the feedback information detected by the serving communication node includes the M preferred transmission links, the method further includes: selecting, by the serving communication node, Q transmission links from the M preferred transmission links; and transmitting, by the serving communication node, information on the Q transmission links to the first communication node; where Q is a positive integer less than or equal to M.

Optionally, the transmitting, by the serving communication node, the information on the Q transmission links to the first communication node includes: stopping, by the serving communication node, information transmission on the first type of transmission link to the first communication node; and transmitting, by the serving communication node, the information on the selected Q transmission links to the first communication node.

Optionally, in a case where the feedback information transmitted by the first communication node has been detected by the serving communication node, the method further includes: transmitting, by the serving communication node, acknowledge information of the feedback information to the first communication node.

Optionally, in a case where the feedback information includes indication information of the M preferred transmission links, the transmitting, by the serving communication node, the acknowledge information of the feedback information to the first communication node includes: transmitting, by the serving communication node, the acknowledge information to the first communication node on one or more of the M preferred transmission links.

Optionally, the receiving modes includes at least one of: receiving beams used by a communication node for receiving a signal, receiving ports used by the communication node for receiving the signal, receiving precoding matrixes used by the communication node for receiving the signal, and receiver algorithms used by the communication node for receiving the signal. The transmission modes includes at least one of: transmission beams used by a communication node for transmitting a signal, transmission ports used by the communication node for transmitting the signal, transmission precoding matrixes used by the communication node for transmitting the signal, transmission time used by the communication node for transmitting the signal, transmission frequencies used by the communication node for transmitting the signal, transmission manners used by the communication node for transmitting the signal, and transmission carriers used by the second communication node for transmitting the signal. The transmission manners includes a transmit diversity transmission manner and a repeated transmission manner.

Optionally, the feedback information further includes at least one of: information indicating that the first type of transmission link does not fail; and reception quality information on the first type of transmission link.

Optionally, the method further includes at least one of: transmitting, by the serving communication node, first signaling information to the first communication node, where the first signaling information is used for indicating resource information of a control channel resource; and transmitting, by the serving communication node, second signaling information to the first communication node, where the second signaling information is used for indicating a transmission situation of the control channel resource in one time unit. The control channel resource includes at least one of: a time domain resource, a frequency domain resource, and transmission link information associated with the control channel resource.

Optionally, the method further includes: adjusting, by the serving communication node, data transmission with the first communication node in one time unit; and transmitting, by the serving communication node, a control channel in a late real-time detection period in one time unit. The control channel includes adjustment information.

Optionally, after the feedback information has been detected by the serving communication node, the method further includes: adjusting, by the serving communication node, the communication links with the first communication node by one of the following: switching, by the serving communication node, the communication links to a second type of transmission link; and switching, by the serving communication node, the communication links to Q transmission links among the M preferred transmission links. The serving communication node transmits at least one of a control channel, a data channel, and a reference signal to the first communication node on the switched communication link. The second type of transmission link includes one or more transmission links, the second type of transmission link is a predetermined transmission link, or the second type of transmission link is obtained according to the first type of transmission link. The Q transmission links do not include a transmission link indicated as a failure and Q is a natural number less than or equal to M.

Optionally, the transmitting, by the serving communication node, the acknowledge information to the first communication node includes one of: transmitting, by the serving communication node, the acknowledgement information on the first type of transmission link; transmitting, by the serving communication node, the acknowledgement information on Q transmission links among the M preferred transmission links; and transmitting, by the serving communication node, the acknowledgement information on a predetermined third type of transmission link; where Q is a natural number less than or equal to M.

Optionally, the method further include: transmitting, by the serving communication node, control information to the first communication node. The control information indicates at least one of: a demodulation reference signal of a channel carrying the acknowledgement information having a quasi-co-location relationship with the first type of transmission link; a demodulation reference signal of a channel carrying the acknowledgement information having a quasi-co-location relationship with one or more of the M preferred transmission links; and the demodulation reference signal of the channel carrying the acknowledgement information having the quasi-co-location relationship with a predetermined third type of transmission link.

Another embodiment of the present embodiment provides an information feedback device, applied to a first communication node. The device includes: a determination module, which is configured to determine feedback information for indicating a status of communication links between the first communication node and a serving communication node, where the feedback information includes at least one of: failure information of a first type of transmission link, a request for training signal of transmission modes and/or a request for training signal of receiving modes, or indication information of M preferred transmission links, and the first type of transmission link and the M preferred transmission links include transmission links from the serving communication node to the first communication node, where M is a positive integer greater than or equal to 1; and a first transmission module, which is configured to transmit the feedback information to the serving communication node. The serving communication node includes a second communication node and/or a third communication node.

Another embodiment of the present embodiment provides an information feedback device, applied to a serving communication node. The device includes: a detection module, which is configured to detect feedback information for indicating a status of communication links between a first communication node and the serving communication node transmitted by the first communication node. The feedback information includes at least one of: failure information of a first type of transmission link, a request for training signal of transmission modes and/or a request for training signal of receiving modes, and indication information of M preferred transmission links, and the first type of transmission link and the M preferred transmission links include transmission links from the serving communication node to the first communication node, where M is a positive integer greater than or equal to 1. The serving communication node includes a second communication node and/or a third communication node.

Another embodiment of the present embodiment provides an information feedback system, including a first communication node and a serving communication node. The first communication node is configured to determine feedback information for indicating a status of communication links between the first communication node and the serving communication node and transmit the feedback information to the serving communication node. The serving communication node is configured to detect the feedback information transmitted by the first communication node. The feedback information includes at least one of: failure information of a first type of transmission link, a request for training signal of transmission modes and/or a request for training signal of receiving modes, and indication information of M preferred transmission links, and the first type of transmission link and the M preferred transmission links include transmission links from the serving communication node to the first communication node, where M is a positive integer greater than or equal to 1. The serving communication node includes a second communication node and/or a third communication node.

Another embodiment of the present disclosure provides a storage medium. The storage medium includes a stored program which, when executed, performs the method of any one of the embodiments described above.

Another embodiment of the present disclosure provides a processor. The processor is used for executing a program, which, when executed, performs the method of any one of the embodiments described above.

In the present disclosure, the first communication node determines the feedback information for indicating the status of the communication link between the first communication node and the serving communication node. The feedback information includes at least one of: the failure information of the first type of transmission link, the request for training signal of the transmission modes and/or the request for training signal of the receiving modes, or the indication information of the M preferred transmission links, and the first type of transmission link and the M preferred transmission links include the transmission link from the second communication node and/or the third communication node to the first communication node, where M is a positive integer greater than or equal to 1. The first communication node transmits the feedback information to the serving communication node. The serving communication node includes the second communication node and/or the third communication node. It can be seen that the above solutions enable the first communication node to transmit the determined feedback information indicating the status of the communication link between the first communication node and the serving communication node to the serving communication node, so that the first communication node and the serving communication node both may learn the status of the communication link between the two nodes. Therefore, a receiving end and a transmitting end can learn the status of the communication link between them in time, thereby effectively increasing a resource utilization rate and solving the problem in the existing art of a low resource utilization rate because the receiving end and the transmitting end cannot learn a communication link failure in time.

BRIEF DESCRIPTION OF DRAWINGS

The accompanying drawings described herein are used to provide a further understanding of the present disclosure, and form a part of the present application. The exemplary embodiments and descriptions thereof in the present disclosure are used to explain the present disclosure and do not limit the present disclosure in any improper way. The accompanying drawings are as follows.

DETAILED DESCRIPTION

The present disclosure will be described hereinafter in detail through embodiments with reference to the accompanying drawings. It is to be noted that if not in collision, the embodiments and features therein in the present application may be combined with each other.

It is to be noted that the terms "first", "second" and the like in the description, claims and above accompanying drawings of the present disclosure are used to distinguish similar objects and are not necessarily used to describe a particular order or sequence.

Embodiment 1

Figure 1:
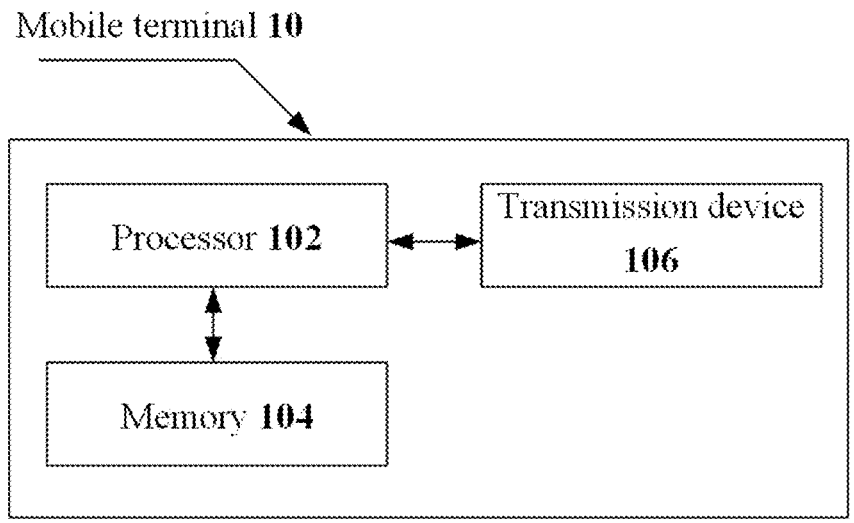
FIG. 1 is a block diagram of hardware of a mobile terminal of an information feedback method according to an embodiment of the present disclosure.

A method embodiment provided by the embodiment 1 of the present application may be executed in a mobile terminal, a computer terminal or other similar computing devices. Taking the method to be executed in the mobile terminal as an example, FIG. 1 is a block diagram of hardware of a mobile terminal of an information feedback method according to an embodiment of the present disclosure. As shown in FIG. 1, a mobile terminal 10 may include one or more (only one is shown in FIG. 1) processors 102 (the processor 102 may include, but is not limited to, a microprocessor MCU, or a processing device such as a programmable logic device FPGA), a memory 104 used for storing data, and a transmission device 106 used for implementing a communication function. It will be understood by those skilled in the art that the structure shown in FIG. 1 is merely illustrative, and not intended to limit the structure of the electronic device described above. For example, the mobile terminal 10 may further include more or fewer components than the components shown in FIG. 1, or has a configuration different from the configuration shown in FIG. 1.

The memory 104 may be used for storing software programs and modules of application software, such as program instructions/modules corresponding to the information feedback method in the embodiments of the present disclosure. The processor 102 executes the software programs and modules stored in the memory 104 so as to perform various function applications and data processing, that is, to implement the method described above. The memory 104 may include a high-speed random access memory and a nonvolatile memory, such as one or more magnetic storage devices, flash memories or other nonvolatile solid-state memories. In some examples, the memory 104 may further include memories that are remotely disposed with respect to the processors 102. These remote memories may be connected to the mobile terminal 10 via a network. Examples of such a network include, but are not limited to, the Internet, intranets, local area networks, mobile communication networks, and combinations thereof.

The transmission device 106 is used for receiving or sending data via one network. Specific examples of such a network may include a wireless network provided by a communication provider of the mobile terminal 10. In one example, the transmission device 106 includes a Network Interface Controller (NIC), which may be connected to other network devices via a base station, thereby communicating with the Internet. In one example, the transmission 106 may be a radio frequency (RF) module, which is configured to communicate with the Internet in a wireless way.

Figure 2:
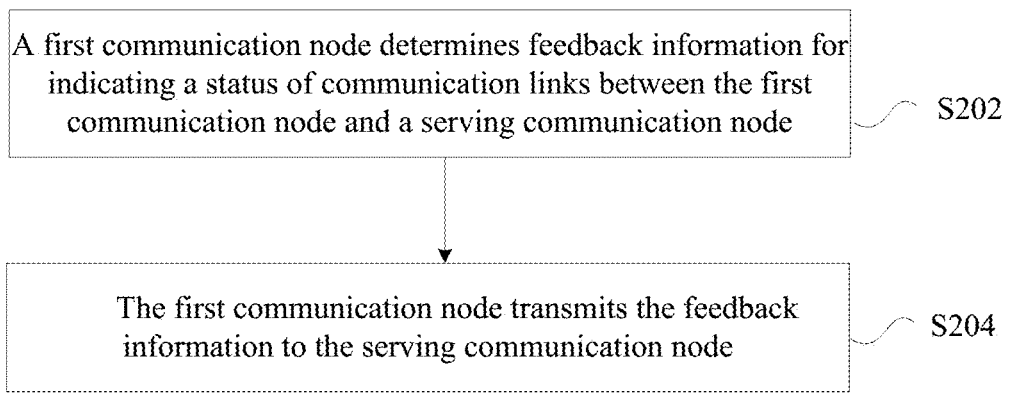
FIG. 2 is a flowchart 1 of an information feedback method according to an embodiment of the present disclosure.

This embodiment provides an information feedback method. FIG. 2 is a flowchart 1 of an information feedback method according to an embodiment of the present disclosure. As shown in FIG. 2, the method includes the steps described below.

In step S202, a first communication node determines feedback information for indicating a status of communication links between the first communication node and a serving communication node. The feedback information includes at least one of: failure information of a first type of transmission link, a request for training signal of transmission modes and/or a request for training signal of receiving modes, and indication information of M preferred transmission links. The first type of transmission link and the M preferred transmission links include a transmission link from a second communication node and/or a third communication node to the first communication node, where M is a positive integer greater than or equal to 1.

In step S204, the first communication node transmits the feedback information to the serving communication node. The serving communication node includes the second communication node and/or the third communication node.

Optionally, the information feedback method described above may, but is not limit to, be applied to a scenario where a communication link needs to be restored, for example, a scenario where a communication link is being restored when the communication link fails in high frequency communications.

Optionally, the information feedback method described above may but is not limit to, be applied to a terminal such as a mobile phone, a tablet computer, a laptop and a smart wearable device.

In the above steps, the first communication node determines the feedback information for indicating the status of the communication link between the first communication node and the serving communication node, the feedback information includes at least one of: the failure information of the first type of transmission link, the request for training signal of the transmission modes and/or the request for training signal of the receiving modes, and the indication information of the M preferred transmission links, and the first type of transmission link and the M preferred transmission links include the transmission link from the second communication node and/or the third communication node to the first communication node, where M is a positive integer greater than or equal to 1; and the first communication node transmits the feedback information to the serving communication node, the serving communication node includes the second communication node and/or the third communication node. It can be seen that the above solution enables the first communication node to transmit the determined feedback information for indicating the status of the communication link between the first communication node and the serving communication node to the serving communication node, so that the first communication node and the serving communication node both may learn the status of the communication link between the two nodes. Therefore, a receiving end and a transmitting end can learn the status of the communication link between them in time, thereby effectively increasing a resource utilization rate and solving the problem in the existing art of a low resource utilization rate because the receiving end and the transmitting end cannot learn a communication link failure in time.

Optionally, the first communication node may, but is not limited to, transmit the feedback information to the serving communication node in one of the following manners.

A manner 1: The first communication node determines whether the first type of transmission link fails according to a signal transmitted by the serving communication node and transmits the feedback information to the serving communication node when it is determined that the first type of transmission link fails.

A manner 2: The first communication node transmits the feedback information to the serving communication node according to trigger signaling information transmitted by the serving communication node.

A manner 3: The first communication node transmits the feedback information to the serving communication node according to a periodic resource configured by the serving communication node.

A manner 4: The first communication node determines whether a trigger condition is satisfied, continues to perform detection if the trigger condition is not satisfied, and transmits the feedback information to the serving communication node if the trigger condition is satisfied.

Optionally, the signal transmitted by the serving communication node may include, but is not limited to, at least one of: a demodulation reference signal transmitted by the serving communication node on one or more transmission links, a sounding signal transmitted by the serving communication node on a first type of transmission link, and a training signal for transmission modes and/or a training signal for receiving modes transmitted by the serving communication node on a plurality of transmission links. The demodulation reference signal includes a demodulation reference signal on a control channel resource and/or a demodulation reference signal on a data channel resource.

Optionally, the feedback information is used for indicating at least one of the following to the serving communication node: a link performance of a signal transmitted by the serving communication node on the first type of transmission link to the first communication node is lower than a first predetermined threshold; a signal transmitted by the serving communication node on the first type of transmission link fails to reach the first communication node; a link performance of a signal transmitted by the serving communication node on another preset transmission link other than the first type of transmission link to the first communication node is superior to the link performance of the signal transmitted by the serving communication node on the first type of transmission link; the serving communication node needs to stop transmitting a signal on the first type of transmission link to the first communication node; or the first communication node will stop detecting control information, receiving data, and/or tracking links on the first type of transmission link.

Optionally, the M preferred transmission links may be, but are not limited to, preferred transmission links of N candidate transmission links, whose link performances of transmitting to the first communication node satisfy a predetermined condition; and/or the link performances of the M preferred transmission links are higher than a second predetermined threshold; where N is a positive integer greater than M.

Optionally, the first communication node may, but is not limited to, acquire information of the N candidate transmission links through one of the following manners.

A manner 1: The first communication node acquires the information of the N candidate transmission links according to a system broadcast message transmitted by the serving communication node.

A manner 2: The first communication node acquires the information of the N candidate transmission links according to an agreed rule with the serving communication node in a training phase.

A manner 3: The first communication node acquires the information of the N candidate transmission links according to an agreed rule with the serving communication node.

A manner 4: The first communication node acquires the information of the N candidate transmission links according to a transmission link constraint set transmitted by the serving communication node.

A manner 5: The first communication node acquires the information of the N candidate transmission links according to all transmission links corresponding to the serving communication node.

Optionally, the first communication node may, but is not limited to, acquire a value of M through at least one of the following manners: the first communication node acquires the value of M according to a value of N; the first communication node acquires the value of M according to the agreed rule with the serving communication node; and the first communication node acquires the value of M according to link performances of the N candidate transmission links to the serving communication node and the second predetermined threshold.

Optionally, the first communication node may, but is not limited to, acquire the M preferred transmission links according to at least one of: the demodulation reference signal transmitted by the serving communication node on the one or more transmission links, the training signal for transmission modes and/or the training signal receiving modes transmitted by the serving communication node on one or more transmission links, and a signal periodically transmitted by the serving communication node. The demodulation reference signal includes a demodulation reference signal on the control channel resource and/or a demodulation reference signal on the data channel resource.

Optionally, after the above step S204, the first communication node may, but is not limited to, adjust the communication link between the first communication node and the serving communication node according to response information received from the serving communication node and/or the feedback information. In this embodiment, the response information may also be referred to as acknowledgement information for the feedback information.

Optionally, in the above step S204, the first communication node may, but is not limited to, transmit the feedback information in a first transmission mode, and monitors acknowledgement information from the serving communication node. The first communication node transmits the feedback information in a second transmission mode and monitors the acknowledgement information from the serving communication node in a case where the acknowledgement information from the serving communication node is not received after first predetermined time and/or predetermined transmission times are exceeded. The first communication node initiates a process to re-access a network, or stops transmitting the feedback information to the serving communication node, or transmits the feedback information to the serving communication node at a second carrier frequency in a case where the acknowledgement information from the serving communication node is not received after second predetermined time is exceeded and/or all transmission modes at a first carrier frequency are traversed.

Optionally, in the above step S204, the first communication node may, but is not limited to, transmit the feedback information to the serving communication node in a plurality of transmission modes, and monitor the acknowledgement information from the serving communication node. The first communication node acknowledges a successful transmission of the feedback information in a case where the acknowledgement information transmitted by the serving communication node is received the first communication node.

Optionally, the first communication node may further, but is not limited to, transmit a cell handover request to the serving communication node under a preset condition. The preset condition may include, but is not limited to, one of the following: in one receiving mode, link performances of all transmission links from the serving communication node to the first communication node at the first carrier frequency are lower than a third predetermined threshold; in traversing all receiving modes, the link performances of all the transmission links from the serving communication node to the first communication node at the first carrier frequency are all lower than a fourth predetermined threshold; or the first communication node fails to receive acknowledgement information corresponding to the feedback information transmitted by the serving communication node.

Optionally, before the above step S202, the first communication node transmits a request for training signal to the serving communication node and determines the M preferred transmission links according to a training signal for transmission modes and/or a training signal for receiving modes received from the serving communication node in a case where the first communication node determines that the first type of transmission link fails and/or the first communication node determines that link performances of all transmission links from the serving communication node to the first communication node in a current receiving mode are lower than a fifth predetermined threshold. The request for training signal includes the request for training signal of the transmission modes and/or the request for training signal of the receiving modes.

Optionally, after the first communication node transmits the request for training signal to the serving communication node, the first communication node may, but is not limited to, determine resources occupied by the training signal for the transmission modes and/or the training signal for the receiving modes according to at least one of the following: the request for training signal of the transmission modes and/or the receiving modes, a resource occupied by a request for training signal of the transmission modes and/or the receiving modes, and signaling information transmitted by the serving communication node.

Optionally, the above step S204 may include, but is not limited to, one of the following: the first communication node randomly selects a resource from a plurality of available resources and transmits the feedback information and/or identification information of the first communication node to the serving communication node on the selected resource; the first communication node randomly selects a resource from the plurality of available resources, transmits request information to the serving communication node on the selected resource, and transmits the feedback information and/or the identification information of the first communication node to the serving communication node after receiving acknowledgement information from the serving communication node for the request information. The resources include at least one of: a time domain resource, a frequency domain resource, a code domain resource, and a receiving mode resource corresponding to the serving communication node.

Optionally, the above step S204 may include, but is not limited to, at least one of the following: after the first communication node transmits the feedback information to the second communication node for predetermined times, or in a case where the first communication node fails to receive acknowledgement information from the second communication node after predetermined time, the first communication node transmits the feedback information to the third communication node; the first communication node transmits the feedback information to the third communication node in a case where link performances of all transmission links from the second communication node to the first communication node are lower than the second predetermined threshold.

Optionally, the receiving modes may include, but are not limited to, at least one of: receiving beams used by a communication node for receiving a signal, receiving ports used by the communication node for receiving the signal, receiving precoding matrixes used by the communication node for receiving the signal, and receiver algorithms used by the communication node for receiving the signal. The transmission modes may include, but are not limited to, at least one of: transmission beams used by a communication node for transmitting a signal, transmission ports used by the communication node for transmitting the signal, transmission precoding matrixes used by the communication node for transmitting the signal, transmission time used by the communication node for transmitting the signal, transmission frequencies used by the communication node for transmitting the signal, transmission manners used by the communication node for transmitting the signal, and transmission carriers used by the communication node for transmitting the signal. The transmission manners includes a transmit diversity transmission manner and a repeated transmission manner.

Optionally, the method further includes the step in which the first communication node determines that the first type of transmission link fails through one of the following manners: it is determined that the first type of transmission link fails when link performances of all transmission links included in the first type of transmission link are lower than a predetermined threshold or it is determined that the first type of transmission link fails when link performance of any transmission link included in the first type of transmission link is lower than the predetermined threshold.

The step in which the first communications node transmits the feedback information to the serving communications node includes: transmitting the feedback information to the serving communications node when it is detected that the first type of transmission link fails for N1 times. The first type of transmission link includes one or more transmission links and N1 is a natural number.

Optionally, the feedback information further includes at least one of: information indicating that the first type of transmission link does not fail or reception quality information on the first type of transmission link.

Optionally, the method includes at least one of the steps described below. The first communication node transmits simultaneously the feedback information to the second communication node and the third communication node. The first communication node determines a successful transmission of the feedback information when the first communication node receives acknowledgement information returned by any one of the second communication node and the third communication node. The first communication node transmits the feedback information in a contention manner. The first communication node receives first signaling information, where the first signaling information is used for indicating resource information of a control channel resource. The first communication node receives second signaling information, where the second signaling information is used for indicating a transmission situation of the control channel resource in one time unit. The control channel resource includes at least one of: a time domain resource, a frequency domain resource, and transmission link information associated with the control channel resource. In this embodiment, both the first signaling information and the second signaling information may be higher layer control signaling and/or physical layer dynamic control signaling.

Optionally, the method further includes the following step: the first communication node detects a control channel in a last real-time detection period in one time unit and adjusts data transmission with the serving communication node according to the detected control channel.

Optionally, after transmitting the feedback information, the first communication node adjusts the communication links with the serving communication node by one of the following methods: the first communication node switches the communication links to a second type of transmission link; and the first communication node switches the communication links to Q transmission links among the M preferred transmission links. The first communication node monitors at least one of a control channel, a data channel, and a reference signal transmitted by the serving communication node on the switched communication link and/or the first communication node performs link tracking on the switched communication link. The second type of transmission link includes one or more transmission links, the second type of transmission link is a predetermined transmission link, or the second type of transmission link is acquired according to the first type of transmission link. The Q transmission links do not include a transmission link indicated as a failure and Q is a natural number less than or equal to M.

Optionally, the step in which the first communication node transmits the feedback information to the serving communication node includes one of the following steps: the first communication node transmits the feedback information on a dedicated resource, and the first communication node transmits the feedback information on a common resource. In this implementation, when the dedicated resource is used for transmitting the feedback information, the first communication node does not transmit the identification information of the first communication node to the serving communication node, and/or the first communication node does not transmit repeatedly the feedback information on the dedicated resource, and/or the serving communication node does not transmit the acknowledge information of the feedback information to the first communication node. When the common resource is used for transmitting the feedback information, the first communication node transmits the identification information of the first communication node to the serving communication node, and/or the first communication node transmits repeatedly the feedback information on the common resource, and/or the serving communication node transmits the acknowledge information of the feedback information to the first communication node.

Optionally, after the first communication node transmits the feedback information, the method further includes the following step: the first communication node monitors the acknowledgement information transmitted by the serving communication node.

Optionally, the step in which the first communication node monitors the acknowledgement information transmitted by the serving communication node includes one of the following steps: the first communication node monitors the acknowledgement information on the first type of transmission link; the first communication node monitors the acknowledgement information on the Q transmission links among the M preferred transmission links; and the first communication node monitors the acknowledgement information on a predetermined third type of transmission link. Q is a natural number less than or equal to M.

Optionally, a demodulation reference signal of a channel carrying the acknowledgement information has a quasi-co-location relationship with the first type of transmission link; the demodulation reference signal of the channel carrying the acknowledgement information has the quasi-co-location relationship with one or more of the M preferred transmission links; or the demodulation reference signal of the channel carrying the acknowledgement information has the quasi-co-location relationship with the predetermined third type of transmission link.

Embodiment 2

Figure 3:
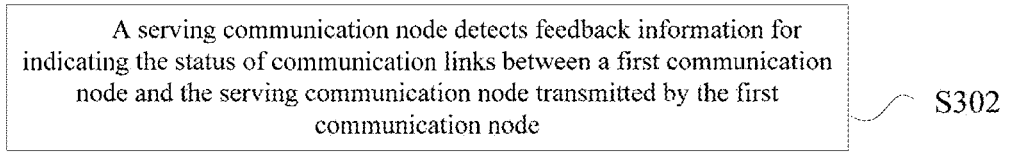
FIG. 3 is a flowchart 2 of an information feedback method according to an embodiment of the present disclosure.

This embodiment provides an information feedback method. FIG. 3 is a flowchart 2 of an information feedback method according to an embodiment of the present disclosure. As shown in FIG. 3, the method includes the step described below.

In step S302, a serving communication node detects feedback information for indicating a status of communication links between a first communication node and the serving communication node transmitted by the first communication node. The feedback information includes at least one of: failure information of a first type of transmission link, a request for training signal of transmission modes and/or a request for training signal of receiving modes, and indication information of M preferred transmission links and the first type of transmission link, and the M preferred transmission links include transmission links from the serving communication node to the first communication node, where M is a positive integer greater than or equal to 1.

The serving communication node includes a second communication node and/or a third communication node.

Optionally, the information feedback method described above may, but is not limited to, be applied to a scenario where a communication link needs to be recovered, for example, a scenario where a communication link is being restored when the communication link fails in high frequency communications.

Optionally, the information feedback method described above may, but is not limited to, be applied to a base station, such as a macro base station, a micro base station and a home base station.

In the above steps, the serving communication node detects the feedback information for indicating the status of the communication link between the first communication node and the serving communication node transmitted by the first communication node. The feedback information includes at least one of: the failure information of the first type of transmission link, the request for training signal of the transmission modes and/or the request for training signal of the receiving modes, or the indication information of the M preferred transmission links, and the first type of transmission link and the M preferred transmission links include the transmission link from the second communication node and/or the third communication node to the first communication node, where M is a positive integer greater than or equal to 1. The serving communication node includes the second communication node and/or the third communication node. It can be seen that the above solution enable the serving communication node to detect the feedback information for indicating the status of the communication link between the first communication node and the serving communication node transmitted by the first communication node, so that the first communication node and the serving communication node both may learn the status of the communication link between the two nodes. Therefore, a receiving end and a transmitting end can learn the status of the communication link between them in time, thereby effectively increasing a resource utilization rate and solving the problem in the existing art of a low resource utilization rate because the receiving end and the transmitting end cannot learn a communication link failure in time.

Optionally, the third communication node may be applied, but is not limited to, transmit the feedback information to the second communication node in a case where the third communication node detects the feedback information.

Optionally, the manner in which the serving communication node detects and receives the feedback information may include, but is not limited to, one of the following manners:

A manner one: The serving communication node detects and receives the feedback information transmitted by the first communication node on a dedicated resource used by the first communication node for transmitting the feedback information.

A manner two: The serving communication node detects and receives the feedback information and/or resource request information transmitted by the first communication node on a common resource used by the first communication node for transmitting the feedback information.

The resource request information represents a resource requested by the first communication node for transmitting the feedback information from the serving communication node. The dedicated resource includes dedicated resources allocated to the first communication node and the common resource includes common resources allocated to the first communication node and a preset communication node.

Optionally, in a case where the feedback information is detected, the serving communication node may, but is not limited to, perform at least one of the following operations.

An operation one: The serving communication node stop immediately transmitting information on the first type of transmission link to the first communication node.

An operation two: The serving communication node stops transmitting information on the first type of transmission link to the first communication node after receiving the feedback information for predetermined times.

An operation three: The serving communication node stops transmitting information on the first type of transmission link to the first communication node after predetermined time.

An operation four: The serving communication node starts a timer for restoring the communication links with the first communication node.

An operation five: The serving communication node transmits a training signal on a predetermined resource. The predetermined resource is acquired according to at least one of: the feedback information, related information to the first type of transmission link, transmission modes of the first communication node for transmitting the feedback information, and receiving modes of the serving communication node for receiving the feedback information.

The training signal may include, but is not limited to, a training signal for the transmission modes and/or a training signal for the receiving modes.

Optionally, before the serving communication node transmits the training signal, the serving communication node may, but is not limited to, transmit signaling information to the first communication node. The signaling information is used for indicating transmission modes for the training signal.

Optionally, the serving communication node that transmits the training signal may be, but is not limited to, the second communication node. The serving communication node that transmits the signaling information to the first communication node may be, but is not limited to, the third communication node.

Optionally, in a case where the feedback information is detected, the serving communication node may, but is not limited to, adjust the communication links to the first communication node.

Optionally, in a case where the feedback information detected by the serving communication node includes the M preferred transmission links, the serving communication node may, but is not limited to, adjust Q transmission links from the M preferred transmission links and transmit information on the Q transmission links to the first communication node. Q is a positive integer less than or equal to M.

Optionally, when the serving communication node transmits the information on the Q transmission links to the first communication node, the serving communication node may, but is not limited to, stop transmitting the information on the first type of transmission link to the first communication node and transmit the information on the selected Q transmission links to the first communication node.

Optionally, in a case where the feedback information is detected, the serving communication node may, but is not limited to, transmit acknowledge information of the feedback information to the first communication node.

Optionally, in a case where the feedback information includes the indication information of the M preferred transmission links, the serving communication node may, but is not limited to, transmit the acknowledge information to the first communication node on one or more of the M preferred transmission links.

Optionally, the receiving modes may include, are not limited to, at least one of: receiving beams used by a communication node for receiving a signal, receiving ports used by the communication node for receiving the signal, receiving precoding matrixes used by the communication node for receiving the signal, or receiver algorithms used by the communication node for receiving the signal. The transmission modes may include, but are not limited to, at least one of: transmission beams used by a communication node for transmitting a signal, transmission ports used by the communication node for transmitting the signal, transmission precoding matrixes used by the communication node for transmitting the signal, transmission time used by the communication node for transmitting the signal, transmission frequencies used by the communication node for transmitting the signal, transmission manners used by the communication node for transmitting the signal, and transmission carriers used by the communication node for transmitting the signal. The transmission manners includes a transmit diversity transmission manner and a repeated transmission manner.

Optionally, the feedback information further includes at least one of: information indicating that the first type of transmission link does not fail and reception quality information on the first type of transmission link.

Optionally, the method further includes the steps described below. The serving communication node transmits first signaling information to the first communication node, where the first signaling information is used for indicating resource information of a control channel resource. The serving communication node transmits second signaling information to the first communication node, where the second signaling information is used for indicating a transmission situation of the control channel resource in one time unit. The control channel resource includes at least one of: a time domain resource, a frequency domain resource, and transmission link information associated with the control channel resource.

Optionally, the method further includes the following steps: the serving communication node adjusts data transmission with the first communication node in one time unit and the serving communication node transmits a control channel in a late real-time detection period in one time unit. The control channel includes adjustment information.

Optionally, after detecting the feedback information, the serving communication node adjusts the communication links with the first communication node by one of the following methods: the serving communication node switches the communication links to a second type of transmission link; and the serving communication node switches the communication links to the Q transmission links among the M preferred transmission links. The serving communication node transmits at least one of a control channel, a data channel, and a reference signal to the first communication node on the switched communication link. The second type of transmission link includes one or more transmission links, the second type of transmission link is a predetermined transmission link, or the second type of transmission link is acquired according to the first type of transmission link. The Q transmission links do not include a transmission link indicated as a failure and Q is a natural number less than or equal to M.

Optionally, the step in which the serving communication node transmits the acknowledgement information to the first communication node includes one of the following steps: the serving communication node transmits the acknowledgement information on the first type of transmission link; the serving communication node transmits the acknowledgement information on the Q transmission links among the M preferred transmission links; and the serving communication node transmits the acknowledgement information on a predetermined third type of transmission link. Q is a natural number less than or equal to M.

Optionally, the method further includes that the serving communication node transmits control information to the first communication node. The control information indicates at least one of: a demodulation reference signal of a channel carrying the acknowledgement information having a quasi-co-location relationship with the first type of transmission link; the demodulation reference signal of the channel carrying the acknowledgement information having the quasi-co-location relationship with one or more of the M preferred transmission links; and the demodulation reference signal of the channel carrying the acknowledgement information having the quasi-co-location relationship with the predetermined third type of transmission link.

Embodiment 3

This embodiment provides an information feedback device which is applied to a first communication node. The device is used for implementing the above-mentioned embodiments and preferred embodiments. What has been described will not be repeated. As used below, the term "module" may be software, hardware or a combination thereof capable of implementing predetermined functions. The device in the embodiments described below is preferably implemented by software, but implementation by hardware or by a combination of software and hardware is also possible and conceived.

Figure 4:
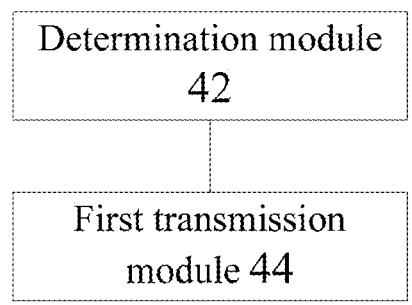
FIG. 4 is a block diagram 1 of an information feedback device according to an embodiment of the present disclosure.

FIG. 4 is a block diagram 1 of an information feedback device according to an embodiment of the present disclosure. As shown in FIG. 4, the device includes the modules described below.

(1) A determination module 42 is configured to determine feedback information for indicating a status of communication links between the first communication node and a serving communication node. The feedback information includes at least one of: failure information of a first type of transmission link, a request for training signal of transmission modes and/or a request for training signal of receiving modes, and indication information of M preferred transmission links. And the first type of transmission link and the M preferred transmission links include a transmission link from a second communication node and/or a third communication node to the first communication node, where M is a positive integer greater than or equal to 1.

(2) A first transmission module 44 is coupled to the determination module 42 and configured to transmit the feedback information to the serving communication node. The serving communication node includes the second communication node and/or the third communication node.

Optionally, the information feedback device described above may, is not limited to, being applied to a scenario where a communication link needs to be recovered, for example, a scenario where a communication link is being restored when the communication link fails in high frequency communications.

Optionally, the information feedback device described above may, but is not limited to, be applied to a terminal such as a mobile phone, a tablet computer, a laptop and a smart wearable device.

In the above device, the determination module determines the feedback information for indicating the status of the communication link between the first communication node and the serving communication node. The feedback information includes at least one of: the failure information of the first type of transmission link, the request for training signal of the transmission modes and/or the request for training signal of the receiving modes, and the indication information of the M preferred transmission links, and the first type of transmission link and the M preferred transmission links include the transmission link from the second communication node and/or the third communication node to the first communication node, where M is a positive integer greater than or equal to 1. The transmission module transmits the feedback information to the serving communication node. The serving communication node includes the second communication node and/or the third communication node. It can be seen that the above solution enables the first communication node to transmit the determined feedback information for indicating the status of the communication link between the first communication node and the serving communication node to the serving communication node, so that the first communication node and the serving communication node both may learn the status of the communication link between the two nodes. Therefore, a receiving end and a transmitting end may learn the status of the communication link between them in time, thereby effectively increasing a resource utilization rate and solving the problem in the existing art of a low resource utilization rate because the receiving end and the transmitting end cannot learn a communication link failure in time.

Optionally, the first transmission module may, but is not limited to, transmit the feedback information to the serving communication node in one of the following manners.

A manner one: The first transmission module determines whether the first type of transmission link fails according to a signal transmitted by the serving communication node and transmits the feedback information to the serving communication node when it is determined that the first type of transmission link fails.

A manner two: The first transmission module transmits the feedback information to the serving communication node according to trigger signaling information transmitted by the serving communication node.

A manner three: The first transmission module transmits the feedback information to the serving communication node according to a periodic resource configured by the serving communication node.

A manner four: The first communication node determines whether a trigger condition is satisfied, continues detection if the trigger condition is not satisfied, and transmits the feedback information to the serving communication node if the trigger condition is satisfied.

Optionally, the signal transmitted by the serving communication node may include, but is not limited to, at least one of: a demodulation reference signal transmitted by the serving communication node on one or more transmission links, a sounding signal transmitted by the serving communication node on the first type of transmission link, and a training signal for the transmission modes and/or a training signal for the receiving modes transmitted by the serving communication node on a plurality of transmission links. The demodulation reference signal includes a demodulation reference signal on a control channel resource and/or a demodulation reference signal on a data channel resource.

Optionally, the feedback information is used for indicating at least one of the following pieces of information to the serving communication node: a link performance of a signal transmitted by the serving communication node on the first type of transmission link to the first communication node is lower than a first predetermined threshold; a signal transmitted by the serving communication node on the first type of transmission link fails to reach the first communication node; a link performance of a signal transmitted by the serving communication node on another preset transmission link other than the first type of transmission link to the first communication node is superior to the link performance of the signal transmitted by the serving communication node on the first type of transmission link; the serving communication node needs to stop transmitting a signal on the first type of transmission link to the first communication node; and the first communication node will stop detecting control information, receiving data, and/or tracking links on the first type of transmission link.

Optionally, the M preferred transmission links may be, but are not limited to, preferred transmission links among N candidate transmission links, whose link performance to the first communication node satisfies a predetermined condition; and/or the link performance of the M preferred transmission links is higher than a second predetermined threshold; where N is a positive integer greater than M.

Optionally, the first transmission module may, but is not limited to, acquire information of the N candidate transmission links in one of the following manners.

A manner 1: The first transmission module acquires the information of the N candidate transmission links according to a system broadcast message transmitted by the serving communication node.

A manner 2: The first transmission module acquires the information of the N candidate transmission links according to an agreed rule with the serving communication node in a training phase.

A manner 3: The first transmission module acquires the information of the N candidate transmission links according to an agreed rule with the serving communication node.

A manner 4: The first transmission module acquires the information of the N candidate transmission links according to a transmission link constraint set transmitted by the serving communication node.

A manner 5: The first communication node acquires the information of the N candidate transmission links according to all transmission links corresponding to the serving communication node.

Optionally, the first transmission module may, but is not limited to, acquire a value of M in at least one of the following manners: the first communication node acquires the value of M according to a value of N; the first communication node acquires the value of M according to the agreed rule with the serving communication node; and the first communication node acquires the value of M according to link performance of the N candidate transmission links to the serving communication node and the second predetermined threshold.

Optionally, the first transmission module may, but is not limited to, acquire the M preferred transmission links according to at least one of: the demodulation reference signal transmitted by the serving communication node on the one or more transmission links, the training signal the transmission modes and/or the training signal for the receiving modes transmitted by the serving communication node on one or more transmission links, and a signal periodically transmitted by the serving communication node. The demodulation reference signal includes the demodulation reference signal on the control channel resource and/or the demodulation reference signal on the data channel resource.

Optionally, the device further includes an adjustment module. The adjustment module is coupled to the first transmission module and configured to adjust the communication link between the first communication node and the serving communication node according to the feedback information and/or response information received from the serving communication node. In this embodiment, the response information may also be referred to as acknowledgement information for the feedback information.

Optionally, the first transmission module may be, but is not limited to, configured to the feedback information in a first transmission mode and monitor the acknowledgement information from the serving communication node. The first communication node transmits the feedback information in a second transmission mode and monitors the acknowledgement information from the serving communication node in a case where the acknowledgement information from the serving communication node is not received after first predetermined time and/or predetermined transmission times are exceeded. The first communication node initiates a process to re-access a network, or stops transmitting the feedback information to the serving communication node, or transmits the feedback information to the serving communication node at a second carrier frequency in a case where the acknowledgement information from the serving communication node is not received after second predetermined time is exceeded and/or all transmission modes at a first carrier frequency are traversed.

Optionally, the first transmission module may, but is not limited to, be configured to transmit the feedback information to the serving communication node in a plurality of transmission modes and monitor the acknowledgement information from the serving communication node, and acknowledge a successful transmission of the feedback information in a case where the acknowledgement information transmitted by the serving communication node is received.

Optionally, the device may further include, but is not limited to, a second transmission module. The second transmission module is configured to transmit a cell handover request to the serving communication node under a preset condition. The preset condition may include, but is not limited to, one of the following conditions: in one receiving mode, link performances of all transmission links from the serving communication node to the first communication node at the first carrier frequency are lower than a third predetermined threshold; in traversing all receiving modes, the link performances of all the transmission links from the serving communication node to the first communication node at the first carrier frequency are all lower than a fourth predetermined threshold; or the first communication node fails to receive the acknowledgement information transmitted by the serving communication node with respect to the feedback information.

Optionally, the device may further include, but is not limited to, a processing module. The processing module is coupled to the determination module and configured to transmits a request for training signal to the serving communication node and determines the M preferred transmission links according to the training signal for the transmission modes and/or the training signal for receiving modes transmitted by the serving communication node in a case where the first communication node determines that the first type of transmission link fails and/or the first communication node determines that link performances of all transmission links from the serving communication node to the first communication node in a current receiving mode are lower than a fifth predetermined threshold. The request for the signal includes the request for training signal of the transmission modes and/or the request for training signal of the receiving modes.

Optionally, after the request for training signal is transmitted to the serving communication node, the device is further configured to determine resources occupied by the training signal for transmission modes and/or the training signal for the receiving modes according to at least one of: the request for training signal of the transmission modes and/or the receiving modes, a resource occupied by a request for training signal of the transmission modes and/or the receiving modes, and signaling information transmitted by the serving communication node.

Optionally, the first transmission module may, but is not limited to, be configured to randomly select a resource from a plurality of available resources and transmit the feedback information and/or identification information of the first communication node to the serving communication node on the selected resource; or be configured to randomly select a resource from the plurality of available resources, transmit request information to the serving communication node on the selected resource, and transmit the feedback information and/or the identification information of the first communication node to the serving communication node after acknowledgement information from the serving communication node for the request information is received. The resources include at least one of: a time domain resource, a frequency domain resource, a code domain resource, and a receiving mode resource corresponding to the serving communication node.

Optionally, the first transmission module may, but is not limited to, be configured to execute at least one of the following steps: The first transmission module transmits the feedback information to the third communication node after the first communication node transmits the feedback information to the second communication node for predetermined times, and the first communication node fails to receive acknowledgement information from the second communication node after predetermined time. Alternatively, the first transmission module transmits the feedback information to the third communication node in a case where link performances of all transmission links from the second communication node to the first communication node are lower than the second predetermined threshold.

Optionally, the receiving modes may include, but are not limited to, at least one of: receiving beams used by a communication node for receiving a signal, receiving ports used by the communication node for receiving the signal, receiving precoding matrixes used by the communication node for receiving the signal, and receiver algorithms used by the communication node for receiving the signal. Alternatively, the receiving modes are represented by establishing a quasi-co-location between reference signals. The receiving beams may be represented by at least one of: a resource index of the reference signals, time domain information of the reference signals, frequency domain information of the reference signals, spatial domain information of the reference signals, and sequence information of the reference signals. The transmission modes may include, but are not limited to, at least one of: transmission beams used by a communication node for transmitting a signal, transmission ports used by the communication node for transmitting the signal, transmission precoding matrixes used by the communication node for transmitting the signal, transmission time used by the communication node for transmitting the signal, transmission frequencies used by the communication node for transmitting the signal, transmission manners used by the communication node for transmitting the signal, or transmission carriers used by the communication node for transmitting the signal. The transmission manners includes a transmit diversity transmission manner and a repeated transmission manner. Alternatively, the transmission modes are represented by establishing a quasi-co-location between reference signals. The transmission beams may be represented by at least one of: resource indexes of the reference signals, time domain information of the reference signals, frequency domain information of the reference signals, spatial domain information of the reference signals, or sequence information of the reference signals. Two of the reference signals have a quasi-co-location relationship and it means that a channel characteristic parameter of one reference signal may be derived from a channel characteristic parameter of another reference signal. The channel characteristic parameter includes at least one of: a delay spread, a Doppler spread, a Doppler shift, an average delay, an average gain, an average vertical transmission angle, an average horizontal transmission angle, an average vertical angle of arrival, an average horizontal angle of arrival, a central vertical transmission angle, a central horizontal transmission angle, a central vertical angle of arrival, and a central horizontal angle of arrival.

Optionally, the device may further determine that the first type of transmission link fails in one of the following manners: it is determined that the first type of transmission link fails when link performances of all transmission links included in the first type of transmission link are lower than a predetermined threshold or it is determined that the first type of transmission link fails when link performance of any transmission link included in the first type of transmission link is lower than the predetermined threshold.

The step in which the first transmission module transmits the feedback information to the serving communications node by: transmitting the feedback information to the serving communications node when it is detected that the first type of transmission link fails for N1 times. The first type of transmission link includes one or more transmission links and N1 is a natural number.

Optionally, the feedback information further includes at least one of: information indicating that the first type of transmission link does not fail or reception quality information on the first type of transmission link.

Optionally, the first transmission module may transmit simultaneously the feedback information to the second communication node and the third communication node. The first transmission module determines a successful transmission of the feedback information when the first transmission module receives acknowledgement information returned by any one of the second communication node and the third communication node. The first transmission module transmits the feedback information in a contention manner. The device may further receive first signaling information, where the first signaling information is used for indicating resource information of a control channel resource. The device may further receive second signaling information, where the second signaling information is used for indicating a transmission situation of the control channel resource in one time unit. The control channel resource includes at least one of: a time domain resource, a frequency domain resource, or transmission link information associated with the control channel resource. In this embodiment, both the first signaling information and the second signaling information may be higher layer control signaling and/or physical layer dynamic control signaling.

Optionally, the device may further detect a control channel in a last real-time detection period in one time unit and adjust data transmission with the serving communication node according to the detected control channel.

Optionally, after the feedback information is transmitted, the device may further adjust the communication links with the serving communication node by one of the following methods: the device switches the communication links to a second type of transmission link; or the device switches the communication links to Q transmission links among the M preferred transmission links. The device monitors at least one of a control channel, a data channel, or a reference signal transmitted by the serving communication node on the switched communication link and/or performs link tracking on the switched communication link. The second type of transmission link includes one or more transmission links, the second type of transmission link is a predetermined transmission link, or the second type of transmission link is acquired according to the first type of transmission link. The Q transmission links do not include a transmission link indicated as a failure and Q is a natural number less than or equal to M.

Optionally, the first transmission module transmits the feedback information to the serving communication node by one of: transmitting the feedback information on a dedicated resource, or transmitting the feedback information on a common resource. In this implementation, when the dedicated resource is used for transmitting the feedback information, the first communication node does not transmit the identification information of the first communication node to the serving communication node, and/or the first communication node does not transmit repeatedly the feedback information on the dedicated resource, and/or the serving communication node does not transmit the acknowledge information of the feedback information to the first communication node. When the common resource is used for transmitting the feedback information, the first communication node transmits the identification information of the first communication node to the serving communication node, and/or the first communication node transmits repeatedly the feedback information on the common resource, and/or the serving communication node transmits the acknowledge information of the feedback information to the first communication node.

Optionally, after the feedback information is transmitted, the device may further monitor the acknowledgement information transmitted by the serving communication node.

Optionally, the device monitors the acknowledgement information transmitted by the serving communication node by one of: monitoring the acknowledgement information on the first type of transmission link; monitoring the acknowledgement information on the Q transmission links among the M preferred transmission links; and monitoring the acknowledgement information on a predetermined third type of transmission link. Q is a natural number less than or equal to M.

Optionally, a demodulation reference signal of a channel carrying the acknowledgement information has a quasi-co-location relationship with the first type of transmission link; the demodulation reference signal of the channel carrying the acknowledgement information has the quasi-co-location relationship with one or more of the M preferred transmission links; or the demodulation reference signal of the channel carrying the acknowledgement information has the quasi-co-location relationship with the predetermined third type of transmission link.

The various modules described above may be implemented by software or hardware. Implementation by hardware may, but is not limited to, be performed in the following manner: The various modules described above are located in a same processor or their respective processors.

Embodiment 4

This embodiment provides an information feedback device which is applied to a first communication node. The device is used for implementing the above-mentioned embodiments and preferred embodiments. What has been described will not be repeated. As used below, the term "module" may be software, hardware or a combination thereof capable of implementing predetermined functions. The device in the embodiments described below is preferably implemented by software, but implementation by hardware or by a combination of software and hardware is also possible and conceived.

Figure 5:
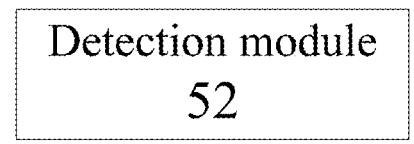
FIG. 5 is a block diagram 2 of an information feedback device according to an embodiment of the present disclosure.

FIG. 5 is a block diagram 2 of an information feedback device according to an embodiment of the present disclosure. As shown in FIG. 5, the device includes the module described below.

(1) A detection module 52 is configured to detect feedback information for indicating a status of communication links between a first communication node and the serving communication node transmitted by the first communication node. The feedback information includes at least one of: failure information of a first type of transmission link, a request for training signal of transmission modes and/or a request for training signal of receiving modes, or indication information of M preferred transmission links and the first type of transmission link and the M preferred transmission links include transmission links from the serving communication node to the first communication node, where M is a positive integer greater than or equal to 1.

The serving communication node includes a second communication node and/or a third communication node.

Optionally, the information feedback device described above may, but is not limited to, be applied to a scenario where a communication link needs to be restored, for example, a scenario where a communication link is being restored when the communication link fails in high frequency communications.

Optionally, the information feedback device described above may, but is not limited to, be applied to a base station, such as a macro base station, a micro base station and a home base station.

In the above device, the detection module detects the feedback information for indicating the status of the communication link between the first communication node and the serving communication node transmitted by the first communication node. The feedback information includes at least one of: the failure information of the first type of transmission link, the request for training signal of the transmission modes and/or the request for training signal of the receiving modes, and the indication information of the M preferred transmission links, and the first type of transmission link and the M preferred transmission links include the transmission link from the serving communication node to the first communication node, where M is a positive integer greater than or equal to 1. The serving communication node includes the second communication node and/or the third communication node. It can be seen that the above solution enable the serving communication node to detect the feedback information indicating the status of the communication link between the first communication node and the serving communication node transmitted by the first communication node, so that the first communication node and the serving communication node both may learn the status of the communication link between the two nodes. Therefore, a receiving end and a transmitting end may learn the status of the communication link between them in time, thereby effectively increasing a resource utilization rate and solving the problem in the existing art of a low resource utilization rate because the receiving end and the transmitting end cannot learn a communication link failure in time.

Optionally, the device may, but is not limited to, be further configured to perform one of the following steps.

The device detects and receives the feedback information transmitted by the first communication node on a dedicated resource used by the first communication node for transmitting the feedback information.

The device detects and receives the feedback information and/or resource request information transmitted by the first communication node on a common resource used by the first communication node for transmitting the feedback information.

The resource request information refers to a resource requested by the first communication node for transmitting the feedback information from the serving communication node. The dedicated resource includes dedicated resources allocated to the first communication node and the common resource includes common resources allocated to the first communication node and a preset communication node.

Optionally, in a case where the detection module detects the feedback information, the device may, but is not limited to, be configured to perform at least one of the following operations.

An operation one: The serving communication node stop immediately transmitting formation on the first type of transmission link to the first communication node.

An operation two: The serving communication node stops transmitting information on the first type of transmission link to the first communication node after receiving the feedback information for predetermined times.

An operation three: The serving communication node stops transmitting information on the first type of transmission link to the first communication node after predetermined time.

An operation four: The serving communication node starts a timer for restoring the communication links with the first communication node.

An operation five: The serving communication node transmits a training signal on a predetermined resource. The predetermined resource is acquired according to at least one of: the feedback information, related information to the first type of transmission link, transmission modes of the first communication node for transmitting the feedback information, and receiving modes of the serving communication node for receiving the feedback information.

The training signal may include, but is not limited to, a training signal for the transmission modes and/or a training signal for the receiving modes.

Optionally, the device may further be configured to transmit signaling information to the first communication node before the training signal is transmitted. The signaling information is used for indicating transmission modes for the training signal.

Optionally, in a case where the feedback information is detected, the device may, but is not limited to, be further configured to adjust the communication links with the first communication node.

Optionally, in a case where the feedback information detected by the detection module includes the M preferred transmission links, the device may, but is not limited to, be further configured to select Q transmission links from the M preferred transmission links and transmit information to the first communication node on the Q transmission links. Q is a positive integer less than or equal to M.

Optionally, the device may, but is not limited to, be further configured stop transmitting the information on the first type of transmission link to the first communication node and transmit the information on the selected Q transmission links to the first communication node when the information is transmitted on the Q transmission links to the first communication node.

Optionally, the device further includes a fifth transmission module. The fifth transmission module is coupled to the detection module and configured to transmit acknowledge information of the feedback information to the first communication node when the feedback information is detected.

Optionally, in a case where the feedback information includes the indication information of the M preferred transmission links, the device may, but may not necessarily, transmit the acknowledge information to the first communication node on one or more of the M preferred transmission links.

Optionally, the receiving modes may include, but are not limited to, at least one of: receiving beams used by a communication node for receiving a signal, receiving ports used by the communication node for receiving the signal, receiving precoding matrixes used by the communication node for receiving the signal, and receiver algorithms used by the communication node for receiving the signal. The transmission modes may include, but are not limited to, at least one of: transmission beams used by a communication node for transmitting a signal, transmission ports used by the communication node for transmitting the signal, transmission precoding matrixes used by the communication node for transmitting the signal, transmission time used by the communication node for transmitting the signal, transmission frequencies used by the communication node for transmitting the signal, transmission manners used by the communication node for transmitting the signal, and transmission carriers used by the communication node for transmitting the signal. The transmission manners includes a transmit diversity transmission manner and a repeated transmission manner.

Optionally, the feedback information further includes at least one of: information indicating that the first type of transmission link does not fail and reception quality information on the first type of transmission link.

Optionally, the device may further execute at least one of the following steps: The device transmits first signaling information to the first communication node, where the first signaling information is used for indicating resource information of a control channel resource. The device transmits second signaling information to the first communication node, where the second signaling information is used for indicating a transmission situation of the control channel resource in one time unit. The control channel resource includes at least one of: a time domain resource, a frequency domain resource, and transmission link information associated with the control channel resource.

Optionally, the device may further perform at least one of the following operations: The device adjusts data transmission with the first communication node in one time unit and the device transmits a control channel in a late real-time detection period in one time unit. The control channel includes adjustment information.

Optionally, after the feedback information is detected, the device may further adjust the communication links with the first communication node by one of: switching the communication links to a second type of transmission link, or switching the communication links to the Q transmission links among the M preferred transmission links. The serving communication node transmits at least one of a control channel, a data channel, or a reference signal to the first communication node on the switched communication link. The second type of transmission link includes one or more transmission links, the second type of transmission link is a predetermined transmission link, and the second type of transmission link is acquired according to the first type of transmission link. The Q transmission links do not include a transmission link indicated as a failure and Q is a natural number less than or equal to M.

Optionally, the device may transmit the acknowledgement information to the first communication node by one of: transmitting the acknowledgement information on the first type of transmission link; transmitting the acknowledgement information on the Q transmission links among the M preferred transmission links; or transmitting the acknowledgement information on a predetermined third type of transmission link by the serving communication node. Q is a natural number less than or equal to M.

Optionally, the device may further transmit control information to the first communication node. The control information indicates at least one of: a demodulation reference signal of a channel carrying the acknowledgement information having a quasi-co-location relationship with the first type of transmission link; the demodulation reference signal of the channel carrying the acknowledgement information having the quasi-co-location relationship with one or more of the M preferred transmission links; and the demodulation reference signal of the channel carrying the acknowledgement information having the quasi-co-location relationship with the predetermined third type of transmission link.

The various modules described above may be implemented by software or hardware. Implementation by hardware may, but is not limited to, be performed in the following manner: The various modules described above are located in a same processor or their respective processors.

The present disclosure will be described below in detail with reference to an optional embodiment.

It should be noted that, in an optional embodiment of the present disclosure, in a case where a second communication node is a base station or a terminal having a function of the base station, a first communication node is a terminal; and in a case where the second communication node is the terminal, the first communication node is the base station or the terminal having the function of the base station. Transmission modes include transmission beams, transmission ports, transmission precoding matrixes, transmission manners, and/or transmission carriers used by a communication node for transmitting a signal. The transmission manners include: a transmit diversity transmission manner and a repeated transmission manner. Receiving modes are receiving beams, receiving ports, receiving precoding matrixes, and/or receiver algorithms used by a communication node for receiving a signal.

It is to be noted that, in an optional embodiment of the present disclosure, failure information of a transmission link may, but is not limited to, be used for indicating at least one of the following pieces of information to a serving communication node: a link performance of a signal transmitted by the serving communication node on the first type of transmission link to the first communication node is lower than a first predetermined threshold; a signal transmitted by the serving communication node on the first type of transmission link fails to reach the first communication node; a link performance of a signal transmitted by the serving communication node on another preset transmission link other than the first type of transmission link to the first communication node is superior to the link performance of the signal transmitted by the serving communication node on the first type of transmission link; the serving communication node needs to stop transmitting a signal on the first type of transmission link to the first communication node; and the first communication node will stop detecting control information, receiving data, and/or tracking links on the first type of transmission link.

Optional Embodiment 1

Figure 6:
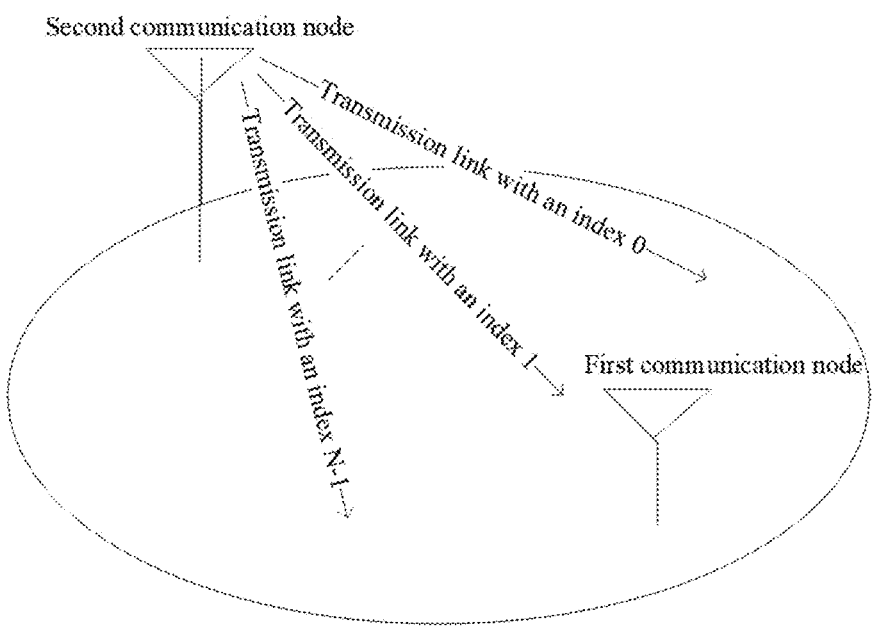
FIG. 6 is a schematic diagram 1 illustrating transmission modes for N candidate transmission links according to an optional embodiment of the present disclosure.
Figure 7:
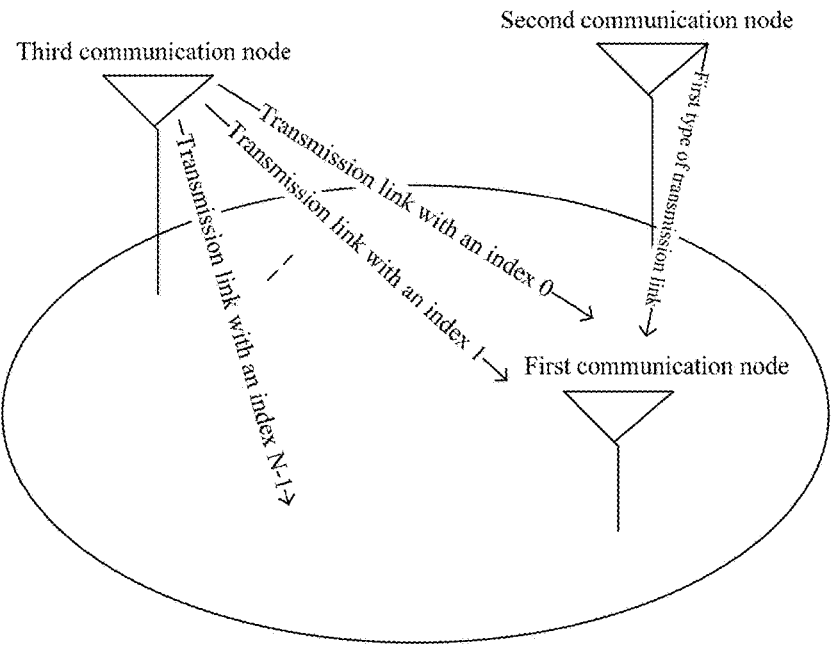
FIG. 7 is a schematic diagram 2 illustrating transmission modes for N candidate transmission links according to an optional embodiment of the present disclosure.
Figure 8:
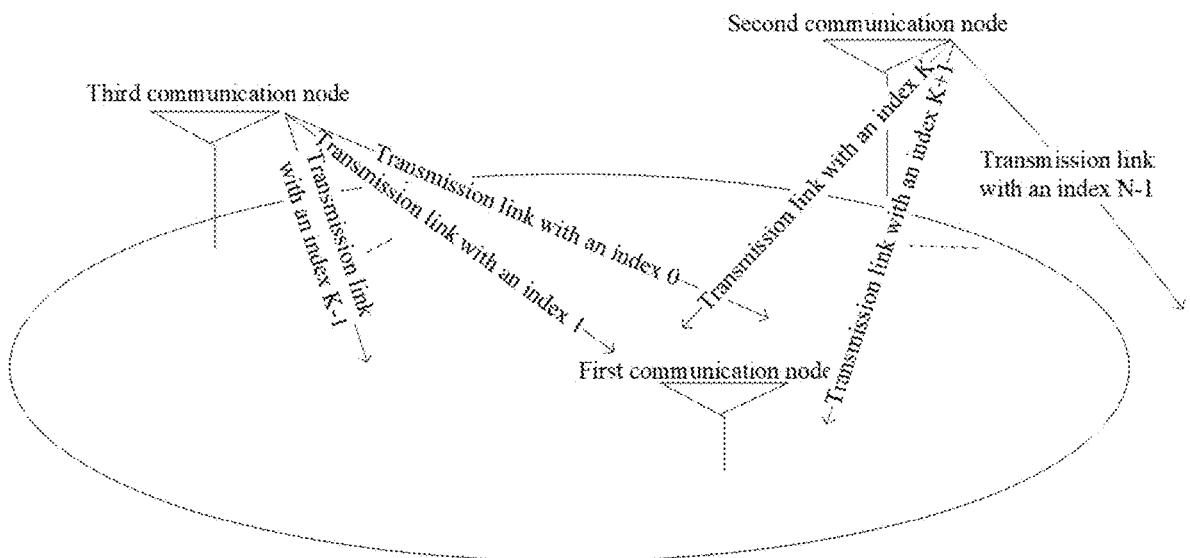
FIG. 8 is a schematic diagram 3 illustrating transmission modes for N candidate transmission links according to an optional embodiment of the present disclosure.

In this optional embodiment, a first communication node determines feedback information and transmits the feedback information to a serving communication node. The feedback information include at least one of: a request signal for a first type of transmission link, a request for training signal of transmission modes and/or receiving modes, and indication information of M preferred transmission links. Transmission modes for N candidate transmission links are illustrated in FIGS. 6 to 8. FIG. 6 is a schematic diagram 1 illustrating transmission modes for N candidate transmission links according to an optional embodiment of the present disclosure. As shown in FIG. 6, the N candidate transmission links are all transmitted from a second communication node. FIG. 7 is schematic diagram 2 illustrating transmission modes for N candidate transmission links according to an optional embodiment of the present disclosure. As shown in FIG. 7, the N candidate transmission links are transmitted from a third communication node and the first type of transmission link is transmitted from the second communication node. FIG. 8 is schematic diagram 3 illustrating transmission modes for N candidate transmission links according to an optional embodiment of the present disclosure. As shown in FIG. 8, the N candidate transmission links are transmitted from the second communication node and the third communication node.

Implementation modes below are further provided in this optional embodiment.

Figure 9:
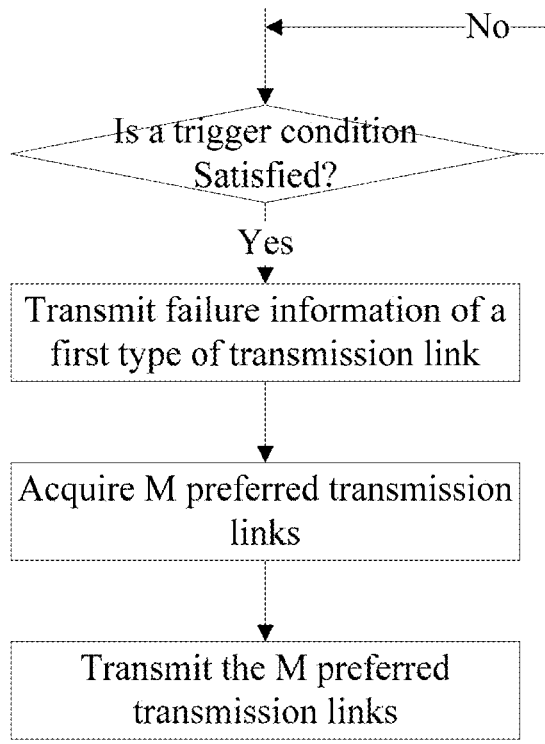
FIG. 9 is a flowchart 1 of a method for determining and transmitting feedback information according to an optional embodiment of the present disclosure.

An implementation mode one: FIG. 9 is a flowchart 1 of a method for determining and transmitting feedback information according to an optional embodiment of the present disclosure. As shown in FIG. 9, firstly, the first communication node detects whether a trigger condition is satisfied, continues detection if the trigger condition is not satisfied, and transmits failure information of the first type of transmission link to the serving communication node if the trigger condition is satisfied. Secondly, the first communication node acquires the indication information of the M preferred transmission links, where M is greater than or equal to 1. Finally, the first communication node transmits the indication information of the M preferred transmission links to the second communication node.

Figure 10:
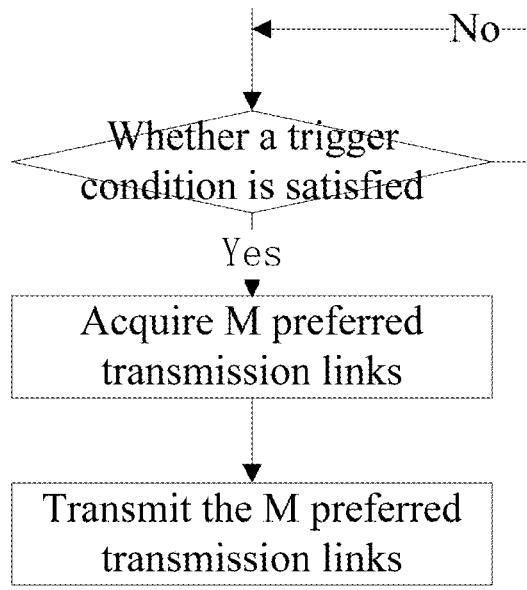
FIG. 10 is a flowchart 2 of a method for determining and transmitting feedback information according to an optional embodiment of the present disclosure.

An implementation mode two: FIG. 10 is a flowchart 2 of a method for determining and transmitting feedback information according to an optional embodiment of the present disclosure. As shown in FIG. 10, firstly, the first communication node detects whether the trigger condition is satisfied, continues detection if the trigger condition is not satisfied, and acquires the M preferred transmission links if the trigger condition is satisfied. Then the first communication node transmits the indication information of the M preferred transmission links to the serving communication node.

Optionally, the indication information of the M preferred transmission links may, but is not limited to, be used for indicating at least one of the following pieces of information to the serving communication node: a link performance of a signal transmitted by the serving communication node on the first type of transmission link to the first communication node is lower than a first predetermined threshold; a signal transmitted by the serving communication node on the first type of transmission link fails to reach the first communication node; a link performance of a signal transmitted by the serving communication node on another preset transmission link other than the first type of transmission link to the first communication node is superior to the link performance of the signal transmitted by the serving communication node on the first type of transmission link; the serving communication node needs to stop transmitting a signal on the first type of transmission link to the first communication node; the first communication node will stop detecting control information, receiving data, and/or tracking links on the first type of transmission link; or the M preferred transmission links has superior link performance among transmission links from the serving communication node to the first communication node.

Figure 11:
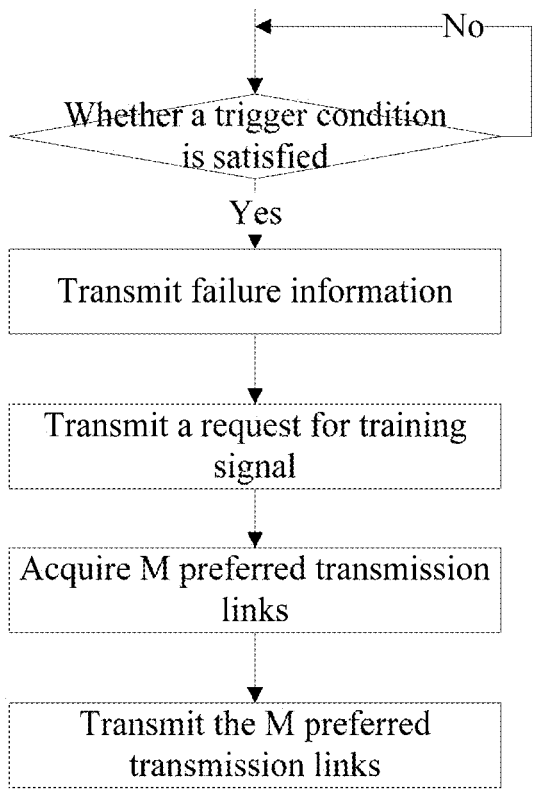
FIG. 11 is a flowchart 3 of a method for determining and transmitting feedback information according to an optional embodiment of the present disclosure.

An implementation mode three: FIG. 11 is a flowchart 3 of a method for determining and transmitting feedback information according to an optional embodiment of the present disclosure. As shown in FIG. 11, firstly, the first communication node detects whether a trigger condition is satisfied, continues detection if the trigger condition is not satisfied, and transmits the failure information of the first type of transmission link and the request for the signal respectively to the serving communication node if the trigger condition is satisfied. Then, the first communication node acquires the indication information of the M preferred transmission links and transmits the indication information to the serving communication node. In this implementation mode, the first communication node may also transmit the failure information of the first type of transmission link and the request for the signal simultaneously to the serving communication node.

Figure 12:
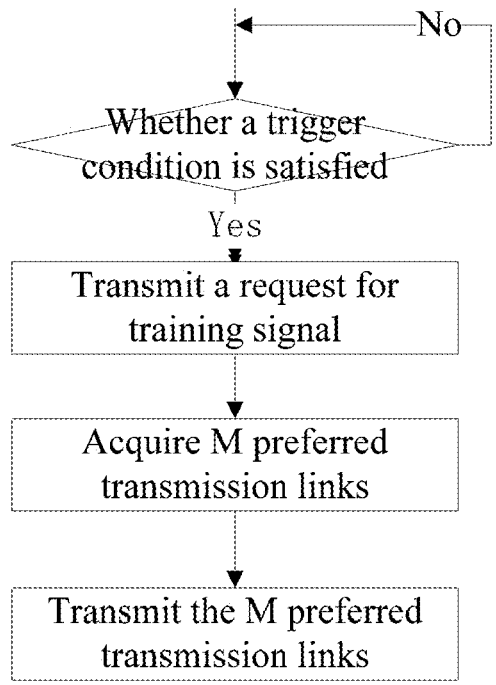
FIG. 12 is a flowchart 4 of a method for determining and transmitting feedback information according to an optional embodiment of the present disclosure.

An implementation mode four: FIG. 12 is a flowchart 4 of a method for determining and transmitting feedback information according to an optional embodiment of the present disclosure. As shown in FIG. 12, firstly, the first communication node detects whether a trigger condition is satisfied, continues detection if the trigger condition is not satisfied, and transmits the request for training signal to the serving communication node if the trigger condition is satisfied. Then, the first communication node acquires the indication information of the M preferred transmission links and transmits the indication information to the serving communication node.

Optionally, in the above implementation mode four, the request for training signal may, but is not limited to, be used for indicating at least one of the following pieces of information to the serving communication node: a link performance of a signal transmitted by the serving communication node on the first type of transmission link to the first communication node is lower than a first predetermined threshold; a signal transmitted by the serving communication node on the first type of transmission link fails to reach the first communication node; a link performance of a signal transmitted by the serving communication node on another preset transmission link other than the first type of transmission link to the first communication node is superior to the link performance of the signal transmitted by the serving communication node on the first type of transmission link; the serving communication node needs to stop transmitting a signal on the first type of transmission link to the first communication node; the first communication node will stop detecting control information, receiving data, and/or tracking links on the first type of transmission link; and the request for training signal requests a serving cell to transmit a training signal. The training signal includes a training signal for the transmission modes and/or a training signal for the receiving modes. The first communication node requests the serving communication node to transmit the training signal. The training signal includes a training signal for the transmission modes and/or a training signal for the receiving modes.

In the above implementation modes, the request for training signal is one of the following: a request for training signal of the transmission modes and/or the receiving modes, a request for a beam for training signal, a request for beam for tracking signal, and a request for tracking signal of the transmission modes and/or the receiving modes.

Different transmission links correspond to different transmission modes used by the serving communication node for transmitting a signal. The first type of transmission link is a transmission mode corresponding to the serving communication node among established communication links between the first communication node and the serving communication node. The first communication node detects a control channel and/or receives a data signal, and/or tracks link performance on the first type of transmission link. The first type of transmission link includes one or more transmission links.

The serving communication node includes the second communication node and/or the third communication node.

In the above implementation modes, the trigger condition includes one or more of the following conditions:

A condition 1: The first communication node determines whether the first type of transmission link fails according to a signal transmitted by the second communication node and transmits the feedback information to the serving communication node when it is determined that the first type of transmission link fails.

A condition 2: The first communication node transmits the feedback information to the serving communication node according to trigger signaling information transmitted by the serving communication node. That is, the serving communication node transmits signaling to indicate that the first communication node transmits the feedback information to the serving communication node. For example, the second communication node triggers the transmission of the feedback information by the first communication node to the second communication node via signaling, or the third communication node triggers the transmission of the feedback information by the first communication node to the second communication node via the signaling.

A condition 3: The first communication node transmits the feedback information to the serving communication node according to a periodic resource configured by the serving communication node.

The indication information of the M preferred transmission links includes one or more of the following: index information of the M transmission links, and link performance information of each transmission link to the first communication node, such as CQI information. For example, the M transmission links are from the N candidate transmission links and the indication information of the M transmission links is transmitting using N bits. A transmission link with a bit value of 1 is one of the M transmission links and a transmission link with a bit value of 0 does not belong to the M transmission links. It is to be noted that this optional embodiment does not exclude another transmission mode for transmission link index information.

Figure 13:
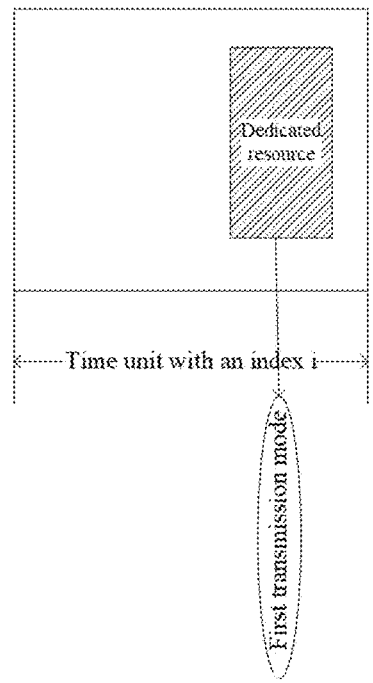
FIG. 13 is a flowchart 1 of a method for transmitting feedback information according to an optional embodiment of the present disclosure.

In an implementation mode in which the first communication node transmits the feedback information to the serving communication node of this optional embodiment, FIG. 13 is a flowchart 1 of a method for transmitting feedback information according to an optional embodiment of the present disclosure. As shown in FIG. 13, the first communication node transmits the feedback information to the second communication node in a first transmission mode on a dedicated resource allocated to the first communication node. The first transmission mode is an optimal transmission mode configured between the first communication node and the second communication node. The first communication node acknowledges a successful transmission of the feedback information without monitoring acknowledgement information from the second communication node after transmitting the feedback information.

Figure 14:
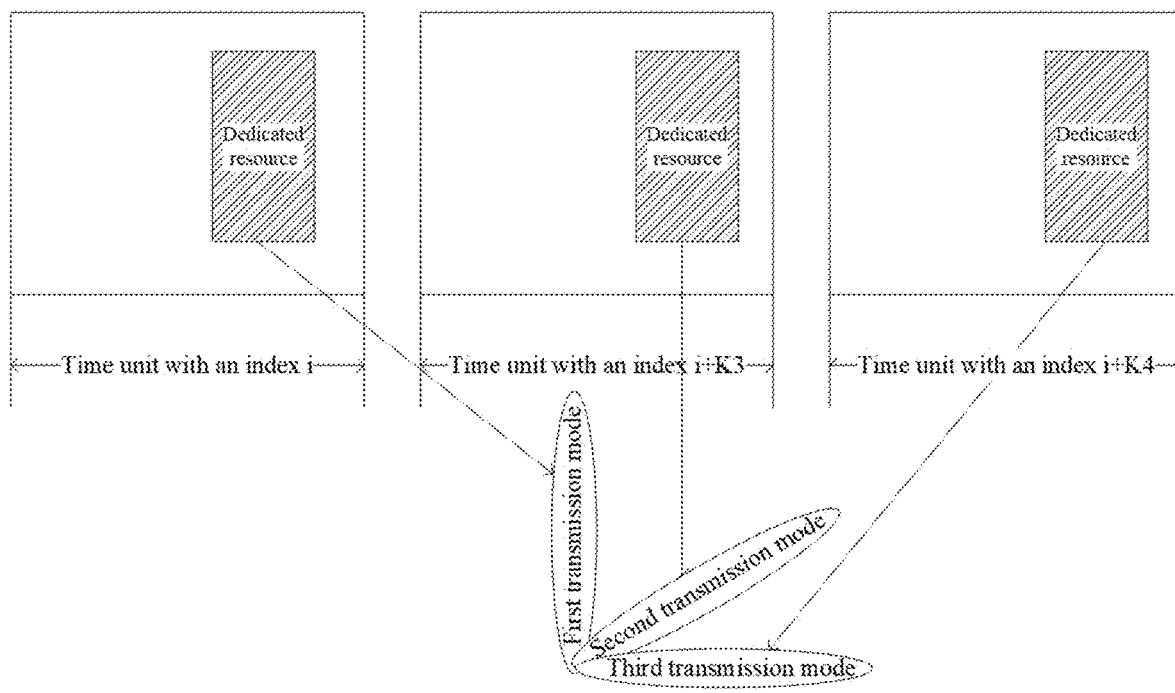
FIG. 14 is a flowchart 2 of a method for transmitting feedback information according to an optional embodiment of the present disclosure.

In another implementation mode in which the first communication node transmits the feedback information to the serving communication node of this optional embodiment, FIG. 14 is a flowchart 2 of a method for transmitting feedback information according to an optional embodiment of the present disclosure. As shown in FIG. 14, after the first communication node transmits the feedback information to the second communication node in the first transmission mode on the dedicated resource, the first communication node monitor the acknowledgement information transmitted by the second communication node on the first type of transmission link and/or the M preferred transmission links. If the acknowledgement information from the second communication node is not received after the feedback information is transmitted in the first transmission mode for predetermined times or predetermined time is exceeded, the first communication node transmits the feedback information in a second transmission mode and monitor the acknowledgement information transmitted by the second communication node on the first type of transmission link and/or the M preferred transmission links, and so on. If the acknowledgement information transmitted by the second communication node is still not received after all transmission modes at a first carrier frequency are all traversed by the first communication node, the transmission of the feedback information is considered as failed and the first communication node initiates a cell handover request or transmits the feedback information to the second communication node at a second carrier frequency. The first carrier frequency is a high frequency and the second carrier frequency is a low frequency. The acknowledge information is received, the transmission of the feedback information is considered as successful. FIG. 14 shows examples of positions of dedicated resources corresponding to different transmission modes, but other circumstances are not excluded.

Figure 15:
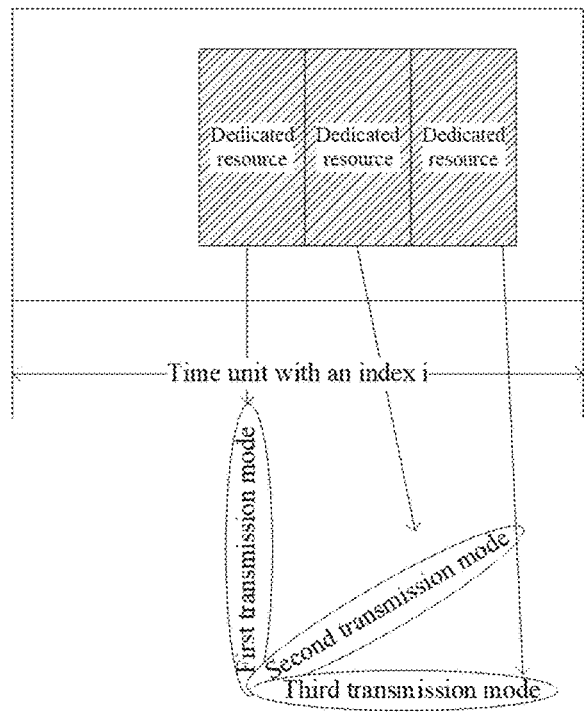
FIG. 15 is a flowchart 3 of a method for transmitting feedback information according to an optional embodiment of the present disclosure.

In another implementation mode in which the first communication node transmits the feedback information to the serving communication node of this optional embodiment, FIG. 15 is a flowchart 3 of a method for transmitting feedback information according to an optional embodiment of the present disclosure. As shown in FIG. 15, the first communication node and the second communication node agree that the first communication node transmits the feedback information to the second communication node in a plurality of transmission modes on the dedicated resource. As shown in FIG. 15, the first communication node transmits the feedback information sequentially in the first transmission mode, the second transmission mode, and a third transmission mode and monitor the acknowledgement information from the second communication node on the first type of transmission link or the M preferred transmission links or another transmission link of the second communication node. When the acknowledgement information is monitored, the transmission of the feedback information is considered as successful. The dedicated resources occupied by different transmission modes in FIG. 15 are time divided resources. The optional embodiment does not exclude other forms, such as frequency division and/or code division and/or space division.

In a fourth implementation mode in which the first communication node transmits the feedback information to the serving communication node of this optional embodiment, the first communication node transmits directly the feedback information on time-frequency resources of the second carrier frequency and may consider directly a successful transmission of the feedback information without monitoring the acknowledgement information. Alternatively, the first communication node monitors the acknowledgement information from the second communication node and considers a successful transmission of the feedback information after the acknowledgement information is monitored. Preferably, the second carrier frequency may be, but is not limited to, an LTE low frequency.

In a fifth implementation mode in which the first communication node transmits the feedback information to the serving communication node of this optional embodiment, after the first communication node transmits the feedback information to the second communication node in the above transmission modes, if the feedback information is not transmitted successfully, for example, the acknowledgement information from the second communication and/or the third communication node is not received, the first communication node transmits the feedback information to the third communication node. Preferably, the third communication node is a low-frequency node.

In a sixth implementation mode in which the first communication node transmits the feedback information to the serving communication node of this optional embodiment, the first communication node transmits the feedback information to the second communication node and the third communication node simultaneously and considers the transmission of the feedback information as successful if the acknowledgement from any one of the second communication node and the third communication node is received.

In a seventh implementation mode in which the first communication node transmits the feedback information to the serving communication node of this optional embodiment, the first communication node transmits directly the feedback information to the third communication node. Preferably, the third communication node is a low-frequency node.

In an eighth implementation mode in which the first communication node transmits the feedback information to the serving communication node of this optional embodiment, the first communication node transmits the feedback information to the serving communication node in a contention manner. Because the trigger condition is satisfied randomly, the transmission of the feedback information to the serving communication node on the dedicated resource will result in resource wastes and the feedback information may be transmitted in the contention manner. In an implementation mode for transmitting in the contention manner, identification information of the first communication node is carried in the feedback information so that the serving communication node can identify which one among a plurality of communication nodes sharing contended resources transmits the feedback information by use of the identification information. In another implementation mode for transmitting in the contention manner, when the first communication needs to transmit the feedback information, the first communication node firstly transmits a request signal to the second communication node and then transmits the feedback information after a response signal from the second communication node is acquired. The feedback information carries the identification information of the first communication node.

The failure information of the first type of transmission link indicates at least one or more pieces of the following information to the second communication node: a link performance of a signal transmitted by the second communication node on the first type of transmission link to the first communication node is lower than a first predetermined threshold; a signal transmitted by the second communication node on the first type of transmission link fails to reach the first communication node; a link performance of a signal transmitted by the second communication node on another preset transmission link to the first communication node is superior to the link performance of the signal transmitted by the serving communication node on the first type of transmission link; the second communication node needs to stop transmitting a signal on the first type of transmission link to the first communication node; and the first communication node will stop detecting control information and/or receiving data, and/or tracking links on the first type of transmission link.

In a first implementation mode of the first type of transmission link and the M preferred transmission links of this optional embodiment, the first type of transmission link and the M preferred transmission links are transmitted from the second communication node and belong to the N transmission links from the second communication node, and different transmission links correspond to different transmission modes of the second communication node, as shown in FIG. 6.

In a second implementation mode of the first type of transmission link and the M preferred transmission links of this optional embodiment, the first type of transmission link is transmitted from the second communication node, and the M preferred transmission links are transmitted from the third communication node and belong to the N transmission links from the third communication node, as shown in FIG. 7. M is less than or equal to N.

In a third implementation mode of the first type of transmission link and the M preferred transmission links of this optional embodiment, the first type of transmission link and the M preferred transmission links belong to the N transmission links from the second communication node and the third communication node, as shown in FIG. 8. FIG. 8 shows examples of numbers for transmission links and other numbering modes are not excluded. The N transmission links are transmitted commonly from the second communication node and the third communication node.

The M preferred transmission links have an optimal link performance to the first communication node among the N candidate transmission links; and/or the link performance of the M preferred transmission links is higher than a second predetermined threshold. M is less than or equal to N.

The first communication node acquires a value of M according to one or more of: a $M=\lfloor R*N \rfloor$, where R is a number greater than 0 and less than or equal to 1 agreed by the first communication node and the serving communication node and $\lfloor \ \rfloor$ denotes a floor operation; or the M preferred transmission links includes transmission links among the N candidate transmission links, whose link performance to the first communication node is higher than the second predetermined threshold.

When the communication link established between the first communication node and the second communication node and/or the third communication node includes a plurality of transmission links, for example, transmission links {0, 3, 4}, where 0 is the optimal transmission link. That is, the second communication node and/or the third communication node may transmit information to the first communication node on the transmission links 0, 3 and 4, and the first communication node detects the control channel and/or receives data and/or tracks link performance on one or more of the transmission links {0, 3, 4}. At this time, in a first implementation mode of the failure information of the first type of transmission link, the first communication node transmits the failure information of the first type of transmission link to the second communication node and/or the third communication node only when the first communication node determines that link performances of all the transmission links {0, 3, 4} to the first communication node are lower than the second predetermined threshold. in a second implementation mode, the first communication node transmits the failure information of the first type of transmission link when the first communication node determines that link performance of any one of the transmission links {0, 3, 4} to the first communication node is lower than the second predetermined threshold. The failure information indicates an index of a failed transmission link. For example, if a transmission link whose link performance is lower than the predetermined threshold is a link 3, the second communication node and/or the third communication node stop transmitting information to the first communication node on the indicated link, i.e., the link 3 after receiving indication information of the first type of transmission link, and can transmit the information to the first communication node on the transmission links {0, 4}.

When the trigger condition is that the first communication node determines whether the first type of transmission link fails, since the failure of the first type of transmission link is random, if the feedback information is transmitted in a random manner, a resource utilization rate is low and detection complexity of the second communication node and/or the third communication node is increased. At this time, the first communication node may further determine whether it is a period of active data. In the period of active data, the feedback information is transmitted quickly on an aperiodic resource; in a period of inactive data, the feedback information is transmitted on an allocated periodic resource. The period of active data represents that a time interval between the current time and a time at which the first communication node receives data from the second communication node lately is less than predetermined time, and/or a time interval between the current time and a time at which the first communication node transmits data to the second communication node lately is less than the predetermined time.

Optional Embodiment 2

This optional embodiment is similar to the optional embodiment 1, and the main difference is that a first communication node determines whether a trigger condition is satisfied, that is, determines whether a first type of transmission link fails, according to a demodulation reference signal transmitted by a second communication node on a control channel resource. A failure of the first type of transmission link means that the trigger condition is satisfied.

Distinctive features of different control channel resources include a transmission beam and/or a transmission port and/or a transmission precoding matrix and/or transmission time and/or a transmission frequency and/or a transmission carrier frequency used by the second communication node for transmitting the control channel resource. One control channel resource corresponds to one transmission link, and one transmission link corresponds to one or more control channel resources. The correspondence is agreed by the first communication node and the second communication node in advance. One control channel resource carries one demodulation reference signal for demodulating a signal of the control channel resource. If there are 4 control channel resources and 4 transmission links in total, the correspondence is shown in Table 1.

TABLE 1

Correspondence between a control channel and a transmission link

| Control channel index | Transmission link index |
|---|---|
| 0 | 0 |
| 1 | 1 |
| 2 | 2 |
| 3 | 3 |

If there are 8 control channel resources and 4 transmission links in total, the correspondence is shown in Table 2.

TABLE 2

Correspondence between a control channel and a transmission link

| Control channel index | Transmission link index |
|---|---|
| 0 | 0 |
| 1 | 0 |
| 2 | 1 |
| 3 | 1 |
| 4 | 2 |
| 5 | 2 |
| 6 | 3 |
| 7 | 3 |

Tables 1 and 2 are merely examples, and other correspondences are not excluded. As shown in Table 2, when one transmission link corresponds to more than one control channel resources, the first communication node determines whether a transmission link associated with the second communication node fails according to receiving performance of the demodulation reference signals corresponding to the plurality of control channel resources.

Before monitoring the receiving performance of the demodulation reference signals, the first communication node acquires resource information corresponding to one or more control channel resources according to an agreed rule with the second communication node or signaling information transmitted by the second communication node or signaling information transmitted by a fourth communication node.

Figure 16:
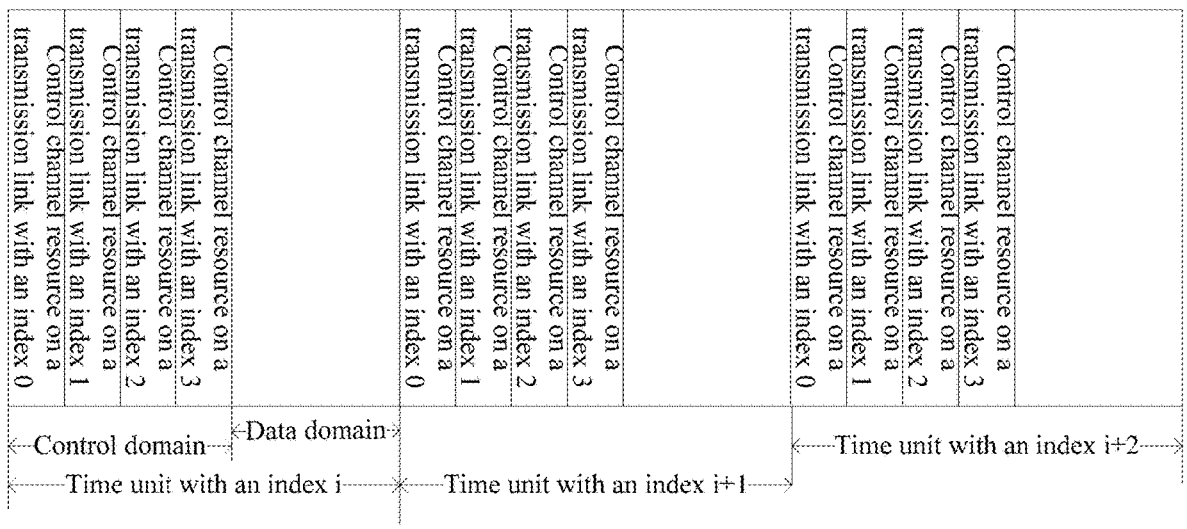
FIG. 16 is a schematic diagram 1 illustrating occupation of a control channel resource according to an optional embodiment of the present disclosure.
Figure 17:
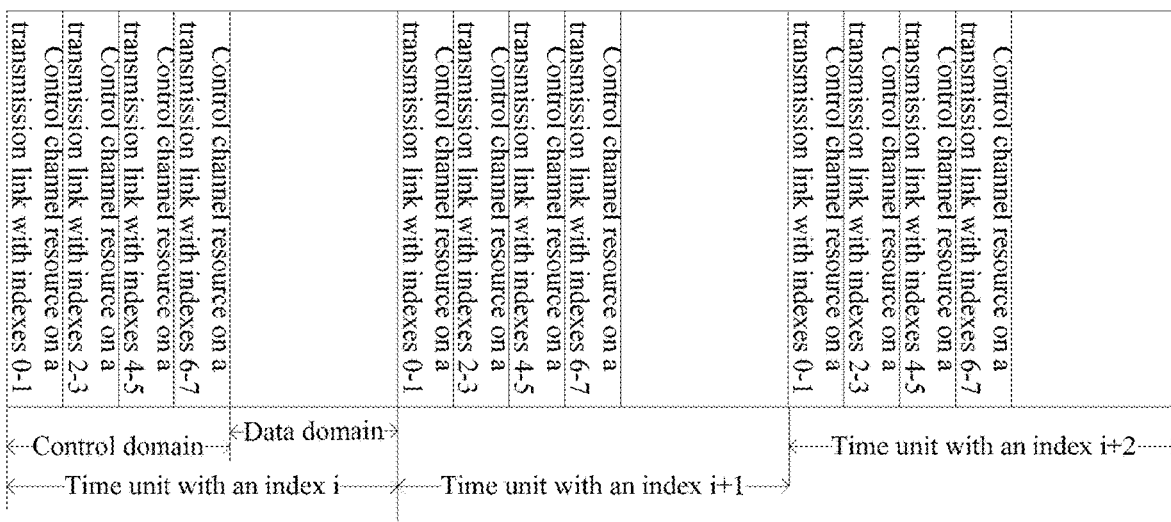
FIG. 17 is a schematic diagram 2 illustrating occupation of a control channel resource according to an optional embodiment of the present disclosure.
Figure 18:
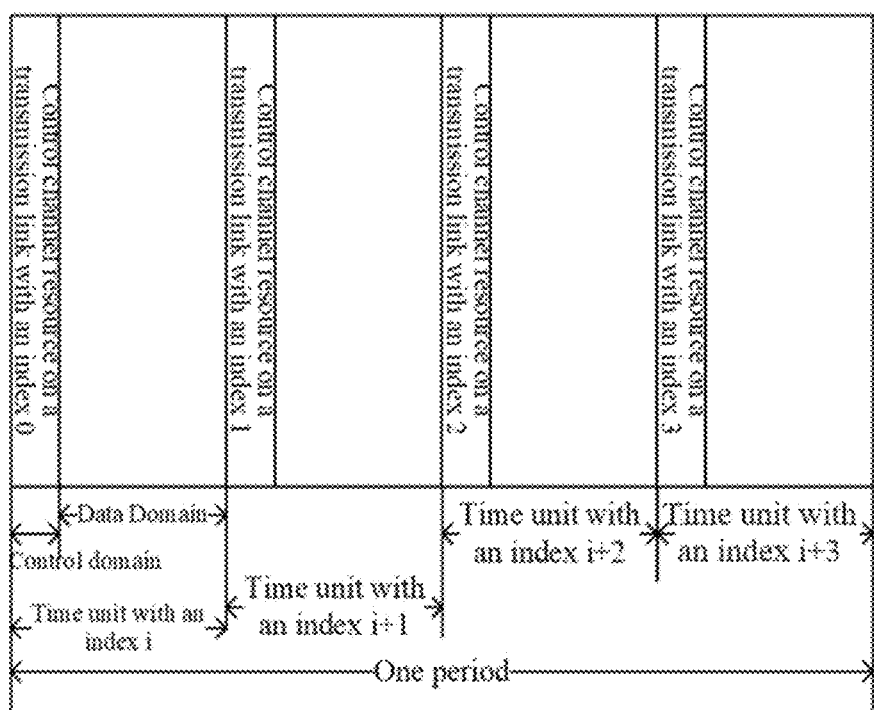
FIG. 18 is a schematic diagram 3 illustrating occupation of a control channel resource according to an optional embodiment of the present disclosure.

In a first implementation mode of the resource information of the control channel resources of this optional embodiment, the first communication node and the second communication node agree on the resource information of each control channel resource. FIG. 16 is a schematic diagram 1 illustrating occupation of a control channel resource according to an optional embodiment of the present disclosure. As shown in FIG. 16, the first communication node and the second communication node agree on control resources transmitted in a control domain of each time unit. In the figure, indexes 1-3 represent time divided control resources. Of course, this optional embodiment does not exclude frequency division. In the figure, a next time interval only corresponds to one control channel resource in a time division manner. This optional embodiment does not exclude a case in which a time interval corresponds to a plurality of control channel resources. FIG. 17 is a schematic diagram 2 illustrating occupation of a control channel resource according to an optional embodiment of the present disclosure. Occupations of the control channel resource in FIGS. 16 and 17 are merely examples, and other cases are not excluded. In short, all control channel resources transmitted in each time unit are shown. Alternatively, FIG. 18 is a schematic diagram 3 illustrating occupation of a control channel resource according to an optional embodiment of the present disclosure. As shown in FIG. 18, different control channel resources in a control channel resource set are transmitted in different time units in a polling manner. No matter whether control information needs to be transmitted on the control channel resources agreed by the first communication node and the second communication node in FIGS. 16 to 18, the second communication node definitely transmits the demodulation reference signal corresponding to the control channel, so that the first communication node determines whether the first type of transmission link fails according to the receiving performance of the demodulation reference signal on the control channel resource. That is, the second communication node at least transmits the demodulation reference signal of the control resource on the agreed control resource.

Figure 19:
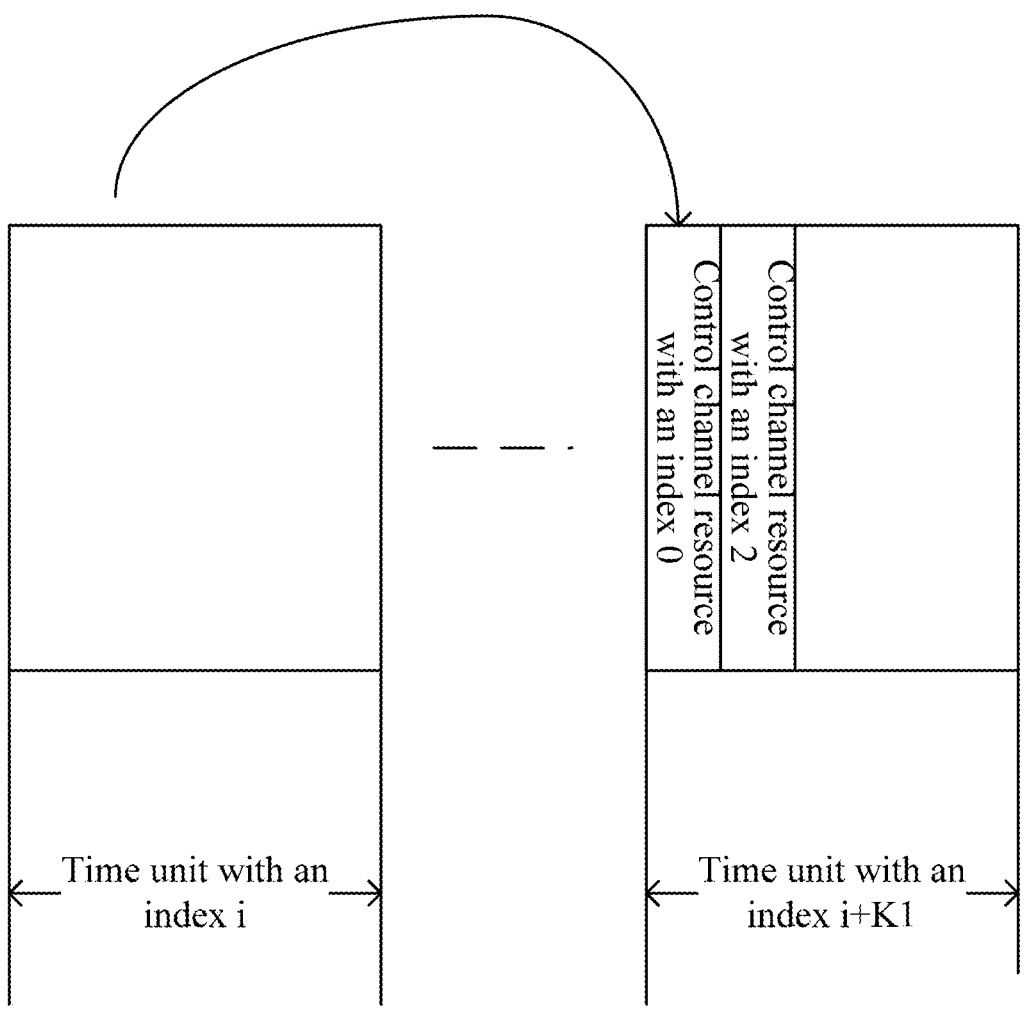
FIG. 19 is a schematic diagram 4 illustrating occupation of a control channel resource according to an optional embodiment of the present disclosure.
Figure 20:
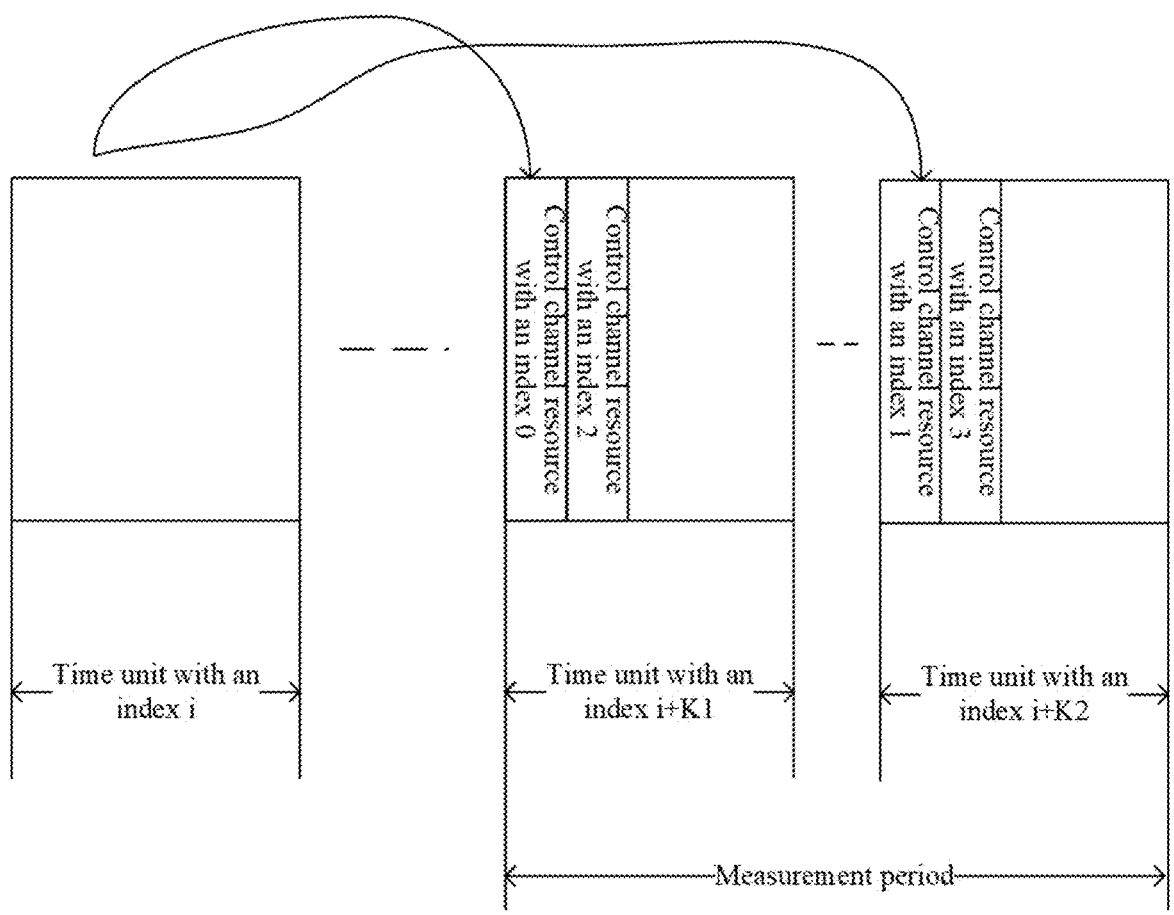
FIG. 20 is a schematic diagram 5 illustrating occupation of a control channel resource according to an optional embodiment of the present disclosure.
Figure 21:
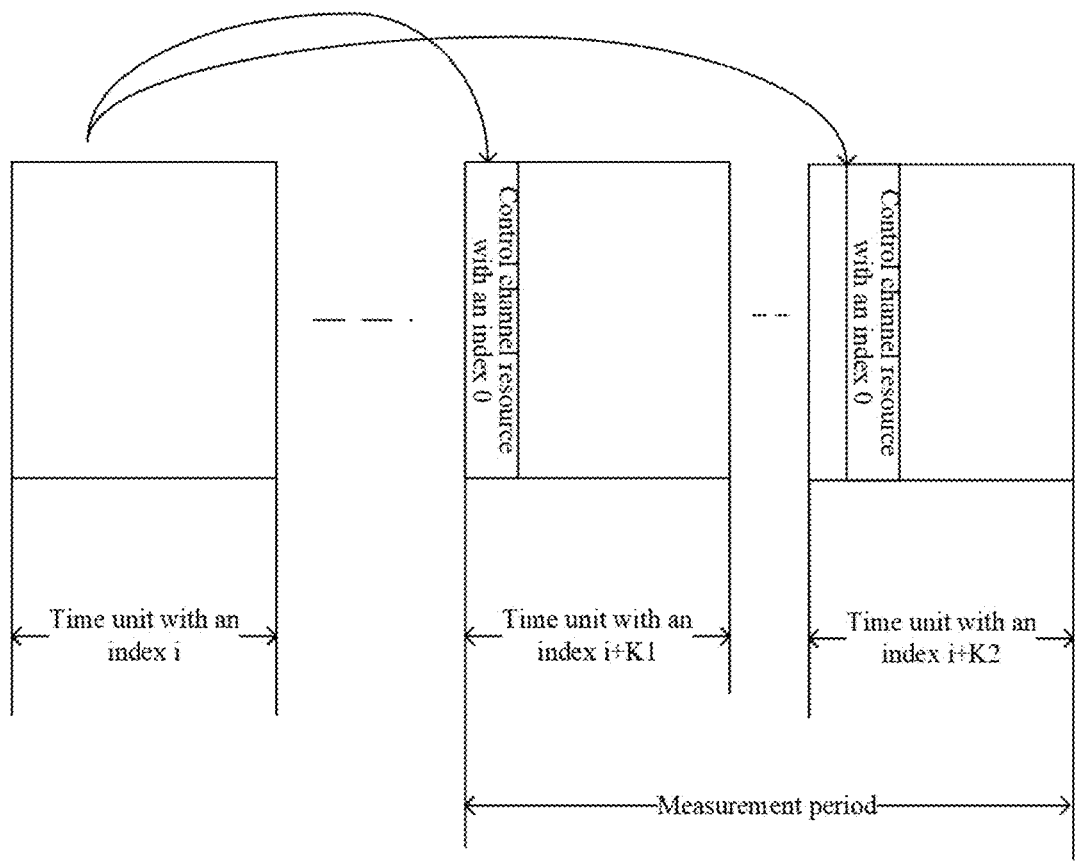
FIG. 21 is a schematic diagram 6 illustrating occupation of a control channel resource according to an optional embodiment of the present disclosure.

In a second implementation mode of the resource information of the control channel resources of this optional embodiment, the first communication node acquires the resource information of the control channel resources according to the signaling information transmitted by the second communication node. For example, according to higher-layer signaling transmitted by the second communication node, how each control channel resource is transmitted in a time unit is acquired. FIG. 19 is a schematic diagram 4 illustrating occupation of a control channel resource according to an optional embodiment of the present disclosure. As shown in FIG. 19, in a time unit with an index i, the second communication node notifies how the control channel resources are transmitted in a time unit with an index i+K1 via dynamic signaling information or higher-layer signaling information, where K1 is a positive integer greater than or equal to 0. FIG. 20 is a schematic diagram 5 illustrating occupation of a control channel resource according to an optional embodiment of the present disclosure. As shown in FIG. 20, in the time unit with an index i, the second communication node how the control channel resources are transmitted in each time unit within a measurement period after the time unit with an index i+K1 via the dynamic signaling information or the higher-layer signaling information. The first communication node determines whether a corresponding transmission link fails according to the receiving performance of the demodulation reference signal corresponding to each control channel resource within the measurement period. Alternatively, the second communication node only notifies the control channel resource corresponding to the first type of transmission link, and the first communication node determines whether the first type of transmission link fails according to the receiving performance of the demodulation reference signal on the control channel resource corresponding to the first type of transmission link. FIG. 21 is a schematic diagram 6 illustrating occupation of a control channel resource according to an optional embodiment of the present disclosure. As shown in FIG. 21, if the first type of transmission link corresponds to the control channel resource with an index 0, the second communication node only notifies a resource occupied by the control channel resource with the index 0 within one measurement period and the first communication node determines whether the first type of transmission link fails according to the demodulation reference signal on the control channel resource with the index 0 within one measurement period. Certainly, at this time, the control channel with the index 0 may or may not be transmitted on another resource within one measurement period, but the second communication node definitely transmits the demodulation reference signal corresponding to the control channel resource with the index 0 on the notified control channel resource.

Figure 22:
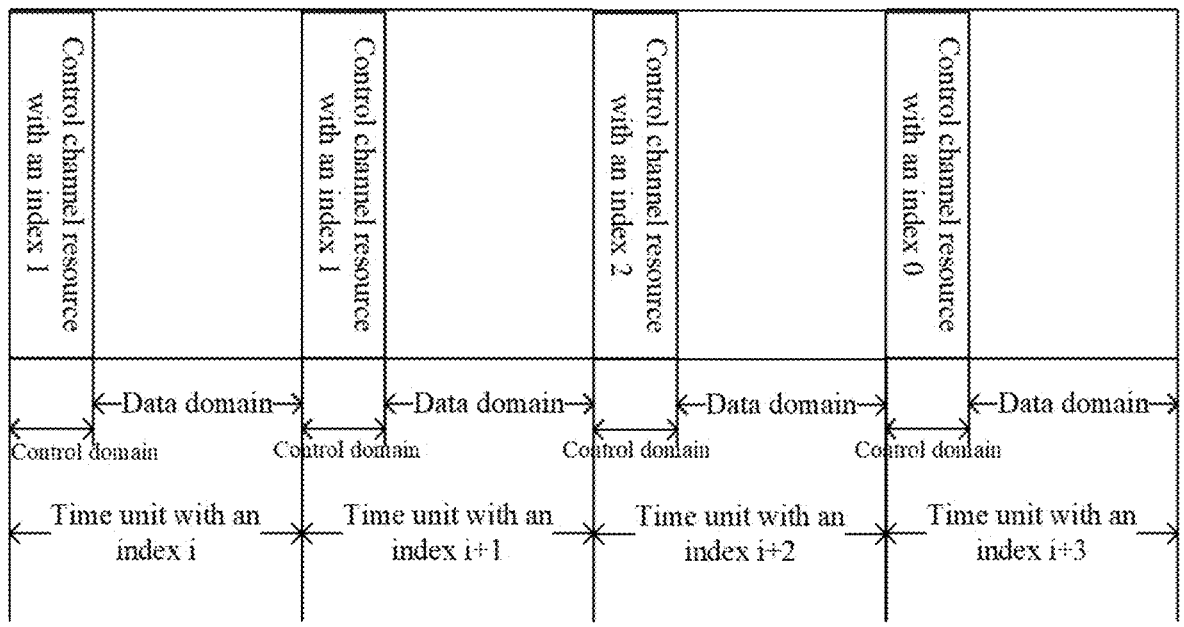
FIG. 22 is a schematic diagram 7 illustrating occupation of a control channel resource according to an optional embodiment of the present disclosure.

In a third implementation mode of the resource information of the control channel resources of this optional embodiment, the first communication node acquires a resource occupied by each control channel resource according to the signaling information or non-signaling information transmitted by the fourth communication node. On the notified control channel resource, the second communication node at least transmits the demodulation reference signal corresponding to the control resource so that the first communication node determines whether a transmission link fails according to the demodulation reference signal. FIG. 22 is a schematic diagram 7 illustrating occupation of a control channel resource according to an optional embodiment of the present disclosure. As shown in FIG. 22, the fourth communication node notifies the control channel resources transmitted by the second communication node in the control domain of each time unit. The second communication node at least transmits the demodulation reference signals corresponding to the control channel resources on the notified control channel resources.

Figure 23:
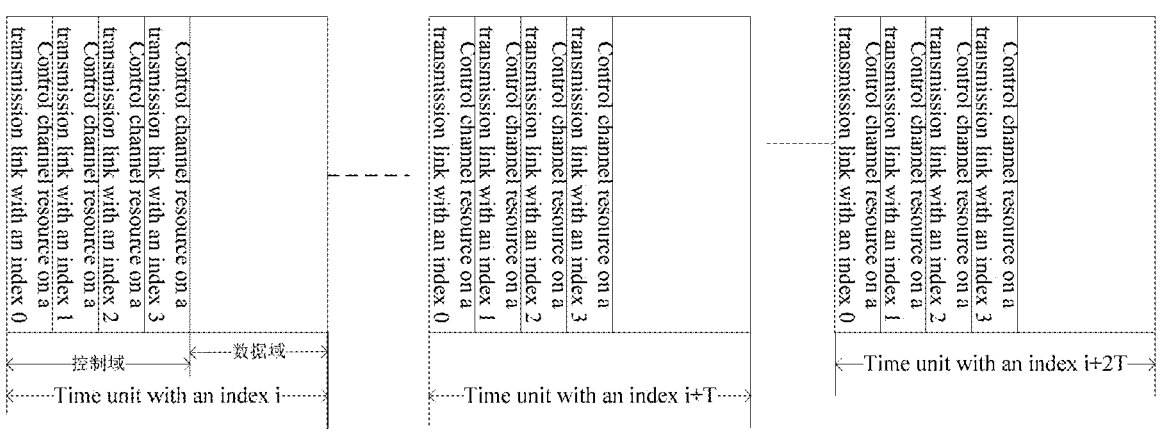
FIG. 23 is a schematic diagram 8 illustrating occupation of a control channel resource according to an optional embodiment of the present disclosure.

In FIG. 16, the second communication node transmits the demodulation reference signals corresponding to all the control channel resources in each time unit. In a fourth implementation mode of the resource information of the control channel resources of this optional embodiment, the first communication node and the second communication node agree that the time units in which the demodulation reference signals of all the control channel resources need to be transmitted are discrete and distributed by a certain rule. For example, the control channel resources are merely transmitted in the time units whose index is an integer multiple of T and transmitted flexibly according to needs in other time units. That is, in other time units, the demodulation reference signals corresponding to all the control channel resources are at least not required to be transmitted by the second communication node. FIG. 23 is a schematic diagram 8 illustrating occupation of a control channel resource according to an optional embodiment of the present disclosure. As shown in FIG. 23, if the second communication node has a total of 4 control channel resources, the demodulation reference signals corresponding to the four control channel resources are at least required to be transmitted in the time units whose index is an integer multiple of T. In other time units, for example, the time units with indexes i+1 to i+T−1, the control channel resources are transmitted flexibly according to needs. The second communication node at least transmits the demodulation reference signals corresponding to the control channel resources on the agreed control channel resources.

In a first implementation mode in which whether the first type of transmission link fails is determined according to the demodulation reference signals on the control channel resources of this optional embodiment, the first communication node receives a signal on the control channel resource corresponding to the first type of transmission link in a first receiving manner and determines the receiving performance of the demodulation reference signal. If the receiving performance is greater than a first predetermined threshold, the receiving performance of the demodulation reference signal on the control channel resource corresponding to the first type of transmission link is proceeded to be detected in a subsequent time unit. When the receiving performance of the demodulation reference signal on the control channel resource corresponding to the first type of transmission link is lower than the first predetermined threshold, the first communication node determines that the first type of transmission link fails. In a second implementation mode of this optional embodiment, the first communication node receives the demodulation reference signal corresponding to the first type of transmission link in the first receiving manner, receives the demodulation reference signals corresponding to other transmission links in the first receiving manner or an omnidirectional manner, and acquires an optimal receiving performance. When a difference between the optimal receiving performance corresponding to the other transmission links and the receiving performance corresponding to the first type of transmission link is greater than a third predetermined threshold, the first communication node determines that the first type of transmission link fails.

After it is detected that the first type of transmission link fails, in a first implementation mode of this optional embodiment, the first communication node determines that the first type of transmission link fails when it is detected once that the first type of transmission link fails. At this time, it is determined that the trigger condition is satisfied and the first communication node prepares to transmit the feedback information to the serving communication node. In a second implementation mode of this optional embodiment, the first communication node considers that the trigger condition is satisfied only after it is detected N1 times that the first type of transmission link fails, where N1 is agreed by the first communication node and the second communication node in advance.

In the implementation modes described above, the first communication node determines whether the first type of transmission link fails by detecting the demodulation reference signal on the control channel resource. When the first type of transmission link fails, it is determined that the trigger condition is satisfied and the feedback information is determined and transmitted. In a second implementation mode of this optional embodiment, the first communication node periodically transmits the feedback information to the serving communication node by detecting the demodulation reference signal on the control resource.

In another implementation mode of this optional embodiment, the first communication node detects whether the trigger condition is satisfied by detecting a demodulation reference signal on a data channel resource transmitted by the second communication node. When the trigger condition is satisfied, the first communication node determines the feedback information and transmits the feedback information to the serving communication node.

In another implementation mode of this optional embodiment, the first communication node determines whether the trigger condition is satisfied, that is, determines whether the first type of transmission link fails, according to the demodulation reference signal transmitted by the second communication node and/or a third communication node on a control channel resource. A failure of the first type of transmission link means that the trigger condition is satisfied.

Optional Embodiment 3

This optional embodiment is similar to the optional embodiment 1, and the main difference is that a first communication node determines whether a trigger condition is satisfied according to a sounding signal transmitted by a second communication node on a first type of transmission link.

Figure 24:
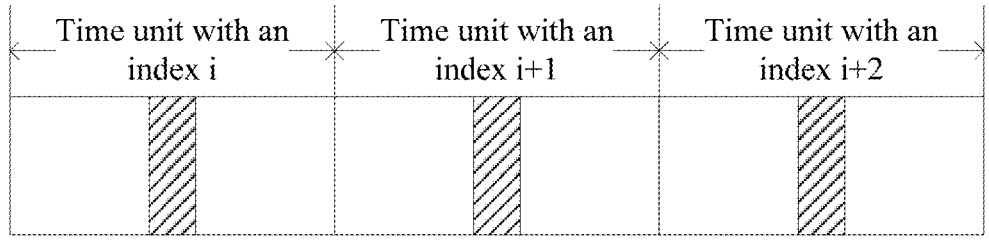
FIG. 24 is a schematic diagram 1 illustrating resource occupation of a sounding signal on a first type of transmission link according to an optional embodiment of the present disclosure.
Figure 25:
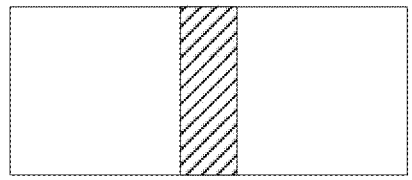
FIG. 25 is a schematic diagram 2 illustrating resource occupation of a sounding signal on a first type of transmission link according to an optional embodiment of the present disclosure.

In a first implementation mode of this optional embodiment, after the first type of transmission link is established between the first communication node and the second communication node, the second communication node transmits aperiodic trigger signaling to the first communication node and then transmits the sounding signal on the first type of transmission link according to the trigger signaling. Alternatively, a third communication node transmits the aperiodic trigger signaling to the first communications node and the second communications node transmits the sounding signal on the first type of transmission link according to the trigger signaling. The first communication node determines whether the first type of transmission link fails according to the sounding signal and transmits feedback information to the second communication node. The feedback information includes at least one of: failure information of the first type of transmission link, information indicating that the first type of transmission link does not fail, and reception quality information on the first type of transmission link. FIG. 24 is a schematic diagram 1 illustrating resource occupation of a sounding signal on a first type of transmission link according to an optional embodiment of the present disclosure. As shown in FIG. 24, an aperiodic trigger signal notifies the sounding signal on the first type of transmission link in a plurality of time units. The first communication node determines whether the trigger condition is satisfied according to the plurality of sounding signals on the first type of transmission link shown in the figure. If the trigger condition is satisfied, the first communication node transmits the feedback information to the second communication node. Resource information of the sounding signal on the first type of transmission link in each time unit in FIG. 24 is merely an example, and other resource occupation cases are not excluded. FIG. 25 is a schematic diagram 2 illustrating resource occupation of a sounding signal on a first type of transmission link according to an optional embodiment of the present disclosure. As shown in FIG. 25, the aperiodic trigger signal only triggers the sounding signal on the first type of transmission link in one time unit. The resource information of the sounding signal on the first type of transmission link is notified via the aperiodic trigger signaling or acquired according to an agreed rule.

Figure 26:
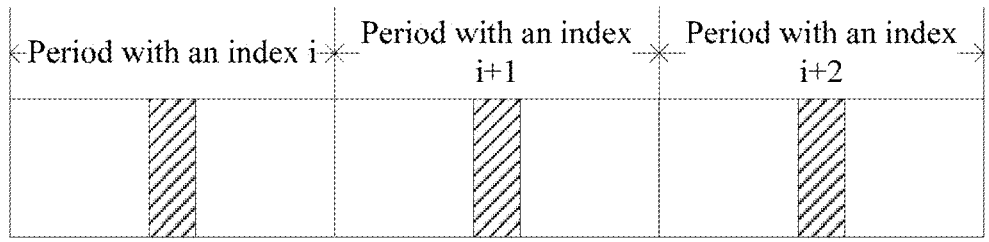
FIG. 26 is a schematic diagram 3 illustrating resource occupation of a sounding signal on a first type of transmission link according to an optional embodiment of the present disclosure.

In a second implementation mode of this optional embodiment, after the first type of transmission link is established between the first communication node and the second communication node, the first communication node acquires a receiving quality of the first type of transmission link according to the sounding signal on the first type of transmission link periodically transmitted by the second communication node and transmits the feedback information to the second communication node when the trigger condition is satisfied. FIG. 26 is a schematic diagram 3 illustrating resource occupation of a sounding signal on a first type of transmission link according to an optional embodiment of the present disclosure. As shown in FIG. 26, the second communication node periodically transmits the sounding signal on the first type of transmission link.

In the implementation modes described above, each sounding signal on the first type of transmission link in FIGS. 24 to 25 may include a plurality of symbols so that the first communication node may change a receiving mode for receiving the sounding signal on the first type of transmission link. In an implementation mode of the trigger condition, the first communication node transmits the feedback information to the second communication node no matter whether the first type of transmission link fails after the aperiodic trigger signaling. In another implementation mode of the trigger condition, the first communication node transmits the feedback information to the second communication node only when the first type of transmission link fails.

In the implementation modes described above, preferably, the trigger signaling for the sounding signal on the first type of transmission link has only one target node, that is, the first communication node.

In another implementation mode of this optional embodiment, the first communication node determines whether the trigger condition is satisfied according to the sounding signal transmitted by the second communication node and/or a third communications node on the first type of transmission link.

Optional Embodiment 4

This optional embodiment is similar to the optional embodiment 1, and the main difference is that a first communication node determines whether a trigger condition is satisfied according to a training signal transmitted by a second communication node and transmits feedback information to a serving communication node when the trigger condition is satisfied.

Figure 27:
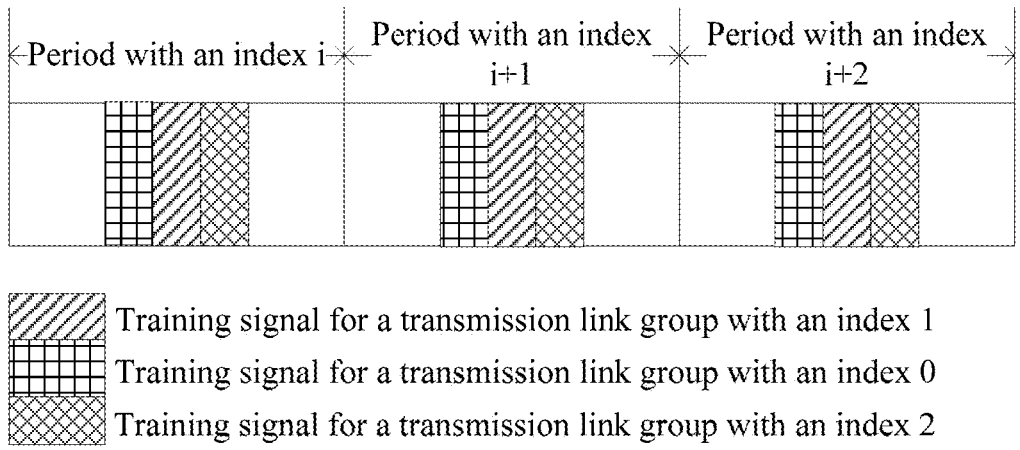
FIG. 27 is a schematic diagram illustrating resource occupation of a training signal according to an optional embodiment of the present disclosure.

In a first implementation mode of this optional embodiment, the training signal is transmitted periodically. FIG. 27 is a schematic diagram illustrating resource occupation of a training signal according to an optional embodiment of the present disclosure. As shown in FIG. 27, the first communication node determines whether the trigger condition is satisfied according to the training signal transmitted periodically by the second communication node and transmits the feedback information to the serving communication node when the trigger condition is satisfied. The number of training signals and the resources occupied by the training signals corresponding to a transmission link group in the figure are merely examples, and other numbers of training signals and other resource occupation cases are not excluded. Preferably, the training signal includes all transmission links of the second communication node.

In a second implementation mode of this optional embodiment, the training signal is transmitted aperiodically. The training signal is transmitted according to aperiodic signaling information of the training signal. The first communication node determines whether the trigger condition is satisfied according to the training signal transmitted aperiodically by the second communication node and transmits the feedback information to the serving communication node when the trigger condition is satisfied. The training signal includes N transmission links. In a first implementation mode, the N transmission links include all the transmission links of the second communication node. For example, the second communication node has a total of 16 transmission links and the N transmission links are the 16 transmission links. In a second implementation mode, the N transmission links include a subset of all transmission links agreed by the second communication node and the first communication node. For example, the N transmission links between the second communication node and the first communication node are agreed to be 8 transmission links 0-7. In a third implementation mode, the N transmission links are a plurality of transmission links adjacent to the first type of transmission link, or a subset of transmission links corresponding to the first type of transmission link.

The training signal includes a training signal for the transmission modes and/or a training signal for the receiving modes, or a beam training signal, or a beam tracking signal, or a tracking signal for the transmission modes and/or a tracking signal for the receiving modes.

In an implementation mode of the trigger condition, the first communication node transmits periodically the feedback information to the second communication node no matter whether the first type of transmission link fails. In another implementation mode of the trigger condition, the first communication node transmits the feedback information to the second communication node only when the first type of transmission link fails.

In the implementation modes described above, a target node for notification signaling information of the training signal is merely the first communication node, or all communication nodes covered by the second communication node, or some communication nodes covered by the second communication node, that is, a group of communication nodes.

In another implementation mode of this optional embodiment, the first communication node determines whether the trigger condition is satisfied according to the training signal transmitted by the second communication node and a third communications node or the training signal transmitted by the third communication node, and transmits the feedback information to the serving communication node when the trigger condition is satisfied.

Optional Embodiment 5

This optional embodiment is similar to the optional embodiment 1, and the main difference is that a first communication node acquires M preferred transmission links from N candidate transmission links according to a demodulation reference signal on a control channel resource transmitted by a second communication node, where M is less than or equal to N.

Distinctive features of different control channel resources include a transmission beam and/or a transmission port and/or a transmission precoding matrix and/or transmission time and/or a transmission frequency and/or a transmission carrier frequency used by the second communication node for transmitting the control channel resource. One control channel resource corresponds to one transmission link, and one transmission link corresponds to one or more control channel resources. The correspondence is agreed by the first communication node and the second communication node in advance.

In a first implementation mode, the N candidate transmission links include all the transmission links of the second communication node. For example, the second communication node has a total of 16 transmission links and the N candidate transmission links are the 16 transmission links. In a second implementation mode, the N candidate transmission links include a subset of all transmission links agreed by the second communication node and the first communication node. For example, the N candidate transmission links between the second communication node and the first communication node are agreed to be 8 transmission links 0-7. In a third implementation mode, the N candidate transmission links are a plurality of transmission links adjacent to a first type of transmission link, or a subset of transmission links corresponding to the first type of transmission link.

Figure 28:
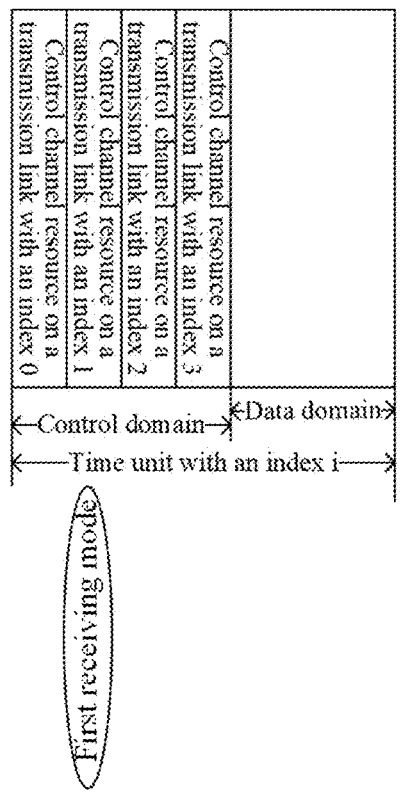
FIG. 28 is a schematic diagram of a first communication node acquiring M preferred transmission links through one receiving mode according to an optional embodiment of the present disclosure.

The M preferred transmission links are acquired according to link performance of the N candidate transmission links. In a first implementation mode of this optional embodiment, the M preferred transmission links are acquired according to link performance of other transmission links in a time unit in which it is determined that the first type of transmission link fails. At this time, each candidate transmission link corresponds to only one receiving mode of the first communication node. FIG. 28 is a schematic diagram of a first communication node acquiring M preferred transmission links in one receiving mode according to an optional embodiment of the present disclosure. As shown in FIG. 28, if it is determined that the first type of transmission link fails in a time unit with an index 0 and it is assumed that the first type of transmission link is a transmission link with the index 0, a receiving end receives a transmission link control channel resource with the index 0 in a first receiving mode and receives transmission link control channel resources with indexes 1-3 in the first receiving mode or an omnidirectional mode. If it is assumed that the N candidate transmission links are the candidate transmission links with indexes 0-3 (or 1-3), the first communication node acquires the M preferred transmission links according to receiving performance of demodulation reference signals corresponding to the control channel resources in the time unit with the index 0.

Figure 29:
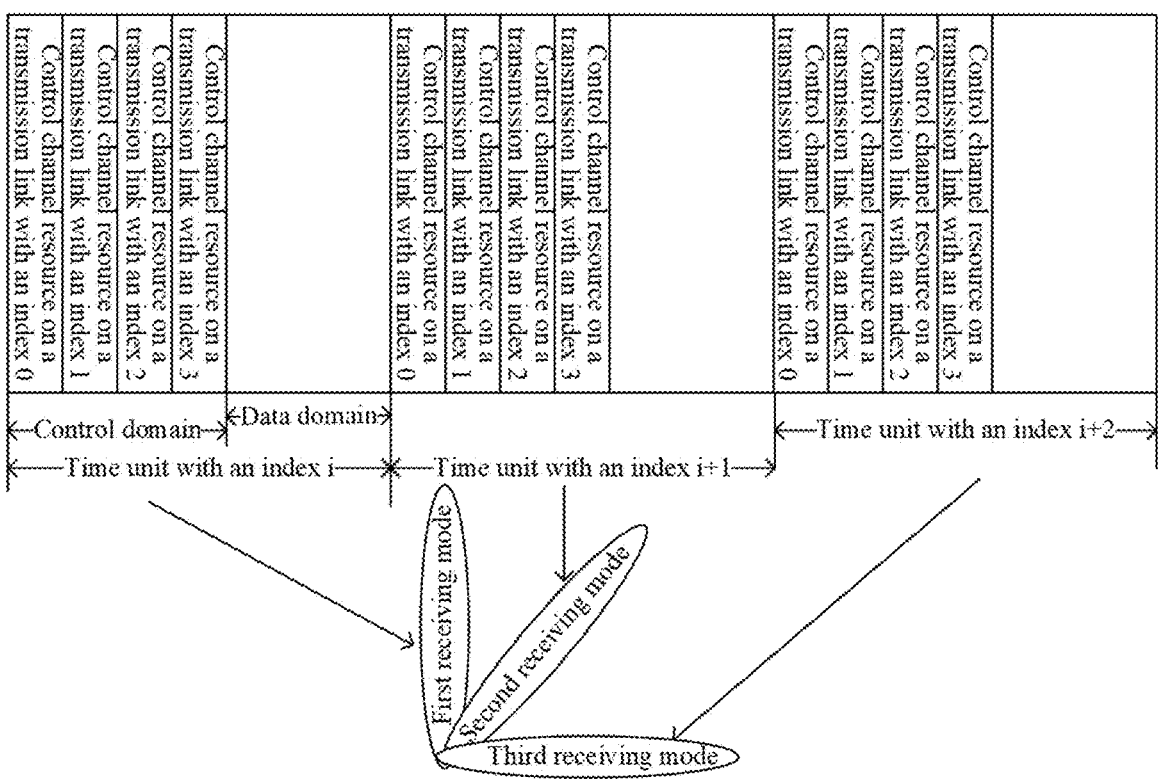
FIG. 29 is a schematic diagram of a first communication node acquiring M preferred transmission links through changing receiving modes in different time units according to an optional embodiment of the present disclosure.

The M preferred transmission links are acquired according to the link performance of the N candidate transmission links. In a second implementation mode of this optional embodiment, FIG. 29 is a schematic diagram of a first communication node acquiring M preferred transmission links in a different receiving modes in a different time units according to an optional embodiment of the present disclosure. As shown in FIG. 29, the first communication node performs traversing for all receiving modes to acquire the M preferred transmission links. The receiving modes corresponding to each preferred transmission link are stored.

Figure 30:
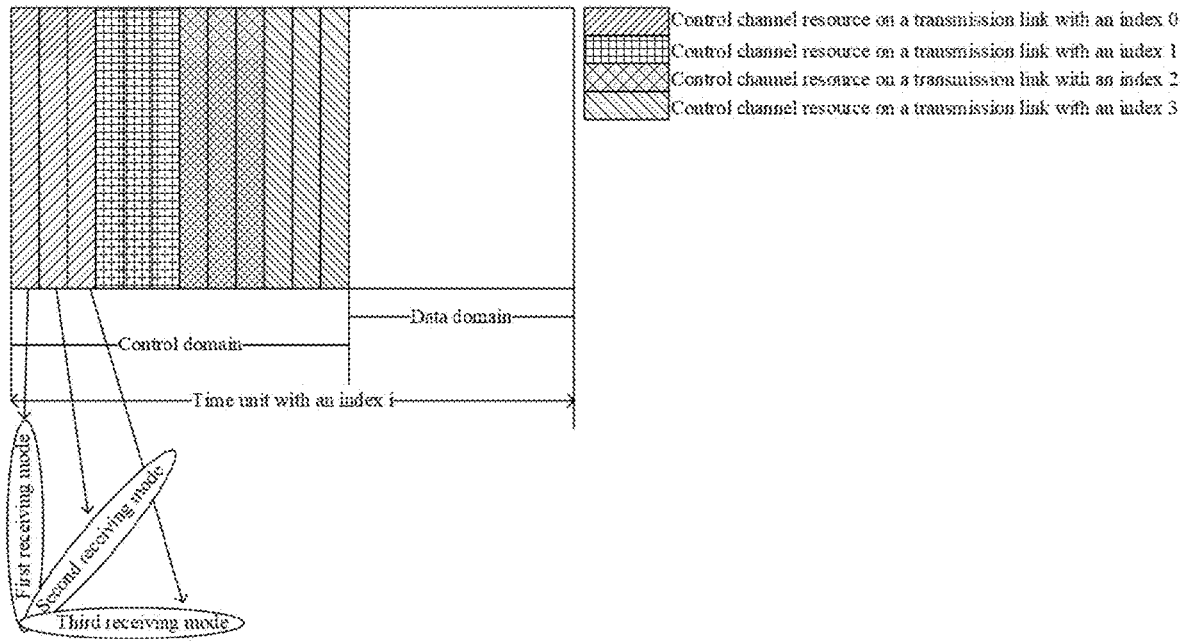
FIG. 30 is a schematic diagram 1 of a first communication node acquiring M preferred transmission links through different receiving modes in one time unit according to an optional embodiment of the present disclosure.
Figure 31:
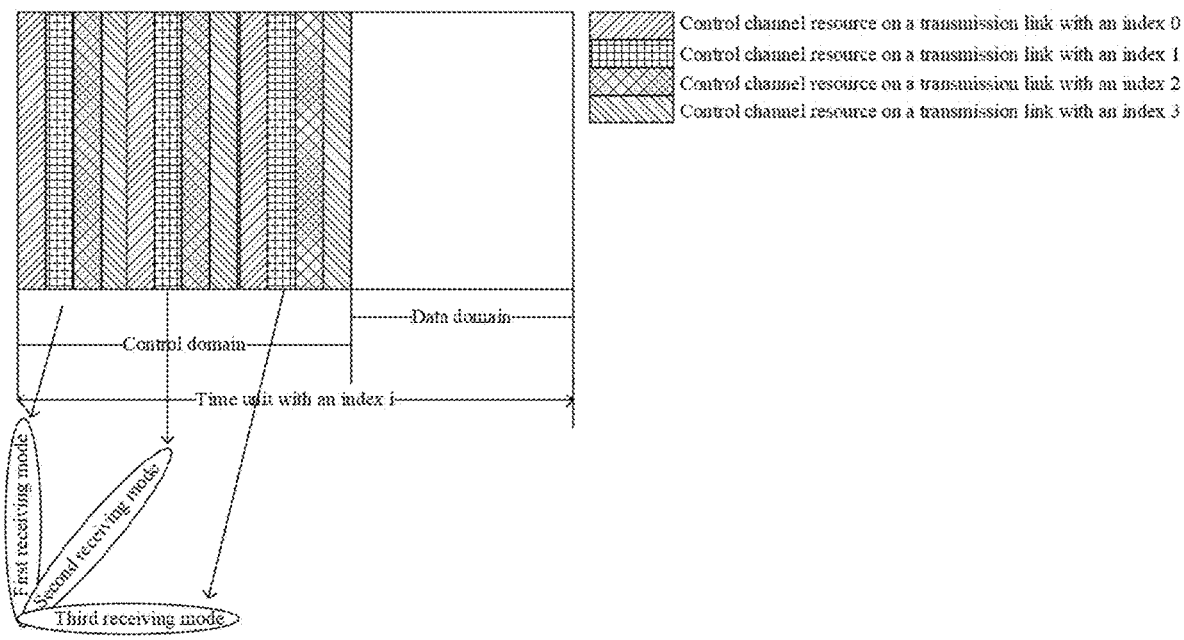
FIG. 31 is a schematic diagram 2 of a first communication node acquiring M preferred transmission links through different receiving modes in one time unit according to an optional embodiment of the present disclosure.

The M preferred transmission links are acquired according to the link performance of the N candidate transmission links. In a third implementation mode of this optional embodiment, FIG. 30 is a schematic diagram 1 of a first communication node acquiring M preferred transmission links in different receiving modes in one time unit according to an optional embodiment of the present disclosure. As shown in FIG. 30, in one time unit, one transmission link control resource includes a plurality of symbols or symbol groups so that the first communication node traverses all the receiving modes in the current time unit to acquire the M preferred transmission links from the N candidate transmission links when it is determined that the first type of transmission link fails. Certainly, before it is determined that the first type of transmission link fails, preferably, the first communication node receives control channel resources in different receiving modes for transmission links other than the first type of transmission links among the N candidate links so that the M preferred transmission links may be acquired based on signals in the current time unit after it is determined that the first type of transmission link fails, thereby reducing a delay of acquiring the M preferred transmission links. Alternatively, FIG. 31 is a schematic diagram 2 of a first communication node acquiring M preferred transmission links in different receiving modes in one time unit according to an optional embodiment of the present disclosure. As shown in FIG. 31, a receiving radio frequency beam corresponding to the first communication node is switched frequency in FIG. 30. A transmission radio frequency beam corresponding to the second communication node is switched frequently in FIG. 31. In the figures, the number of symbols included in each transmission link control resource is merely an example and other numbers of symbols are not excluded; and the value of N is merely an example and other values of N are not excluded.

In the implementation modes described above, the first communication node may take only one sample of each transmission link among the N candidate transmission links and determine the receiving performance to acquire the M preferred transmission links, or may take a plurality of samples in one measurement period and acquires an average receiving performance based on the plurality of samples to acquire the M preferred transmission links.

In the implementation modes described above, resources occupied by control resources corresponding to the N transmission links may be acquired in a similar manner to the manner in the optional embodiment 2.

In the implementation modes described above, when the first communication node cannot acquire the M preferred transmission links according to the demodulation reference signals on the control channel resources corresponding to the N candidate transmission links, for example, the receiving performance of the N candidate transmission links is lower than a second predetermined threshold, a first implementation mode is that the first communication node transmits a cell handover request signal to a serving communication node. A second implementation mode is that the first communication node transmits a request for training signal to the second communication node and acquires the M preferred transmission links according to a training signal transmitted by the serving communication node. If the M preferred transmission links cannot be acquired according to the training signal, the cell handover request signal is transmitted to the serving communication node, or a cell search procedure is initiated. The serving communication node includes the second communication node and/or the third communication node.

In another implementation mode of this optional embodiment, the first communication node acquires the M preferred transmission links from the N candidate transmission links according to the demodulation reference signal on the control channel resource transmitted by the second communication node and/or the third communication node, where M is less than or equal to N.

Optional Embodiment 6

This optional embodiment is similar to the optional embodiment 1, and the main difference is that a first communication node acquires indication information of M preferred transmission links according to a training signal.

The training signal may be transmitted by a second communication node based on a request for training signal. A resource occupied by the training signal is acquired according to one or more of: the request for training signal, a resource occupied by the request for training signal, or signaling information transmitted by the second communication node. The training signal includes N candidate transmission links.

In a first implementation mode, the N candidate transmission links include all the transmission links of the second communication node. For example, the second communication node has a total of 16 transmission links and the N candidate transmission links are the 16 transmission links. In a second implementation mode, the N candidate transmission links include a subset of all transmission links agreed by the second communication node and the first communication node. For example, the N candidate transmission links between the second communication node and the first communication node are agreed to be 8 transmission links 0-7. In a third implementation mode, the N candidate transmission links are a plurality of transmission links adjacent to a first type of transmission link, or a subset of transmission links corresponding to the first type of transmission link.

In a second implementation mode of the training signal, the second communication node transmits periodically the N candidate transmission links. Preferably, the N candidate transmission links include all transmission links of the second communication node.

In a third implementation mode of the training signal, the training signal is transmitted based on failure information of a first type of transmission link. Transmission modes for the training signal and a resource occupied by the training signal are acquired according to one or more of: the failure information of the first type of transmission link, relevant information to the first type of transmission link, transmission modes of the first communications node for transmitting the failure information of the first type of transmission link, or receiving modes of a serving communications node for receiving the failure information of the first type of transmission link. The training signal includes a training signal for the transmission modes and/or a training signal for the receiving modes.

The training signal may be the training signal for the transmission modes and/or receiving modes, or a beam training signal, or a beam tracking signal, or a tracking signal for the transmission modes and/or receiving modes.

In the implementation modes described above, when the first communication node cannot acquire the M preferred transmission links according to the training signals corresponding to the N candidate transmission links, for example, the receiving performance of the N candidate transmission links is lower than a second predetermined threshold, the first communication node transmits a cell handover request signal to the serving communication node.

In another implementation mode of this optional embodiment, the training signal is transmitted by the second communication node and/or a third communication node.

Optional Embodiment 7

In this optional embodiment, a first communication node adjusts communication links between the first communication node and a serving communication node according to feedback information and/or response information transmitted by the serving communication node. The serving communication node includes a second communication node and/or a third communication node.

Figure 32:
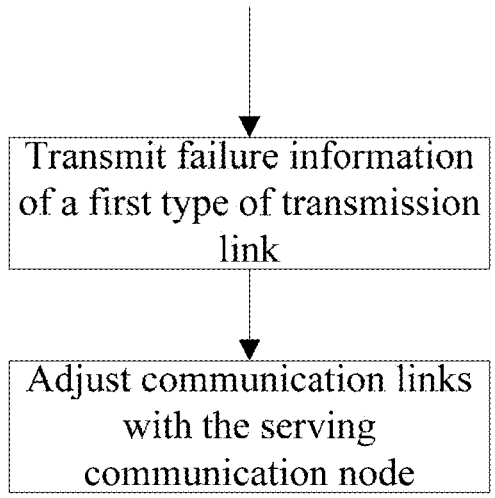
FIG. 32 is a flowchart 1 of a method for adjusting a communication link after a first communication node transmits feedback information, according to an optional embodiment of the present disclosure.

In a first implementation mode of this optional embodiment, FIG. 32 is a flowchart 1 of a method for adjusting a communication link after a first communication node transmits feedback information according to an optional embodiment of the present disclosure. As shown in FIG. 32, after the first communication node transmits failure information of a first type of transmission link to the serving communication node, the first communication node adjusts the communication links with the serving communication node, and detects a control channel and/or receives data and/or tracks links on the adjusted communication link. At this time, the first communication node considers that the first communication node successfully transmits the failure information of the first type of transmission link with a high probability, that is, transmits the failure information of the first type of transmission link with higher robustness such as a lower code rate and/or more beams and/or a wider beam or a low frequency.

Figure 33:
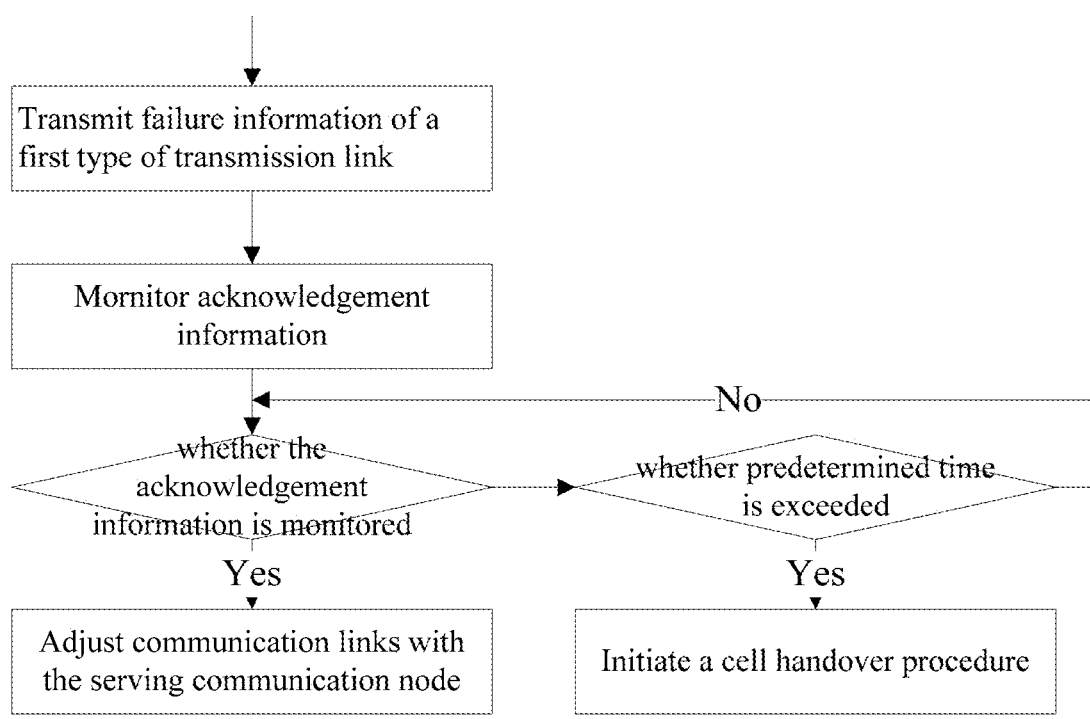
FIG. 33 is a flowchart 2 of a method for adjusting a communication link after a first communication node transmits feedback information, according to an optional embodiment of the present disclosure.

In a second implementation mode of this optional embodiment, FIG. 33 is a flowchart 2 of a method for adjusting a communication link after a first communication node transmits feedback information according to an optional embodiment of the present disclosure. As shown in FIG. 33, after the first communication node transmits the failure information of the first type of transmission link to the serving communication node, the first communication node monitors acknowledgement information transmitted by the serving communication node, adjusts the communication links with the serving communication node after the acknowledgement information is monitored, and detects the control channel and/or receives the data and/or tracks the links on the adjusted communication link. When the acknowledgment information is not monitored when predetermined time is exceeded, the transmission is considered to be failed. At this time, the transmission may have been repeated for times, and thus a cell handover procedure is initiated.

In the first and second implementation modes, adjusting the communication links with the serving communication node is, for example, to switch the transmission links between the second communication node and the first communication node to a second type of transmission link. The second type of transmission link is a transmission link to which the first communication node and the second communication node agree to switch when the first type of transmission link fails, or is acquired according to the first type of transmission link when the first type of transmission link fails. The second type of transmission link may have one or more transmission links. (1) The second type of transmission link is a transmission link between the first communication node and the second communication node whose receiving quality is lower than the first type of transmission link. (2) The second type of transmission link is an omnidirectional link, for example, the second type of transmission link includes all transmission links of the second communication node. (3) The second type of transmission link is a wider beam. (4) The second type of transmission link is a low-frequency transmission link. (5) The second type of transmission link is a fixed transmission link from the third communication node. The first communication node detects the control channel and/or receives the data and/or tracks the links on the second type of transmission link.

Figure 34:
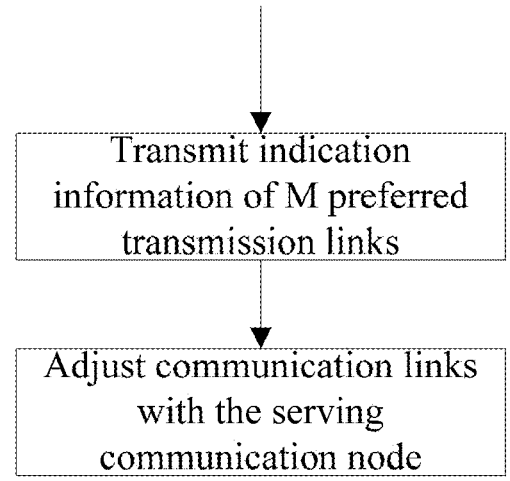
FIG. 34 is a flowchart 3 of a method for adjusting a communication link after a first communication node transmits feedback information, according to an optional embodiment of the present disclosure.

In a third implementation mode of this optional embodiment, FIG. 34 is a flowchart 3 of a method for adjusting a communication link after a first communication node transmits feedback information according to an optional embodiment of the present disclosure. As shown in FIG. 34, after the first communication node transmits indication information of M preferred transmission links to the serving communication node, the first communication node adjusts the communication links with the serving communication node, and detects the control channel and/or receives the data and/or tracks the links on the adjusted communication link. At this time, the first communication node considers that the first communication node successfully transmits the failure information of the first type of transmission link with a high probability, that is, transmits the failure information of the first type of transmission link with higher robustness such as a lower code rate and/or more beams and/or a wider beam or a low frequency.

Figure 35:
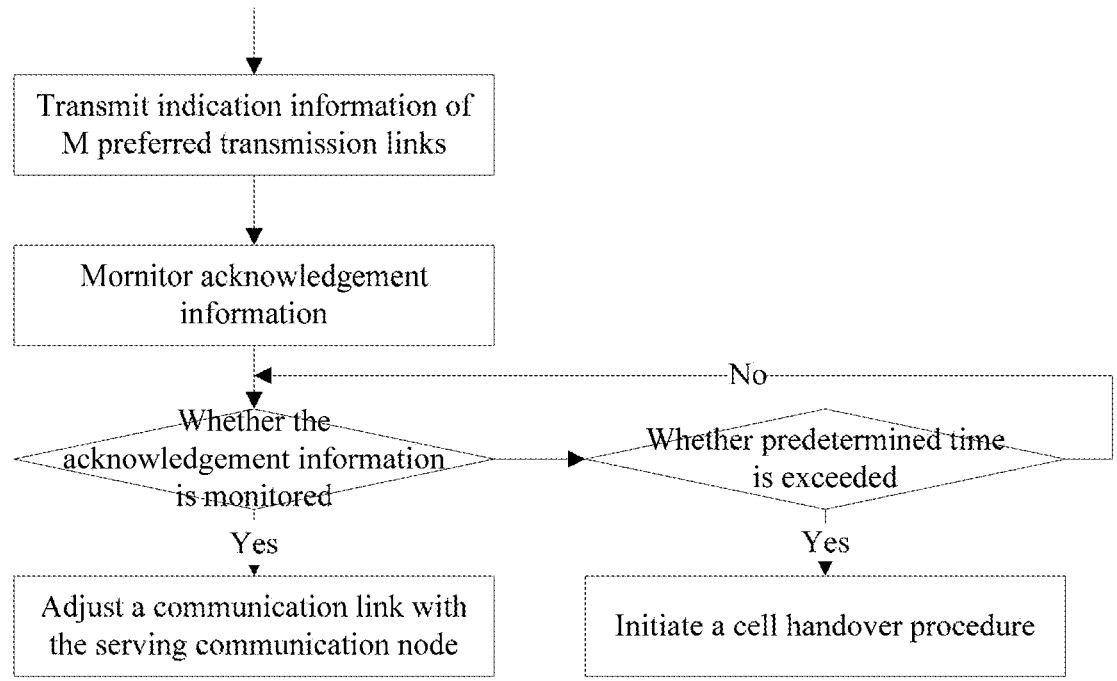
FIG. 35 is a flowchart 4 of a method for adjusting a communication link after a first communication node transmits feedback information, according to an optional embodiment of the present disclosure.

In a fourth implementation mode of this optional embodiment, FIG. 35 is a flowchart 4 of a method for adjusting a communication link after a first communication node transmits feedback information according to an optional embodiment of the present disclosure. As shown in FIG. 35, after the first communication node transmits the indication information of the M preferred transmission links to the serving communication node, the first communication node monitors the acknowledgement information transmitted by the serving communication node, adjusts the communication links with the serving communication node after the acknowledgement information is monitored, and detects the control channel and/or receives the data and/or tracks the links on the adjusted communication link. When the acknowledgment information is not monitored when the predetermined time is exceeded, the transmission is considered to be failed. At this time, the transmission may have been repeated for times, and thus the cell handover procedure is initiated.

In the third and fourth implementation modes, the first communication node adjusts the communication links with the serving communication node. In a first implementation mode, the first communication node immediately replaces the communication links with the serving communication node with all or some of the M preferred transmission links. In a second implementation mode, after fixed time, the first communication node replaces the communication links with all or some of the M preferred transmission links. Before the communication link is replaced, the first communication node still performs control channel detection and/or data reception and/or link tracking on the first type of transmission link. After the communication link is replaced, the first communication node performs control channel detection and/or data reception and/or link tracking on the new transmission links.

In the implementation modes described above, the acknowledgment information from the serving communication node is monitored. (1) The acknowledgment information is monitored on the first type of transmission link. (2) If the feedback information includes the M preferred transmission links, the acknowledgement information is monitored on one or more of the M preferred transmission links. (3) If the serving communication node and the first communication node have established a plurality of transmission links previously, such as transmission links {0, 3, 4}, and the failure information of the first type of transmission link indicates that the transmission link 0 fails, the first communication node monitors for the acknowledgement information on the transmission link 3 and/or the transmission link 4.

Optional Embodiment 8

In this optional embodiment, a serving communication node detects and receives feedback information transmitted by a first communication node and transmits a response signal and/or adjusts communication links with the first communication node after the feedback information transmitted by the first communication node is detected and received. The serving communication node includes a second communication node and/or a third communication node.

When the first communication node reports periodically the feedback information on a dedicated resource, the serving communication node only detects the feedback information on periodic resources and do not detect the feedback information on other resources. When the first communication node transmits randomly the feedback information on the dedicated resource, the serving communication node needs to detect the feedback information transmitted by the first communication node on any resource of the dedicated resource.

When the first communication node reports randomly the feedback information on a common resource, the serving communication node needs to detect the feedback information transmitted by the first communication node on any resource of the common resource.

After the serving communication node receives failure information of a first type of transmission link transmitted by the first communication node, the serving communication node performs one or more of the following operations: immediately stopping transmitting information on the first type of transmission link to the first communication node; stopping transmitting information on the first type of transmission link to the first communication node after the feedback information is received for predetermined times; stopping transmitting information on the first type of transmission link to the first communication node after predetermined time; starting a timer for restoring a link with the first communication node; or transmitting a training signal on a predetermined resource, where the predetermined resource is acquired according to one or more of: the failure information of the first type of transmission link, relevant information to the first type of transmission link, transmission modes of the first communication node for transmitting the failure information of the first type of transmission link, or receiving modes of the serving communication node for receiving the failure information of the first type of transmission link. The training signal includes a training signal for transmission modes and/or a training signal for receiving modes, or a beam training signal, or a beam tracking signal.

When the serving communication node receives a request for training signal of the transmission modes and/or a request for training signal of the receiving modes transmitted by the first communication node, the serving communication node transmits the training signal. The training signal includes a training signal for the transmission modes and/or a training signal for the receiving modes. The serving communication node acquires a transmission mode for and a resource occupied by the request for training signal of the transmission modes and/or the request for training signal of the receiving modes according to at least one of: a request for training signal, resource information for the request for training signal, transmission modes of the first communication node for transmitting the request for the signal, and receiving modes of the serving communication node for receiving the request for training signal.

The serving communication node adjusts the communication links with the first communication node after receiving M preferred transmission links. For example, the serving communication node transmits information to the first communication node on Q transmission links selected from the M preferred transmission links, where Q is a positive integer less than or equal to M. And/or the serving communication node stops transmitting the information on the first type of transmission link to the first communication node and transmits the information on the selected Q transmission links to the first communication node.

The serving communication node transmits acknowledgement information of the feedback information to the first communication node after receiving the feedback information. (1) The serving communication node transmits the acknowledgement information on the first type of transmission link. (2) If the acquired feedback information includes indication information of the M preferred transmission links, the serving communication node transmits the acknowledge information to the first communication node on one or more of the M preferred transmission links. (3) If indication information of the first type of transmission link indicates an index of a failed link and the serving communication node and the first communication node have established a plurality of transmission links, the serving communication node transmits the acknowledgement information on one or more transmission links that do not fail among the plurality of transmission links to the first communication node and further agrees with the first communication node on transmission links that do not fail that the first communication node transmits the feedback information on a transmission link with optimal link performance. (4) The serving communication node transmits the acknowledgement information to the first communication node at a second carrier frequency. The second carrier frequency is a low frequency.

Optional Embodiment 9

In this optional embodiment, a first communication node transmits feedback information in a time unit in which it is determined that a first type of transmission link fails, and a serving communication node adjusts data transmission to the first communication node according to the feedback information transmitted by the first communication node. The serving communication node includes a second communication node and/or a third communication node.

Figure 36:
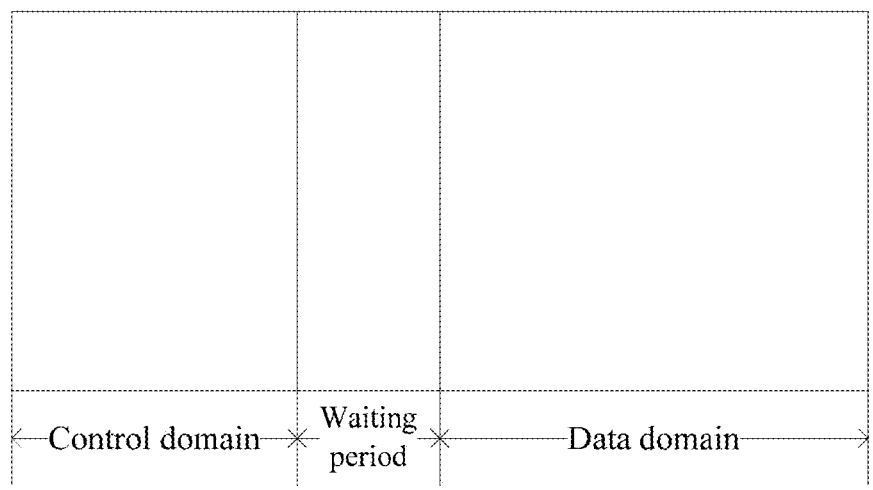
FIG. 36 is a structural diagram 1 of a time unit according to an optional embodiment of the present disclosure.

In a first implementation mode of this optional embodiment, FIG. 36 is a structural diagram 1 of a time unit according to an optional embodiment of the present disclosure. As shown in FIG. 36, the first communication node determines whether the first type of transmission link fails according to a demodulation reference signal transmitted by the serving communication node in a control domain. If the first type of transmission link fails, the first communication node transmits failure information of the first type of transmission link to the serving communication node in a waiting period. The first communication node may transmit the failure information of the first type of transmission link at the same carrier frequency as the control domain, or on a different carrier frequency from the control domain. If the serving communication node receives the failure information of the first type of transmission link in the waiting period, the serving communication node stops transmitting data information on the first type of transmission link to the first communication node in a data domain.

Figure 37:
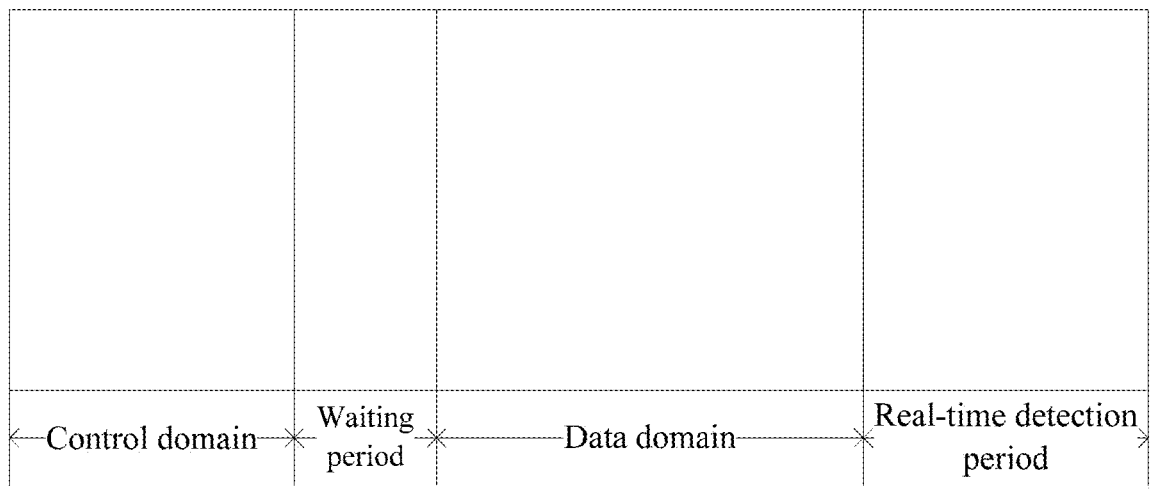
FIG. 37 is a structural diagram 2 of a time unit according to an optional embodiment of the present disclosure.

In a second implementation mode of this optional embodiment, FIG. 37 is a structural diagram 2 of a time unit according to an optional embodiment of the present disclosure. As shown in FIG. 37, the first communication node determines whether the first type of transmission link fails according to the demodulation reference signal transmitted by the serving communication node in the control domain. If the first type of transmission link fails, the first communication node transmits the failure information of the first type of transmission link to the serving communication node in the waiting period. The first communication node may transmit the failure information of the first type of transmission link at the same carrier frequency as the control domain, or on a different carrier frequency from the control domain. If the serving communication node receives the failure information of the first type of transmission link in the waiting period, the serving communication node stops transmitting data information on the first type of transmission link to the first communication node in the data domain. All communication nodes covered by the serving communication node need to detect control information transmitted by the serving communication node in the control domain of each minimum transmission time unit in a real-time detection period.

In a third implementation mode of this optional embodiment, as shown in FIG. 37, the first communication node determines whether the first type of transmission link fails according to the demodulation reference signal transmitted by the serving communication node in the control domain. If the first type of transmission link fails, the first communication node acquires M preferred transmission links and transmits indication information of the M preferred transmission links to the serving communication node in the waiting period. The first communication node may transmit the indication information at the same carrier frequency as the control domain, or on a different carrier frequency from the control domain. If the serving communication node receives the failure information of the first type of transmission link in the waiting period, the serving communication node stops transmitting data information on the first type of transmission link to the first communication node in the data domain. All communication nodes covered by the serving communication node need to detect the control information transmitted by the serving communication node in the control domain of each minimum transmission time unit in the real-time detection period. Preferably, the serving communication node may transmit control and/or data to the first communication node on one or more of the M preferred transmission links in the real-time detection period.

The optional embodiments described above are only used to describe the technical solutions of the present disclosure and not intended to limit the technical solutions of the present disclosure. Those skilled in the art can make modifications or equivalent substitutions on the technical solutions of the present disclosure without departing from the spirit and scope of the present disclosure. The protection scope of the present disclosure is defined by the appended claims.

Embodiment 5

This embodiment provides an information feedback system including a first communication node and a serving communication node. The first communication node is configured to determine feedback information for indicating a status of communication links between the first communication node and the serving communication node and transmit the feedback information to the serving communication node. The serving communication node is configured to detect the feedback information transmitted by the first communication node. The feedback information includes at least one of: failure information of a first type of transmission link, a request for training signal of transmission modes and/or a request for training signal of receiving modes, and indication information of M preferred transmission links, and the first type of transmission link and the M preferred transmission links include transmission links from the serving communication node to the first communication node, where M is a positive integer greater than or equal to 1. The serving communication node includes a second communication node and/or a third communication node.

Embodiment 6

From the description of the embodiments described above, it will be apparent to those skilled in the art that the method of any embodiment described above may be implemented by software plus a necessary general-purpose hardware platform, or may of course be implemented by hardware, but in many cases, the former is a preferred implementation mode. Based on this understanding, the solution provided by the present disclosure substantially, or the part contributing to the related art, may be embodied in the form of a software product. The computer software product is stored in a storage medium (such as an ROM/RAM, a magnetic disk or an optical disk) and includes several instructions for enabling a terminal device (which may be a mobile phone, a computer, a server, a network device, or the like) to execute the method according to each embodiment of the present disclosure.

An embodiment of the present disclosure further provides a storage medium. Optionally, in this embodiment, the storage medium described above may be configured to store program codes for executing the step described below.

In S11, a first communication node determines feedback information for indicating a status of communication links between the first communication node and a serving communication node. The feedback information includes at least one of: failure information of a first type of transmission link, a request for training signal of transmission modes and/or a request for training signal of receiving modes, and indication information of M preferred transmission links, and the first type of transmission link and the M preferred transmission links include a transmission link from a second communication node and/or a third communication node to the first communication node, where M is a positive integer greater than or equal to 1.

In S12, the first communication node transmits the feedback information to the serving communication node. The serving communication node includes the second communication node and/or the third communication node.

Optionally, the storage medium is further configured to store program codes for executing the step in the method according to the embodiments described above.

In S21, the serving communication node detects the feedback information for indicating the status of the communication link between the first communication node and the serving communication node transmitted by the first communication node. The feedback information includes at least one of: the failure information of the first type of transmission link, the request for training signal of the transmission modes and/or the request for training signal of the receiving modes, and the indication information of the M preferred transmission links and the first type of transmission link and the M preferred transmission links include the transmission link from the serving communication node to the first communication node, where M is a positive integer greater than or equal to 1.

The serving communication node includes the second communication node and/or the third communication node.

Optionally, in this embodiment, the storage medium may include, but is not limited to, a U disk, a read-only memory (ROM), a random access memory (RAM), a mobile hard disk, a magnetic disk, an optical disk or another medium capable of storing program codes.

Optionally, in this embodiment, the processor executes the steps in the method according to the embodiments described above according to the program codes stored in the storage medium.

Optionally, for specific examples in this embodiment, reference may be made to the examples described in the above embodiments and optional implementations, and repetition will not be made in this embodiment.

Apparently, those skilled in the art should know that each of the above-mentioned modules or steps of the present disclosure may be implemented by a general-purpose computing device, the modules or steps may be concentrated on a single computing device or distributed on a network formed by multiple computing devices, and alternatively, the modules or steps may be implemented by program codes executable by the computing devices, so that modules or steps may be stored in a storage device and executable by the computing devices. In some circumstances, the illustrated or described steps may be executed in sequences different from those described herein, or the illustrated or described steps may be made into various integrated circuit modules separately, or multiple modules or steps therein may be made into a single integrated circuit module for implementation. In this way, the present disclosure is not limited to any specific combination of hardware and software.

The above are only preferred embodiments of the present disclosure and are not intended to limit the present disclosure, and for those skilled in the art, the present disclosure may have various modifications and variations. Any modifications, equivalent substitutions, improvements and the like made within the spirit and principle of the present disclosure are within the scope of the present disclosure.

INDUSTRIAL APPLICABILITY

The information feedback method, device and system in the present disclosure provide beneficial effects of enabling a receiving end and a transmitting end to learn a status of communication links between them in tine, effectively improving a resource utilization rate, and solving the problem in the existing art of a low resource utilization rate because a receiving end and a transmitting end cannot learn a communication link failure in time.

What is claimed is:

1. A method for wireless communication, comprising:
   acquiring, by a first communication node, information about N candidate transmission links from a serving communication node according to a predefined rule agreed upon with the serving communication node, wherein N is a positive integer;
   determining, by the first communication node, one or more failures on a communication link between the first communication node and the serving communication node based on at least a link performance of a first transmission link;
   selecting, by the first communication node in response to the one or more failures on the communication link, M preferred transmission links from the N candidate transmission links, wherein M is a positive integer less than or equal to N, wherein the selecting of the M preferred transmission links is triggered upon determining that a number of the one or more failures reaches N1, wherein N1 is predetermined between the first communication node and the serving communication node;
   transmitting, by the first communication node, feedback information about the M preferred transmission links to the serving communication node; and
   monitoring, by the first communication node, at a fixed time after the transmitting of the feedback information of the M preferred transmission links, at least one of a data channel and a control channel on Q transmission links of the M preferred transmission links, wherein Q is positive integer less than or equal to M.

2. The method of claim 1, wherein the determining of the one or more failures comprises:
   assessing the link performance of the first transmission link according to one or more control channel resources of the first transmission link that correspond to a demodulation reference signal monitored by the first communication node.

3. The method of claim 1, wherein the determining of the one or more failures comprises:
   determining, by the first communication node, that link performances of all transmission links are lower than a predetermined threshold.

4. The method of claim 1, wherein the feedback information is transmitted in a contention manner.

5. A method for wireless communication, comprising:
   transmitting, by a serving communication node, information about N candidate transmission links to a first communication node according to a predefined rule agreed upon between the serving communication node and the first communication node, wherein N is a positive integer;
   receiving, by the serving communication node, feedback information about M preferred transmission links from the first communication node, wherein the M preferred transmission links are selected in response to one or more failures detected on a communication link between the first communication node and the serving communication node based on at least a link performance of a first transmission link, and wherein the M preferred transmission links are selected upon a number of the one or more failures reaching N1, wherein N1 is predetermined between the first communication node and the serving communication node;
   performing, by the serving communication node, at a fixed time after receiving of the feedback information of the M preferred transmission links by the first communication node, a transmission on at least one of a data channel and a control channel to the first communication node on Q transmission links of the M preferred transmission links, wherein Q is positive integer less than or equal to M.

6. The method of claim 5, wherein the one or more failures are detected by assessing the link performance of the first transmission link according to one or more control channel resources of the first transmission link that correspond to a demodulation reference signal monitored by the first communication node.

7. The method of claim 5, wherein the one or more failures are determined upon link performances of all transmission links being lower than a predetermined threshold.

8. The method of claim 5, wherein the feedback information is transmitted in a contention manner.

9. A device for wireless communication implemented as a first communication node, comprising a processor that is configured to:
   acquire information about N candidate transmission links from a serving communication node according to a predefined rule agreed upon with the serving communication node, wherein N is a positive integer;
   determine one or more failures on a communication link between the first communication node and the serving communication node based on at least a link performance of a first transmission link;
   select, in response to the one or more failures on the communication link, M preferred transmission links from the N candidate transmission links, wherein M is a positive integer less than or equal to N, wherein the processor is configured to select the M preferred transmission links upon a number of the one or more failures reaching N1, wherein N1 is predetermined between the first communication node and the serving communication node;
   transmit feedback information about the M preferred transmission links to the serving communication node; and
   monitor, at a fixed time after transmitting of the feedback information of the M preferred transmission links, at least one of a data channel and a control channel on Q transmission links of the M preferred transmission links, wherein Q is positive integer less than or equal to M.

10. The device of claim 9, wherein the one or more failures are determined by assessing the link performance of the first transmission link according to one or more control channel resources of the first transmission link that correspond to a demodulation reference signal monitored by the first communication node.

11. The device of claim 9, wherein the one or more failures are determined upon link performances of all transmission links being lower than a predetermined threshold.

12. The device of claim 9, wherein the feedback information is transmitted or received in a contention manner.

13. A device for wireless communication implemented as a serving communication node, comprising a processor that is configured to:
   transmit information about N candidate transmission links to a first communication node according to a predefined rule agreed upon between the serving communication node and the first communication node, wherein N is a positive integer;
   receive feedback information about M preferred transmission links from the first communication node, wherein the M preferred transmission links are selected in response to one or more failures detected on a communication link between the first communication node and the serving communication node based on at least a link performance of a first transmission link, wherein the M preferred transmission links are selected upon a number of the one or more failures reaching N1, wherein N1 is predetermined between the first communication node and the serving communication node;

perform, at a fixed time after receiving of the feedback information of the M preferred transmission links by the first communication node, a transmission on at least one of a data channel and a control channel to the first communication node on Q transmission links of the M preferred transmission links, wherein Q is positive integer less than or equal to M.

14. The device of claim 13, wherein the one or more failures are determined by assessing the link performance of the first transmission link according to one or more control channel resources of the first transmission link that correspond to a demodulation reference signal monitored by the first communication node.

15. The device of claim 13, wherein the one or more failures are determined upon link performances of all transmission links being lower than a predetermined threshold.

16. The device of claim 13, wherein the feedback information is transmitted or received in a contention manner.

* * * * *